(12) United States Patent
Litovsky et al.

(10) Patent No.: US 7,888,907 B2
(45) Date of Patent: Feb. 15, 2011

(54) CONTROLLED CHARGING AND USE OF POWER SOURCE

(75) Inventors: Roman N. Litovsky, Newton, MA (US); Hal P. Greenberger, Natick, MA (US)

(73) Assignee: Bose Corporation, Framingham, MA (US)

( * ) Notice: Subject to any disclaimer, the term of this patent is extended or adjusted under 35 U.S.C. 154(b) by 686 days.

(21) Appl. No.: 11/929,842

(22) Filed: Oct. 30, 2007

(65) Prior Publication Data
US 2009/0110214 A1 Apr. 30, 2009

(51) Int. Cl.
*H02J 7/00* (2006.01)
*H02J 1/12* (2006.01)

(52) U.S. Cl. .................. 320/103; 320/107; 320/110; 320/120; 307/46; 307/64; 307/66

(58) Field of Classification Search .............. 320/103
See application file for complete search history.

(56) References Cited

U.S. PATENT DOCUMENTS

| | | | |
|---|---|---|---|
| 3,873,904 A | 3/1975 | Kowalewski | |
| 5,353,347 A | 10/1994 | Irissou et al. | |
| 5,461,297 A | 10/1995 | Crawford | |
| 5,786,685 A * | 7/1998 | Lange et al. | 323/270 |
| 5,796,182 A * | 8/1998 | Martin | 307/66 |
| 5,838,554 A | 11/1998 | Lanni | |
| 5,940,263 A | 8/1999 | Jakoubovitch | |
| 6,057,670 A | 5/2000 | Sink et al. | |
| 6,069,959 A | 5/2000 | Jones | |
| 6,078,167 A * | 6/2000 | Oskowsky et al. | 323/222 |
| 6,091,611 A | 7/2000 | Lanni | |
| 6,104,759 A * | 8/2000 | Carkner et al. | 375/295 |
| 6,118,878 A | 9/2000 | Jones | |
| 6,172,884 B1 | 1/2001 | Lanni | |
| 6,396,715 B1 | 5/2002 | Zhang et al. | |
| 6,465,987 B1 | 10/2002 | Haas et al. | |

(Continued)

FOREIGN PATENT DOCUMENTS

EP 0657985 6/1995

(Continued)

OTHER PUBLICATIONS

CAP-XX Pty Ltd. White Paper, Use of Super Capacitors to Improve Performance of GPRS Mobile Stations, Feb. 2003. pp. 1-77.

(Continued)

*Primary Examiner*—Edward Tso
*Assistant Examiner*—Yalkew Fantu

(57) ABSTRACT

A circuit to supply power to a load incorporates a first power source, a second power source that may be detachable, a power converter and at least one capacitor (capacitive element), where the first power source is capable of powering the load when charged, where the second power source is not capable of powering the load, but the second power source is capable of trickle-charging the first power source at a time when the first power source is not powering the load, where the power converter may impose a limit on a flow of current through the power converter, and where the at least one capacitor may cooperate to temporarily support a flow of additional current that circumvents the power converter at a time when the load attempts to draw a relatively greater amount of current.

20 Claims, 39 Drawing Sheets

U.S. PATENT DOCUMENTS

| | | |
|---|---|---|
| 6,608,900 B1 | 8/2003 | Yancey et al. |
| 6,625,285 B1 | 9/2003 | Ohashi |
| 6,628,107 B1 * | 9/2003 | Bang et al. ............... 323/266 |
| 6,653,814 B1 | 11/2003 | Patino |
| 6,664,766 B2 | 12/2003 | Desprez et al. |
| 6,704,428 B1 | 3/2004 | Wurtz |
| 6,829,364 B2 | 12/2004 | Andersen et al. |
| 6,949,915 B2 | 9/2005 | Stanley |
| 7,202,576 B1 | 4/2007 | Dechene et al. |
| 7,301,249 B2 | 11/2007 | Stranberg et al. |
| 7,327,850 B2 | 2/2008 | Crump et al. |
| 2001/0043060 A1 | 11/2001 | Brandt |
| 2002/0102003 A1 | 8/2002 | Ford |
| 2002/0175522 A1 | 11/2002 | Wacknov et al. |
| 2003/0222503 A1 | 12/2003 | Lam et al. |
| 2004/0258253 A1 | 12/2004 | Wurtz |
| 2005/0242885 A1 * | 11/2005 | Craynon et al. ............. 330/297 |
| 2007/0098190 A1 | 5/2007 | Song et al. |
| 2007/0105415 A1 | 5/2007 | Jin et al. |
| 2008/0048499 A1 | 2/2008 | Litovsky et al. |
| 2008/0054842 A1 | 3/2008 | Kim et al. |
| 2008/0205663 A1 | 8/2008 | Crump et al. |
| 2009/0108681 A1 | 4/2009 | Litovsky |

FOREIGN PATENT DOCUMENTS

| | | |
|---|---|---|
| EP | 0 902 547 | 3/1999 |
| EP | 1202427 | 5/2002 |
| EP | 1447897 | 8/2004 |
| EP | 1608054 | 12/2005 |
| FR | 2847741 | 5/2004 |
| JP | 57-036088 A | 9/1976 |
| JP | 53-030315 A | 3/1978 |
| JP | 56-152306 A | 11/1981 |
| JP | 06-078390 A | 3/1994 |
| JP | 10066334 A | 3/1998 |
| JP | 2000092830 A | 3/2000 |
| JP | 2005039834 A | 2/2005 |
| KR | 100748311 | 8/2007 |
| WO | 0167805 A2 | 9/2001 |
| WO | 0215386 A2 | 2/2002 |
| WO | 0246608 | 6/2002 |
| WO | 02074387 | 9/2002 |

OTHER PUBLICATIONS

1st Office Action dated Apr. 4, 2008 for Chinese application No. 200510078392.4.
2nd Office Action dated Sep. 26, 2008 for Chinese Application No. 2005 10078392.4.
Communication from European Patent Office dated Sep. 28, 2007 in Counterpart Application No. 05105040.9.
Search Report dated Nov. 10, 2006 for European Application No. 05105040.9.
Search Report dated Oct. 17, 2008 for PCT Application No. PCT/US2008/065520.
International Preliminary Report on Patentability dated Nov. 9, 2009 for Application No. PT/US2008/081258.
International Search Report and Written Opinion dated Jun. 23, 2009 for Application No. PT/US2008/081258.
International Preliminary Report on Patentability dated May 14, 2010 for PCT/US2008/080623.
International Search Report and Written Opinion dated Feb. 10, 2009 for Application No. PT/US2008/080623.
International Preliminary Report on Patentability dated Jan. 14, 2010 for PCT/US2008/065520.
Office Action dated Dec. 11, 2009 for related EP 04103269.9-1242.
Translation of Office Action dated Dec. 6, 2007 for JP 2004-208022.
CN Office Action dated Jan. 8, 2010 for CN Appl. No. 200410069620.7.
EP Search Report dated Feb. 13, 2006 for EP Appl. No. 04103269.9-2215.
JP Notice of Allowace dated Jul. 2, 2008 for JP Appl. No. 2004-208022.

* cited by examiner

CONTROLLED CHARGING AND USE OF POWER SOURCE

BACKGROUND

This description relates to trickle-charging a operating a power converter to both store and efficiently use electrical power supplied from a limited source.

Users of various electrical devices frequently find themselves in the situation of having access to electrical power, but with that power being of limited capacity. Examples are 12 volt accessory power outlets in automobiles and Universal Serial Bus (USB) ports of computers that are able to supply 12V DC and 5V DC power, respectively, but with highly limiting current capacities that limit the types of electrical devices to which they are able to supply power, thereby limiting their usefulness.

SUMMARY

A circuit to supply power to a load incorporates a first power source, a second power source that may be detachable, a power converter and at least one capacitor (capacitive element), where the first power source is capable of powering the load when charged, where the second power source is not capable of powering the load, but the second power source is capable of trickle-charging the first power source at a time when the first power source is not powering the load, where the power converter may impose a limit on a flow of current through the power converter, and where the at least one capacitor may cooperate to temporarily support a flow of additional current that circumvents the power converter at a time when the load attempts to draw a relatively greater amount of current.

In one aspect, the invention features an apparatus that includes a load, a first power source capable of providing the electric power required by the load when at least partially charged, a second power source that is intermittently available, wherein the second power source is unable itself to provide the electric power required by the load, and wherein the second power source is selectively employed to charge the first power source, a capacitive element, and a power converter interposed between a pole of the load and the first and second power sources, imposing a limit on an amount of current permitted to flow through a portion of the power converter to thereby limit an amount of current permitted to flow through the load, causing the capacitive element to charge at a time where the load attempts to draw a relatively small amount of current, causing the capacitive element to discharge at a time where the load attempts to draw a relatively large amount of current such that the load is supplied with the relatively large amount of current as the capacitor discharges, and changing the limit imposed by the power converter in response to receiving a signal indicating an availability of the second power source.

Implementations of the invention may include one or more of the following features. Implementations could include the second power source being detachable, the first power source being coupled to the capacitive element in series or in parallel, wherein the capacitive element may be made up of multiple capacitors coupled in series, parallel or combined in parallel sets coupled in series. Implementations could include a power control to control the charging of the first power source, where the power control may discontinue charging in response to a signal indicating that the load is drawing power. Implementations could include the load changing power requirements in response to either changes in availability of the second power source or changes in the limit imposed by the power converter. Implementations could include the power converter allowing the capacitive element to charge the first power source, where there may be a power control may control the charging of the first power source from the capacitive element and/or the second power source.

In one aspect, the invention features an electronic device that includes an apparatus that includes an amplifier to amplify an audio signal to be output by an acoustic driver, wherein the amplifier changes an amount of power required by the amplifier to amplify the audio signal in response to receiving a signal indicating an availability of electric power to the amplifier; a first power source capable of providing the electric power required by the amplifier when at least partially charged; a second power source that is intermittently available, wherein the second power source is unable itself to provide the electric power required by the amplifier, and wherein the second power source is selectively employed to charge the first power source; a capacitive element; and a power converter interposed between a pole of the amplifier and the first and second power sources, imposing a limit on an amount of current permitted to flow through a portion of the power converter to thereby limit an amount of current permitted to flow through the load, causing the capacitive element to charge at a time where the load attempts to draw a relatively small amount of current, and causing the capacitive element to discharge at a time where the load attempts to draw a relatively large amount of current such that the load is supplied with the relatively large amount of current as the capacitor discharges.

Implementations of the invention may include one or more of the following features. Implementations could further include an audio compressor and/or a gain control. Implementations could include the second power source being detachable and/or the amplifier receiving a signal from the power converter indicating a change in the limit imposed by the power converter.

In one aspect, the invention features a method that includes setting a first limit on an amount of current permitted to flow through a portion of a power converter such that a capacitor is caused to be charged when a load draws a first amount of current through the portion of the power converter and such that the capacitor is caused to be discharged when the load draws a second amount of current through the portion of the power converter; awaiting a signal indicating an availability of a detachable power source; and in response to receiving the signal indicating an availability of a detachable power source, setting a second limit on the amount of current permitted to flow through the portion of the power converter such that the capacitor is caused to be charged when the load draws a third amount of current through the portion of the power converter and such that the capacitor is caused to be discharged when the load draws a fourth amount of current through the portion of the power converter, wherein the second limit is higher than the first limit, wherein the third amount of current is larger than the first amount of current, and wherein the fourth amount of current is larger than the second amount of current.

Implementations of the invention may include one or more of the following features. Implementations could include awaiting a signal indicating the drawing of current by the load, charging a power source in response no indication of the load drawing current, and/or providing power from both the power source and the detachable power source in response to indications of the load drawing current and the detachable power source being available. Implementations could include coordinating the charging of that power supply from the detachable power supply and the capacitive element. Implementations could including changing the amount of current drawn by the load in response to an indication of a change in the limit imposed by the power converter and/or in response to an indication of a change in the availability of the detachable power source.

Other features and advantages of the invention will become apparent from the following description, and from the claims.

DESCRIPTION

Figure 1:
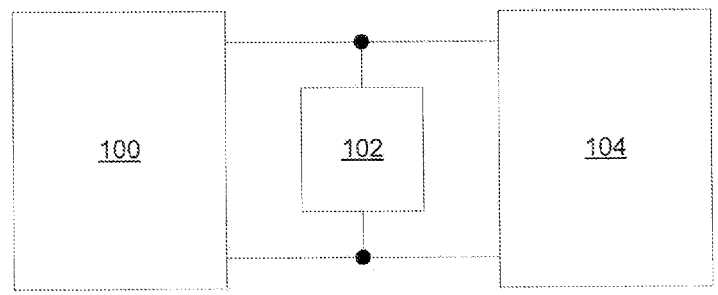
FIG. 1 is a circuit diagram of a power converter in parallel with a capacitive element coupled to a load.

FIG. 1 shows a circuit that includes a power converter 100 in parallel with a capacitive element 102 (e.g., circuitry having an impedance with negative reactance). The power converter 100 and capacitive element 102 are coupled to a load 104 that demands an amount of power $P_L$ based on the input resistance $R_L$ of the load 104. For a load 104 having a variable demand for power (a "variable load"), the input resistance $R_L(t)$ varies as a function of time t. For a power converter 100 that supplies a constant voltage $V_S$, the power $P_L(t)$ supplied to the load 104 is determined by $P_L(t)=V_S^2/R_L(t)$. In steady-state conditions (e.g., $R_L(t)$ is slowly varying with respect to the effective time constant associated with the capacitive element 102), the load 104 draws a current $I_L(t)$ from the power converter 100 that is approximately $I_L(t)=V_S/R_L(t)$.

Some variable loads (e.g., an audio power amplifier or a motor) have a peak power demand that is many times higher than the average power demand. In such cases, a power converter 100 with a controlled current-voltage characteristic, as described in more detail below, is able to supply the average power demanded by the load, while causing a brief demand for a high peak power to be supplied from energy stored in the capacitive element 102. By causing at least some of the peak power to be supplied from the capacitive element 102, the power converter 100 can maintain a relatively low amount of power drawn from a power source such as a battery or AC mains.

Figure 2A:
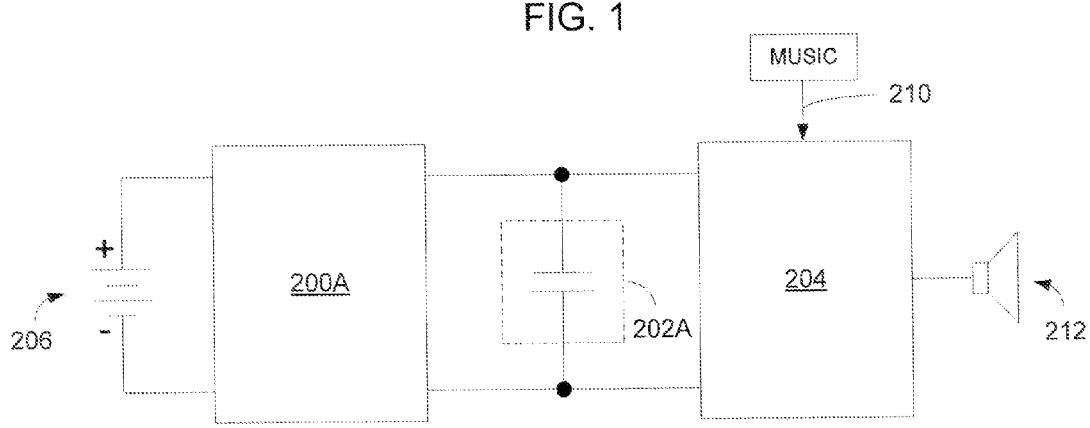
FIG. 2A is a circuit diagram of a DC-DC power converter in parallel with a capacitive element coupled to an audio amplifier.
Figure 2B:
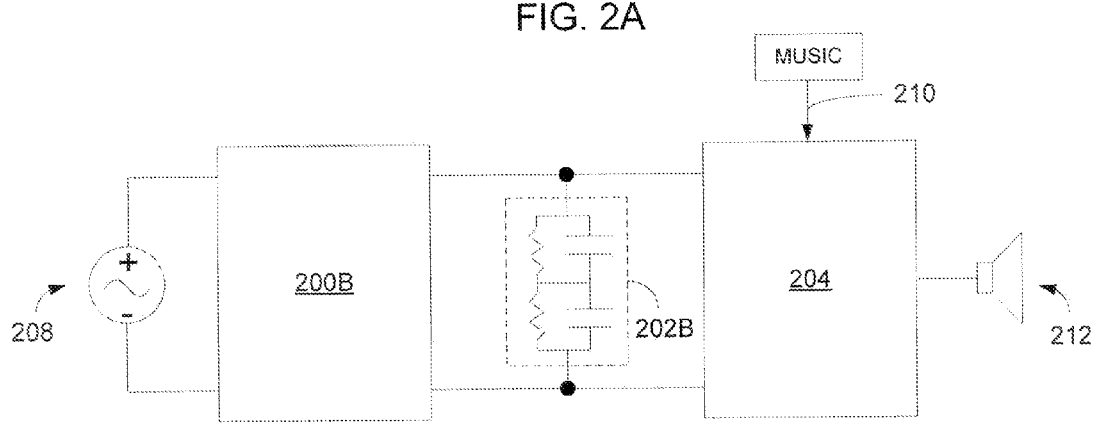
FIG. 2B is a circuit diagram of an AC-DC power converter in parallel with a capacitive element coupled to an audio amplifier.

As shown in FIGS. 2A and 2B, a DC-DC power converter 200A in parallel with a capacitive element 202A can be used to supply power to an audio amplifier 204 from a battery 206 (FIG. 2A), and an AC-DC power converter 200B in parallel with a capacitive element 202B can be used to supply power to the audio amplifier 204 from an AC mains 208 (FIG. 2B). The varying nature of the power demand from the audio amplifier 204 is determined, for example, by a music signal 210 that is amplified to drive a speaker 212. A power converter and capacitive element can be used to supply power to other types of devices or combinations of devices where power demand may vary (e.g., a charging cradle for a cell phone, where the cradle also acts as a powered loudspeaker and many other examples).

The capacitive element 202A can be implemented using a "super capacitor" or "ultra capacitor" (e.g., using aerogel technology) to obtain a capacitance in the range of approximately 1-30 Farads (F) and a maximum voltage of approximately 2.5 V. In another implementation, the capacitive element 202B includes two 10 F/2.5 V capacitors in series, each capacitor having a 5.1 kΩ shunt resistor (e.g., to provide even steady-state charge storage among the capacitors). The resulting capacitance of the capacitive element 202B is 5 F, and the maximum voltage of the capacitive element 202B is 5 V. In other implementations the capacitive element can include three or more capacitors connected in series. Any of a variety of implementations of a capacitive element including 202A, 202B or others may be used in any of a variety of power converter configurations including a DC-DC power converter, an AC-DC power converter or others.

Figure 3A:
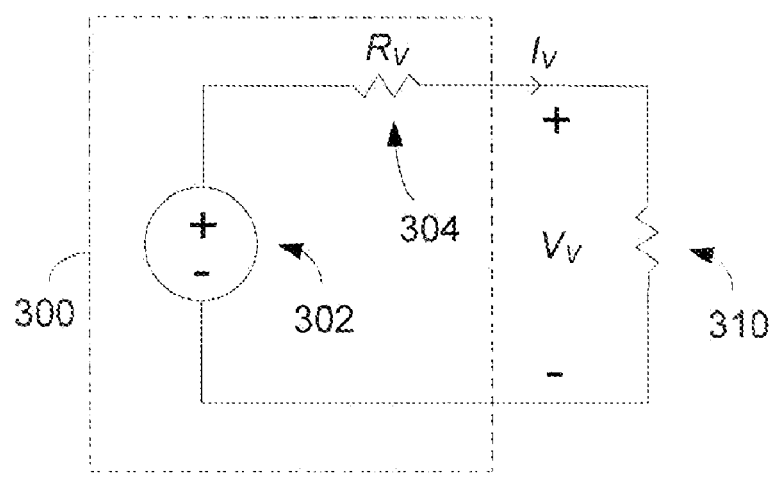
FIG. 3A is a circuit diagram of a voltage source driving a load.
Figure 3B:
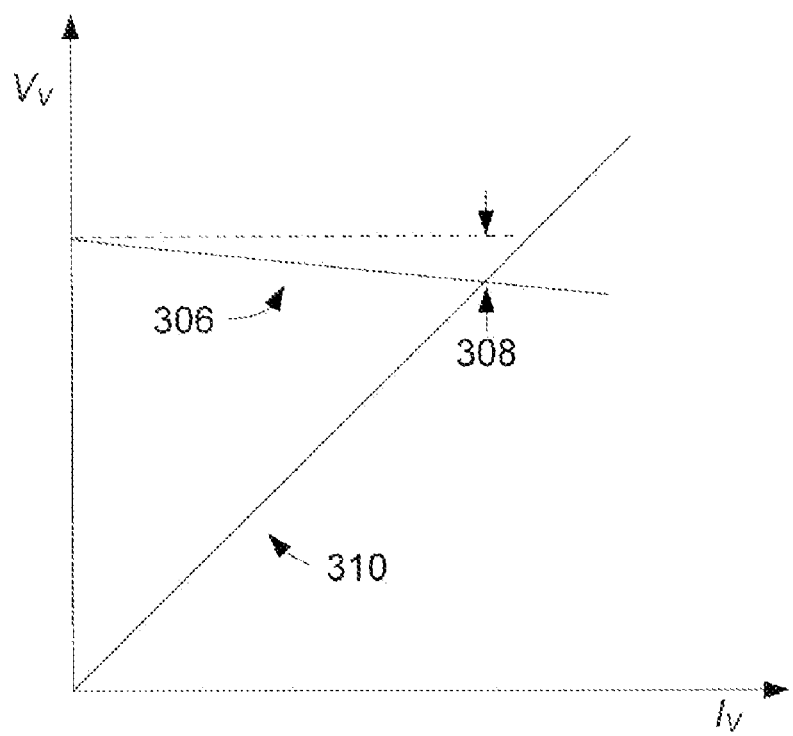
FIG. 3B is a current-voltage characteristic for the circuit of FIG. 3A.

FIG. 3A shows a circuit with a voltage source 300 and a load resistor 310. The voltage source 300 (e.g., a Li-Ion or NiMHd battery) is modeled by an ideal voltage source 302 (of constant voltage $V_0$) in series with a resistor 304 representing the output resistance of the voltage source 300. The current-voltage characteristic 306 for this voltage source 300 is shown in FIG. 3B, along with the "load line" for the load 310 (i.e., the current-voltage characteristic of the load resistor 310). The small output resistance $R_V$ represented by the resistor 304 causes a sag 308 in the output voltage $V_V$ of the voltage source 300 as a function of output current $I_V$. The size of the sag 308 increases as the load resistance $R_L$ (i.e., the slope of the load line) decreases.

Figure 4A:
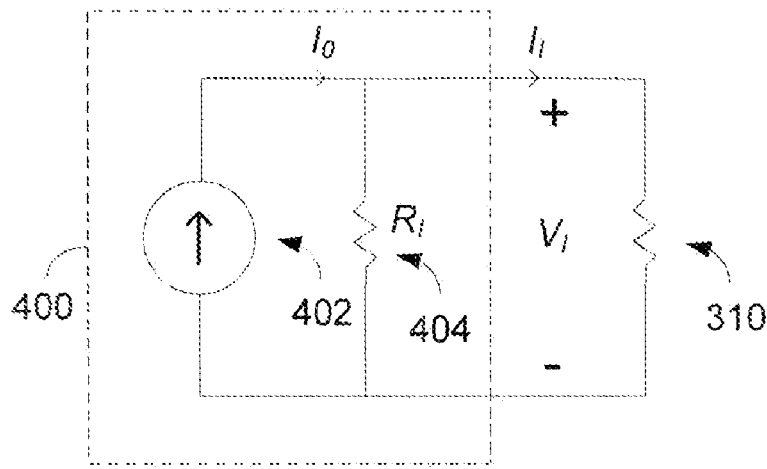
FIGS. 4A and 4C are equivalent circuit diagrams of a current source driving a load.
Figure 4B:
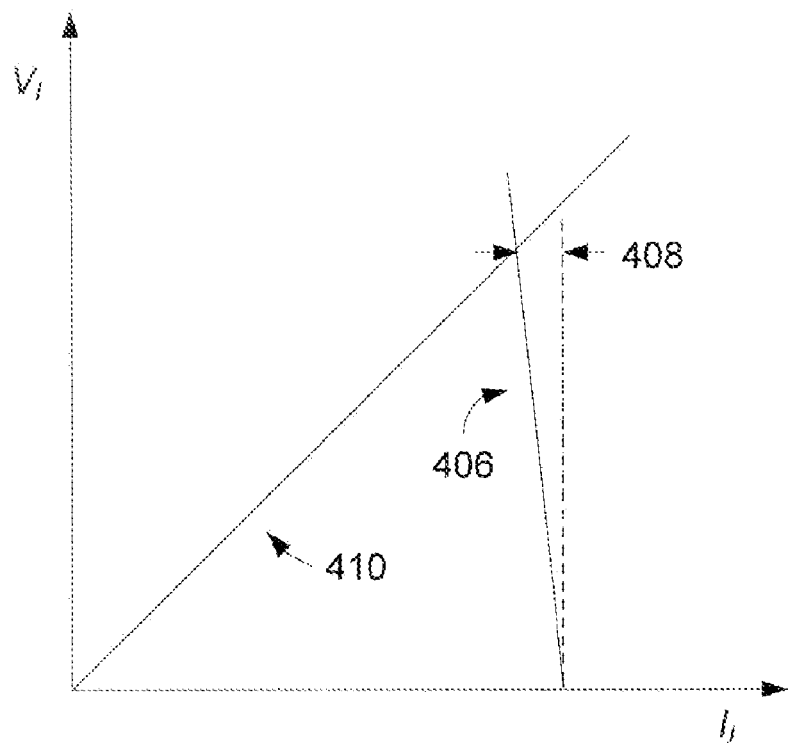
FIG. 4B is current-voltage characteristic for the circuit of FIGS. 4A and 4C.
Figure 4C:
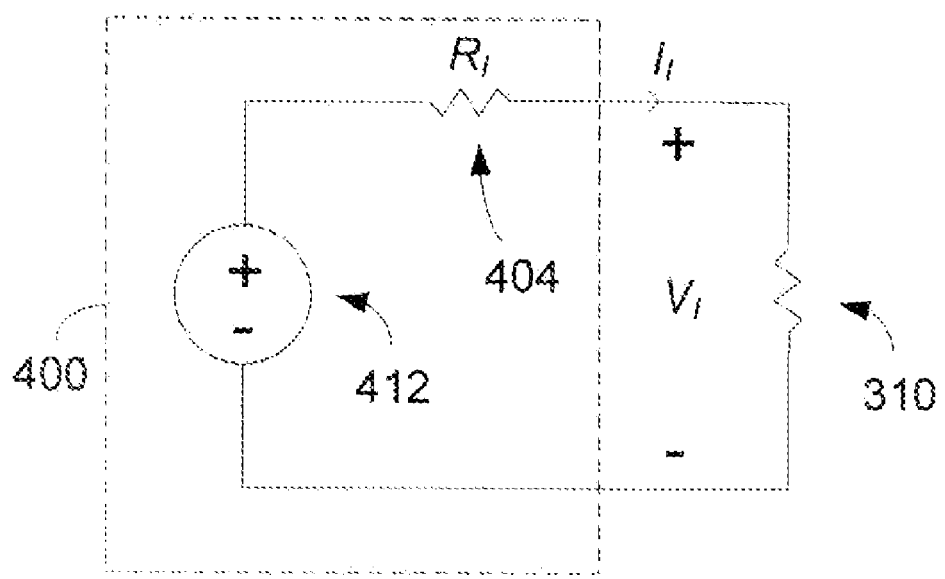

FIG. 4A shows a circuit with a current source 400 and a load resistor 310. The current source 400 is modeled by an ideal current source 402 (of constant current $I_0$) in parallel with a resistor 404 representing the output resistance of the current source 400. The current-voltage characteristic 406 for this current source 400 is shown in FIG. 4B, along with the load line for the load resistor 310. In this case, the large output resistance $R_I$ represented by the resistor 404 causes a sag 408 in the output current $I_I$ of the current source 400 as a function of output voltage $V_I$. The size of the sag 408 increases as the load resistance $R_L$ increases. This current source 400 can equivalently be modeled by an ideal voltage source 412 in series with the resistor 404, where the voltage $V_{EQ}$ of the equivalent ideal voltage source 412 is $V_{EQ}=I_0 R_I$ (FIG. 4C).

Figure 5A:
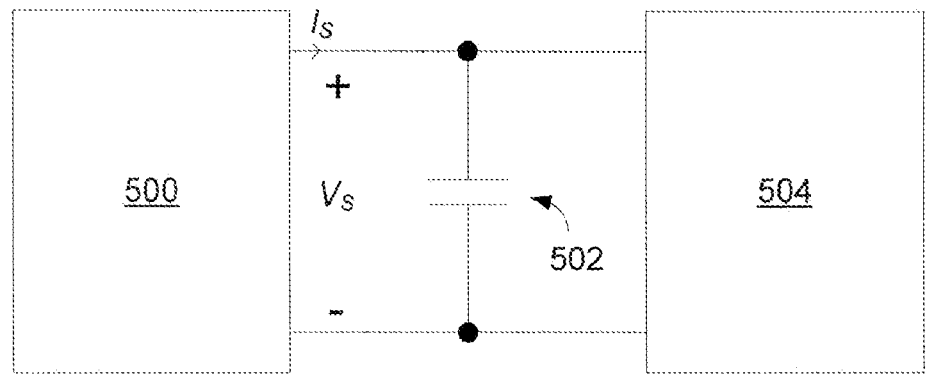
FIG. 5A and 6A are circuit diagrams of a power converter in parallel with a capacitor coupled to a load.
Figure 5B:
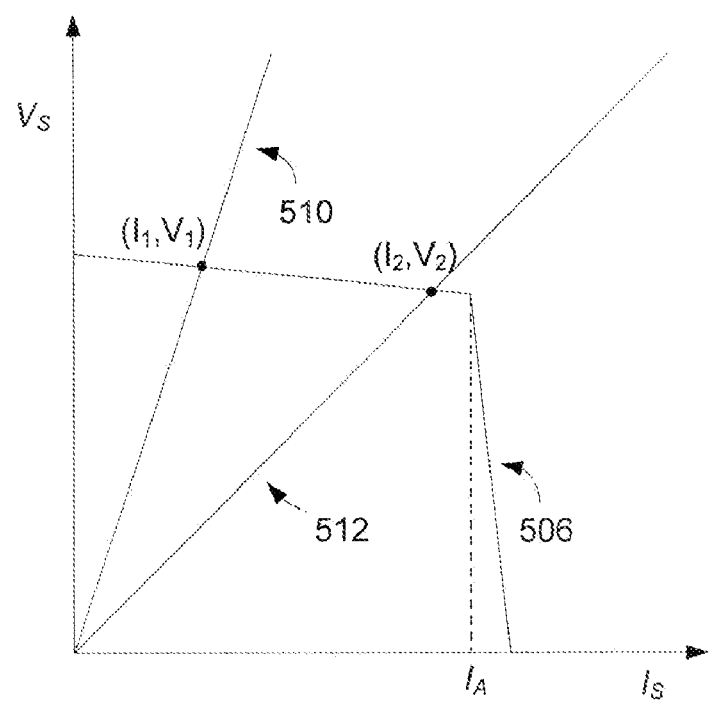
FIGS. 5B and 6B are current-voltage characteristics for the circuits of FIGS. 5A and 6A, respectively.
Figure 5C:
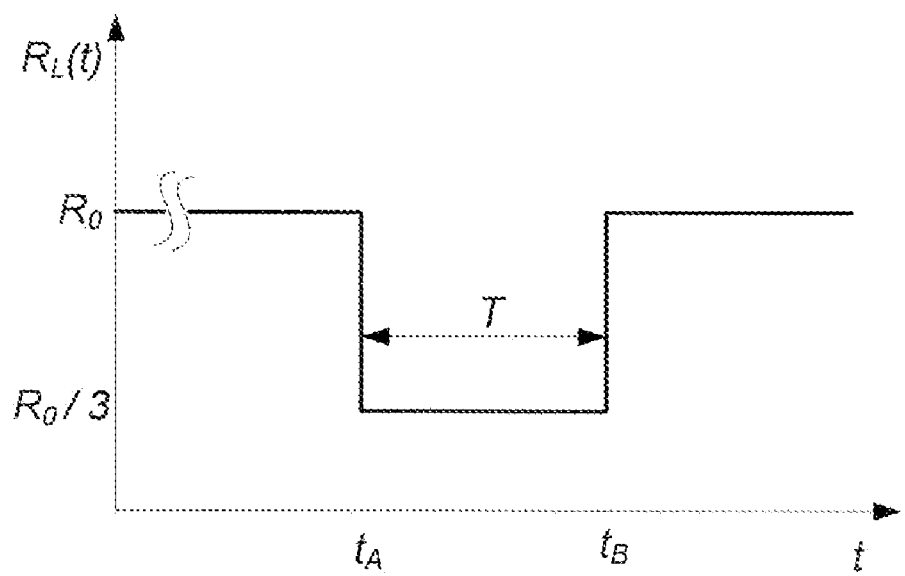
FIGS. 5C and 5D are time plots for circuit variables of the circuit of FIG. 5A.

FIG. 5A shows an example of a power converter 500 in parallel with a capacitor 502. The power converter and the capacitor cooperatively supply power to a variable load 504. In this example, the power converter 500 has a current-voltage characteristic 506 as shown in FIG. 5B. The power converter 500 has the characteristics of the voltage source 300 (e.g., has a low effective output resistance $R_V$) for output current $I_S$ values from 0 to $I_A$ and has the characteristics of the current source 400 (e.g., has a high effective output resistance $R_I$) for output current $I_S$ above $I_A$, limiting the current that can be supplied from the power converter 500. In one example, the variable load 504 temporarily demands more power by dropping an input resistance $R_L(t)$ from a value of $R_0$ (corresponding to a "nominal" load line 510) to a value of $R_0/3$ (corresponding to a "peak" load line 512) for a time period $T=t_A-t_B$, after which the resistance returns to the value $R_0$, as shown in the plot of FIG. 5C.

Figure 5D:
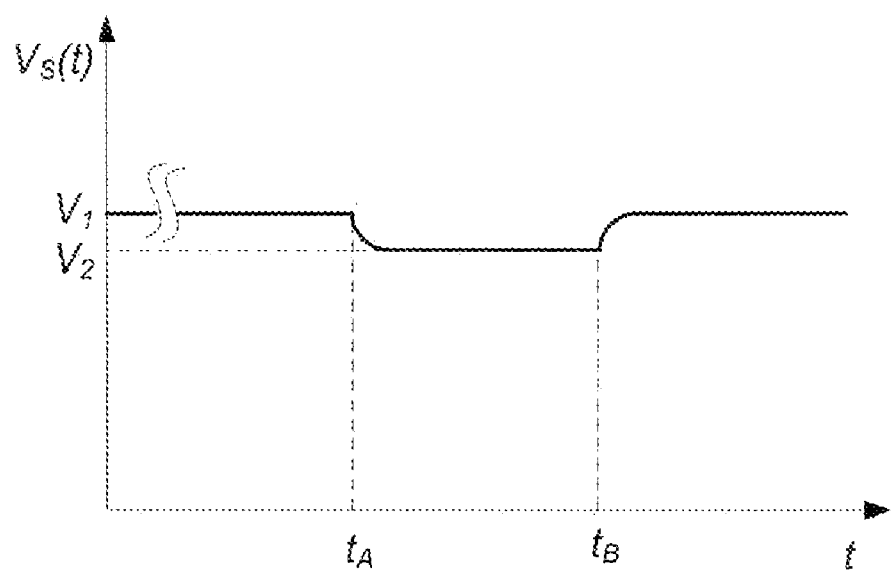

The nominal load line 510 intersects the current-voltage characteristic 506 at a current $I_1$ and a voltage $V_1$. The peak load line 512 intersects the current-voltage characteristic 506 at a current $I_2$ that is larger than $I_1$, and a voltage $V_2$ that is slightly lower than $V_1$. These intersections of the load lines with the current-voltage characteristic 506 give the asymptotic "DC solutions" for current and voltage after transients due to the capacitor 502 decay. The capacitor 502 provides continuity in the change of the capacitor voltage (equal to $V_S(t)$) over time. FIG. 5D shows the voltage $V_S(t)$ across the power converter 500, the capacitor 502, and the variable load 504 as a function of time. After the load resistance drops at time $t_A$, the voltage $V_S(t)$ drops exponentially from $t_A$ and $t_B$ according to:

$$V_S(t)=V_2+(V_1-V_2)\exp(-(t-t_A)/\tau_A),$$

where $\tau_A$ is the effective time constant associated with the capacitor 502 (with capacitance C), which in this example, is $$\tau_A = \left[\frac{1}{CR_V} + \frac{3}{CR_0}\right]^{-1} \approx CR_V$$

since the output resistance $R_V$ of the power converter 500 is much smaller than the input resistance $R_0/3$ of the variable load 504. After time $t_B$, the voltage $V_S(t)$ rises exponentially back to $V_1$ with the same time constant $\tau_A$. The values of other circuit variables between times $t_A$ and $t_B$, such as the capacitor current $I_C(t)$ and the load current $I_L(t)$, are determined from $V_S(t)$ as:

$$I_C(t) = C\frac{dV_S(t)}{dt} \text{ and } I_L(t) = 3\frac{V_S(t)}{R_0}.$$

In this example, the power supplied by the capacitor 502

$$\left(I_C(t)V_S(t) = C\frac{dV_S(t)}{dt}V_S(t)\right)$$

is limited since the capacitor does not discharge deeply when the variable load 504 demands more power. The change in voltage $V_S(t)$ only lasts for a small fraction of the time interval T, causing $$\frac{dV_S(t)}{dt}$$

and thus the power $I_C(t)V_S(t)$ supplied by the capacitor 502 to be limited. To cause the capacitor to discharge deeply (e.g., by more than about 20% and in some examples by more than about 50%) to supply more power to the variable load 504, the current limit can be lowered to correspond to the expected peak demand of the variable load 504 so that the power converter 500 provides a dual-mode capability, as described in the next example (FIGS. 6A-6D).

Figure 6A:
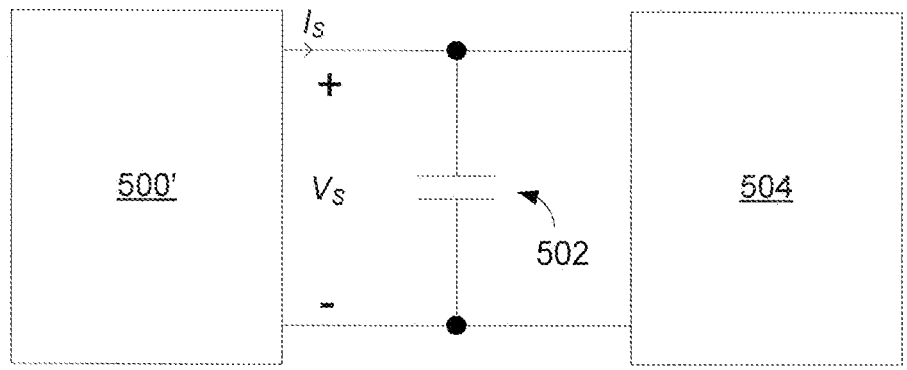
Figure 6B:
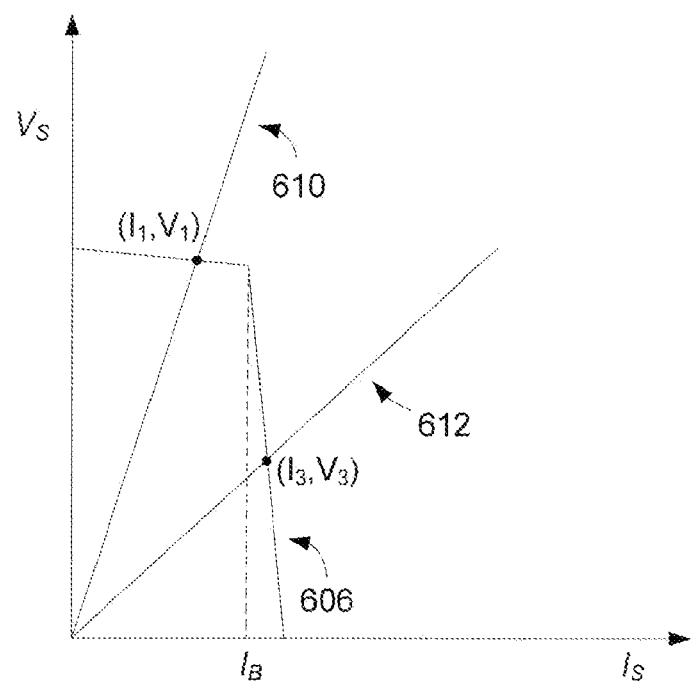

FIG. 6A shows an example of a power converter 500' in parallel with a capacitor 502 cooperatively supplying power to a variable load 504. In this example, the power converter 500' has a current-voltage characteristic 606 as shown in FIG. 6B. The power converter 500' has the characteristics of the voltage source 300 (e.g., has a low effective output resistance) for output current $I_S$ values from 0 to $I_B$ and has the characteristics of the current source 400 (e.g., has a high effective output resistance) for output current $I_S$ above $I_B$. Again, in one example, the variable load 504 temporarily demands more power by dropping an input resistance $R_L(t)$ from a value of $R_0$ (corresponding to a "nominal" load line 610) to a value of $R_0/3$ (corresponding to load line 612) over a time period T, after which the resistance returns to the value $R_0$, as shown in the plot of FIG. 5C.

Figure 6C:
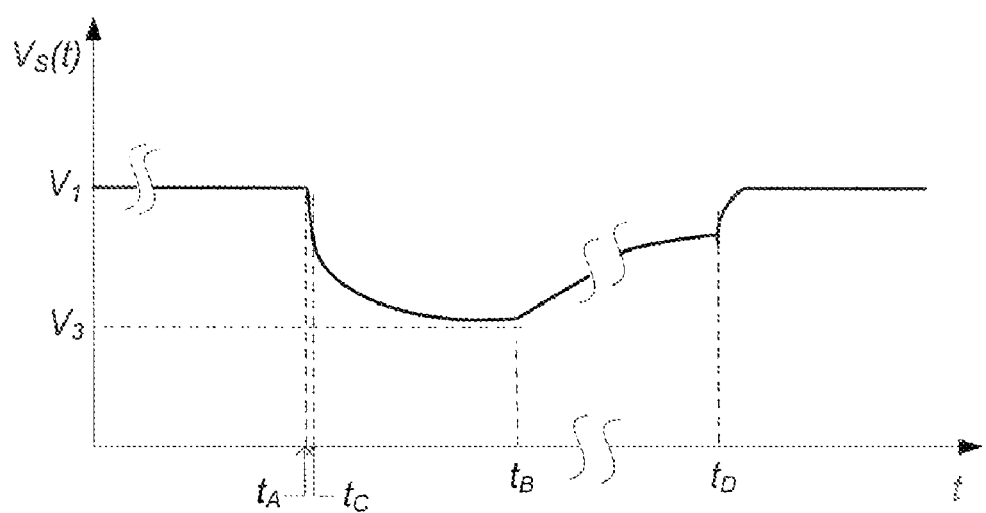
FIG. 6C is a time plot for a circuit variable of the circuit of FIG. 6A.

The nominal load line 610 intersects the current-voltage characteristic 606 at a current $I_1$ and a voltage $V_1$, as in the previous example (FIG. 5B). However, in this example (FIG. 6B), the peak load line 612 intersects the current-voltage characteristic 606 at a current $I_3$ that is larger than $I_1$ but less than $I_2$ and a voltage $V_3$ that is substantially lower than $V_1$ and $V_2$. These intersections of the load lines with the current-voltage characteristic 606 also give the asymptotic DC solutions for current and voltage. FIG. 6C shows the voltage $V_S(t)$ across the power converter 500', the capacitor 502, and the variable load 504 as a function of time. After the load resistance drops at time $t_A$, the voltage $V_S(t)$ drops exponentially from $t_A$ and $t_C$ according to:

$$V_S(t) = V_2 + (V_1 - V_2) \exp(-(t - t_A)/\tau_A).$$

In this example, at $t_C$ the power converter 500' shifts from a "voltage source" (e.g., a low output resistance) mode to a "current source" (e.g., a high output resistance) mode. Accordingly, the voltage $V_S(t)$ drops exponentially from $t_C$ and $t_B$ according to:

$$V_S(t) = V_3 + (V_S(t_C) - V_3) \exp(-(t - t_C)/\tau_B).$$

where $\tau_B$ is the effective time constant associated with the capacitor 502 when the power converter 500 is in the current source mode $$\tau_B = \left[\frac{1}{CR_I} + \frac{3}{CR_0}\right]^{-1} \approx CR_0/3$$

since the output resistance $R_I$ of the power converter 500' in the current source mode is much larger than the input resistance $R_0/3$ of the variable load 504. Since $V_3$ is substantially lower than $V_1$, the capacitor 502 is able to discharge deeply (e.g., by about 50% in this example). After time $t_B$, the voltage $V_S(t)$ rises exponentially back to the voltage $V_S(t_C)$ at which the power converter 500' switches modes with the time constant $$\tau_C = \left[\frac{1}{CR_I} + \frac{1}{CR_0}\right]^{-1} \approx CR_0.$$

time $t_D$, the power converter 500' switches back to the voltage source mode. As in the previous example, the values of other circuit variables between times $t_A$ and $t_B$, such as the capacitor current $I_C(t)$ and the load current $I_L(t)$, are determined from $V_S(t)$ as:

$$I_C(t) = C\frac{dV_S(t)}{dt} \text{ and } I_L(t) = 3\frac{V_S(t)}{R_0}.$$

In this example, the power supplied by the capacitor $$502\left(I_C(t)V_S(t) = C\frac{dV_S(t)}{dt}V_S(t)\right)$$

is larger since the capacitor does discharge deeply when the variable load 504 demands more power. The change in voltage $V_S(t)$ lasts over the entire time interval T, causing $$\frac{dV_S(t)}{dt}$$

and thus the power $I_C(t)V_S(t)$ supplied by the capacitor 502 to be large enough to supply most of the additional power in a brief demand for more power by a variable load.

Figure 6D:
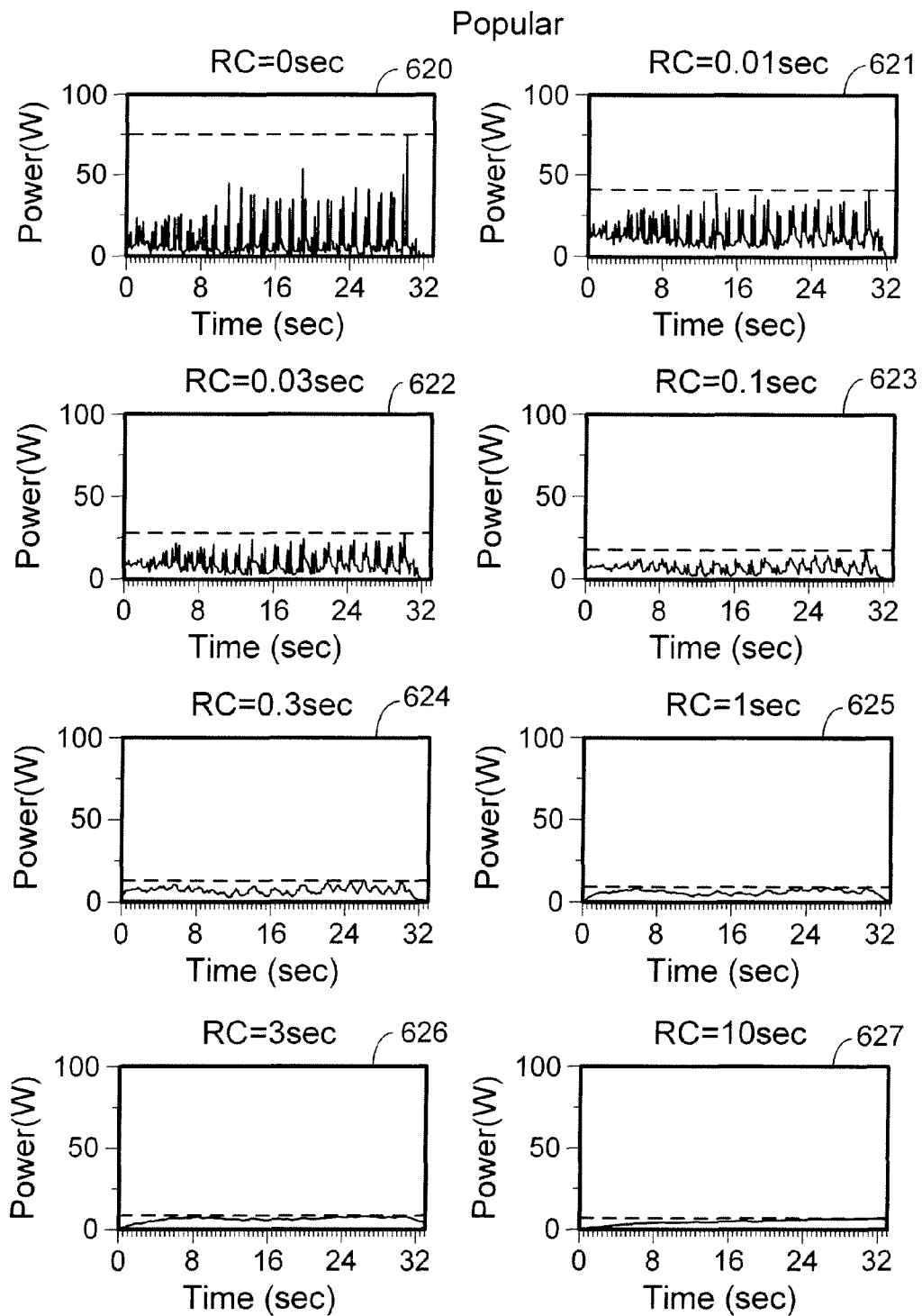
FIGS. 6D-6F are plots of power consumption dynamics for different types of music.
Figure 6E:
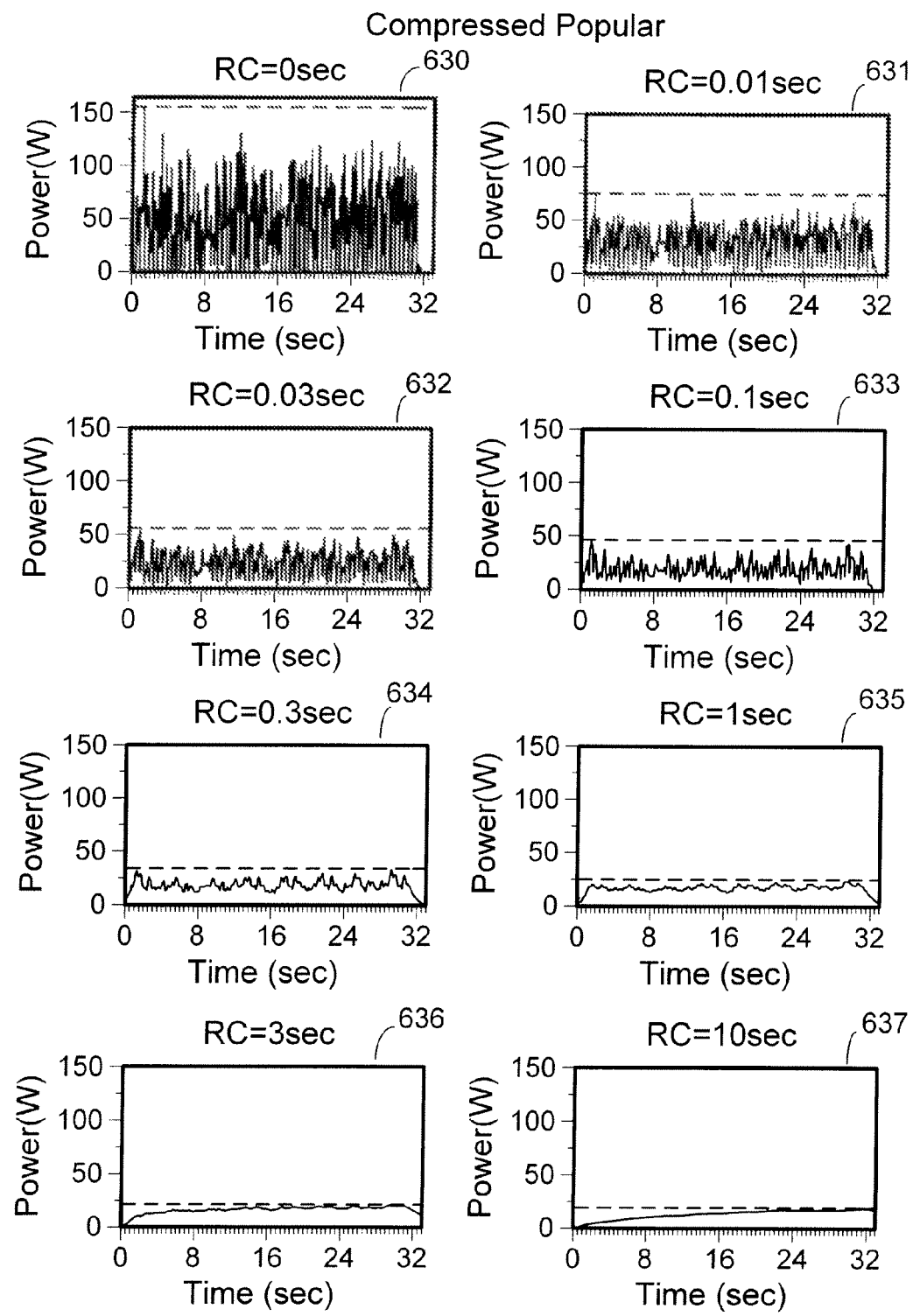
Figure 6F:
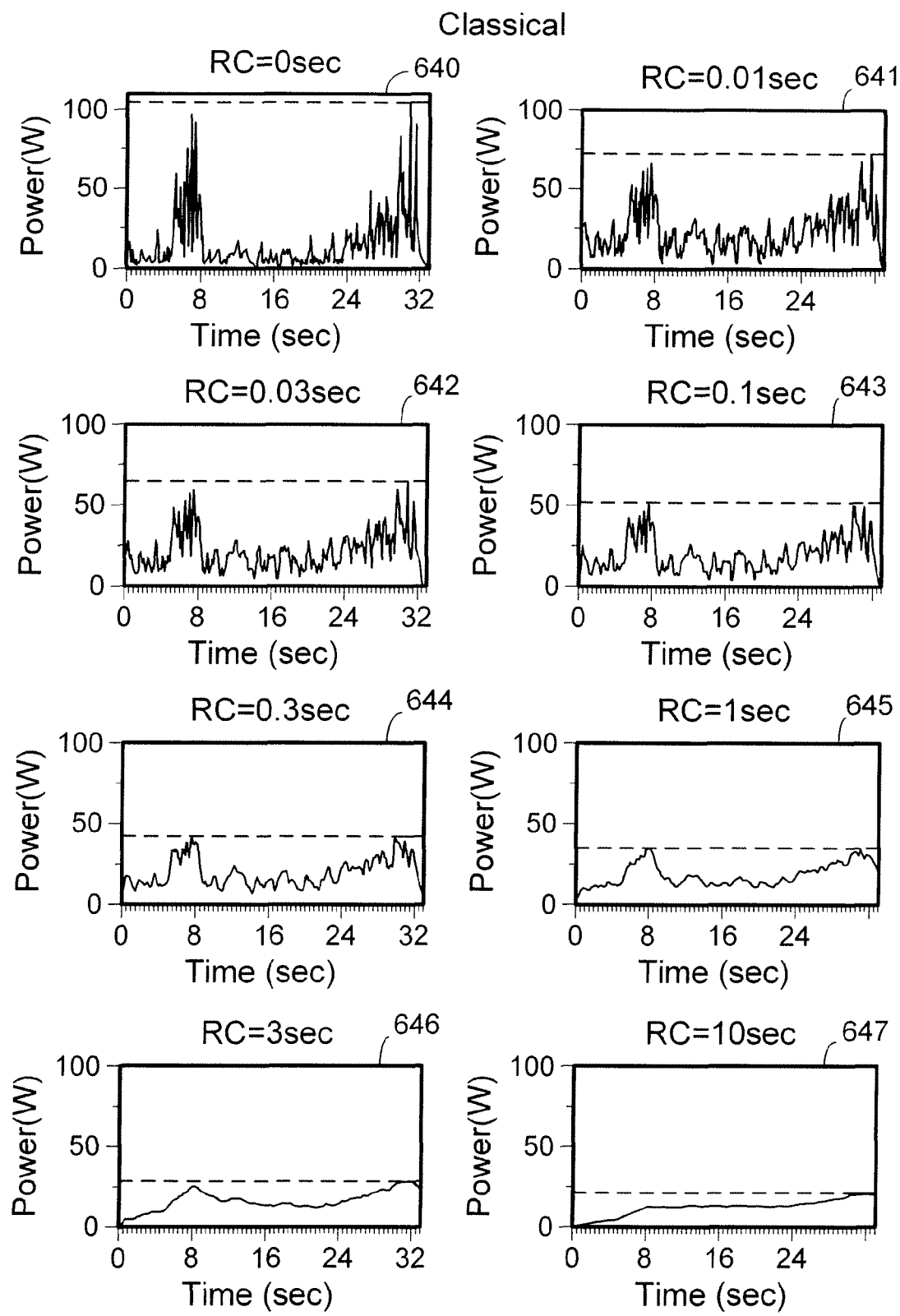

While the demand for more power in these examples is modeled as an instantaneous reduction of input resistance $R_L(t)$ for a time period T, a variable load such as an audio power amplifier may exhibit a continuous change in input resistance $R_L(t)$ with a more complex time dependency having changes that follow time scales present in a music signal (e.g., on the order of milliseconds or as high as tens of seconds) that represent a brief demand for a high peak power. Examples of power consumption dynamics for different types of music are shown in FIGS. 6D-6F. The plots shown in FIGS. 6D-6F are based on a simulated typical audio system, incorporating power converter control as described herein, playing exemplary music passages of different music types.

FIG. 6D shows plots 620-627 of residual power drawn from a power source to play an exemplary passage of uncompressed popular music (after the power converter causes some of the power to be supplied from a capacitive element) as a function of time for different values of the effective time constant $\tau$ of the capacitive element during a peak power demand (e.g., $\tau = R_{Lp}C$ where C is the effective capacitance of the capacitive element 102 and $R_{Lp}$ is the resistance of the amplifier at peak power demand). In each plot, the vertical axis gives instantaneous residual power drawn from the power source in Watts, and the horizontal axis gives time in seconds. Each of the plots 620-627 corresponds to a different time constant labeled as "RC." The peak residual power for each plot is shown as a dotted line. In this example, peak residual power is progressively reduced from about 40 W (plot 621) to about 7 W (plot 627) when RC is increased from 0.01 seconds (plot 621) to 10 seconds (plot 627). For comparison, plot 620 shows the power without a capacitive element (or RC=0).

FIG. 6E shows similar plots 630-637 for an exemplary passage of compressed popular music. In this example, peak residual power is reduced from about 70 W (plot 631) to about 20 W (plot 637) when RC is increased from 0.01 seconds (plot 631) to 10 seconds (plot 637).

FIG. 6F shows similar plots 640-647 for an exemplary passage of classical music. In this example, peak residual power is reduced from about 67 W (plot 641) to about 20 W (plot 647) when RC is increased from 0.01 seconds (plot 641) to 10 seconds (plot 647).

These plots in FIGS. 6D-6F demonstrate the difference in power dynamics of various types of music: the uncompressed popular music passage has a lot of strong spikes of a relatively short duration (e.g., about 1-100 ms), the compressed popular music passage has on average about a 12 dB lower peak-to-average (PTA) power ratio (or "crest factor"), while the classical music passage exhibits periods of very loud passages which may last, for example, for many seconds or tens of seconds.

Figure 7A:
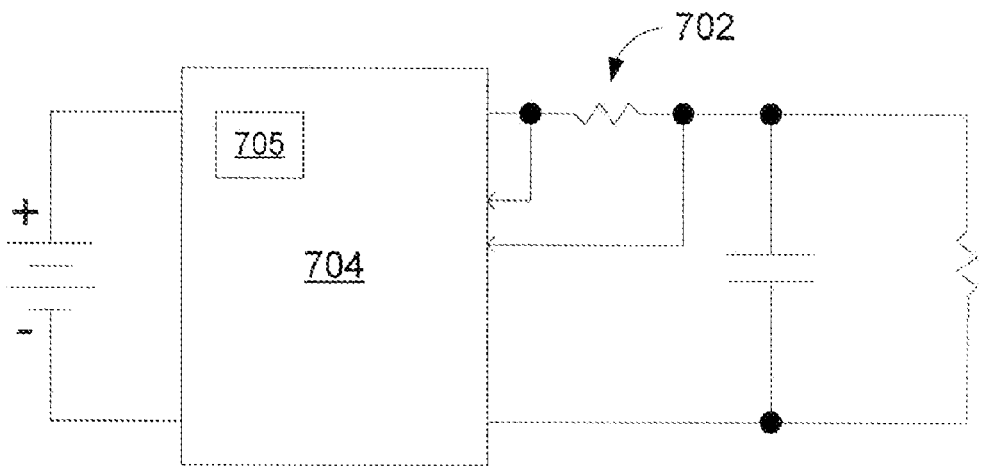
FIGS. 7A-7D are circuit diagrams showing different sensing techniques.
Figure 7B:
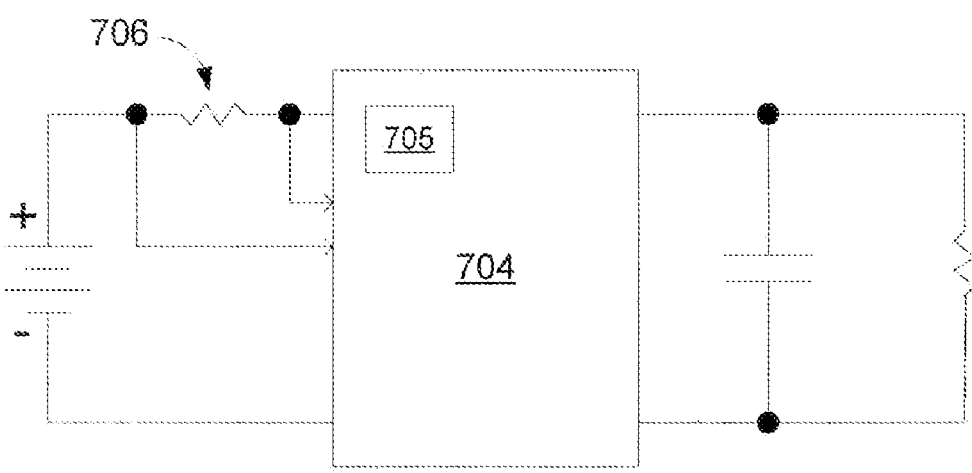
Figure 7C:
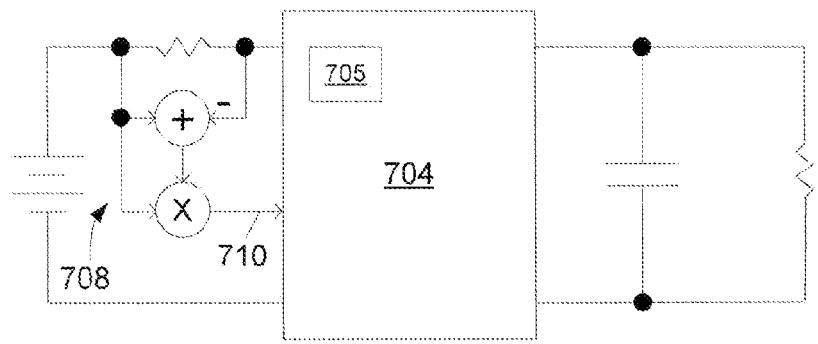

As shown in FIGS. 7A-7C, the DC-DC power converter 200A (FIG. 2A) can use any of a variety of parameters to implement the dual-mode capabilities described above. For example, the circuit in FIG. 7A includes a resistor 702 for sensing the output current of a switching power supply 704. The voltage across the resistor 702 is fed back to the switching power supply 704 and used to control the output voltage according to a desired current-voltage characteristic. In another example, the circuit in FIG. 7B includes a resistor 706 for sensing the input current of the switching power supply 704 for achieving a desired current-voltage characteristic. In another example, the circuit in FIG. 7C includes circuitry 708 for sensing the input power of the switching power supply 704. The circuitry 708 generates a voltage 710 that is the product of the input voltage and a voltage proportional to the input current, and is therefore proportional to the input power. When the input power is below a threshold power level the power supply 704 operates according to a current-voltage characteristic of a first mode, and when the input power is above the threshold power level the power supply 704 operates according to a current-voltage characteristic of a second mode. Other parameters can be used to control the current-voltage characteristic of the switching power supply 704. The power supply 704 includes a control module 705 to switch modes based on the sensed parameter. One possible implementation of such a control module is described in more detail below (e.g., control module 814 in FIG. 8).

In order to achieve high system efficiency, there should be negligible loss in the power converter 200A. The switching power supply 704 can use any of a variety of low-loss conversion techniques (e.g., a boost converter, a buck converter, a flyback converter, or a single-ended primary inductance converter).

Figure 7D:
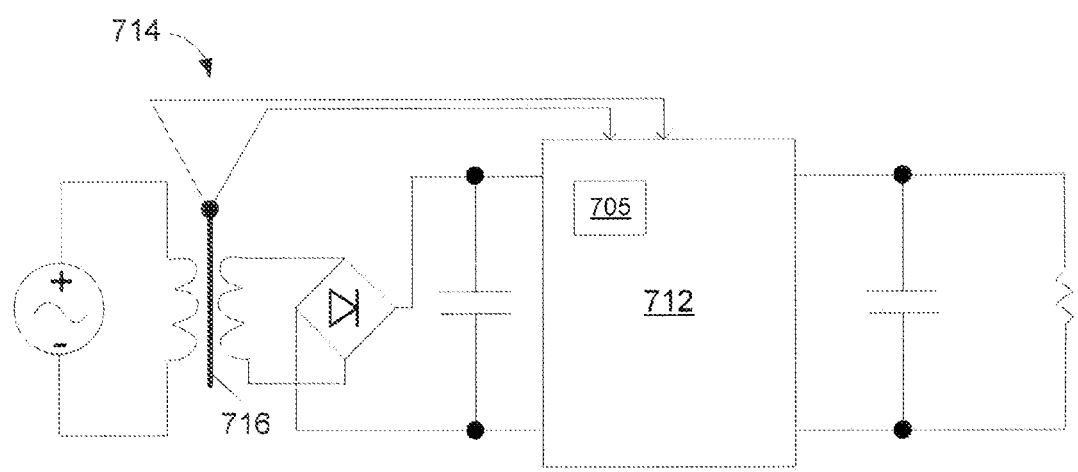

Similarly, the AC-DC power converter 200B (FIG. 2B) can use any of a variety of parameters to implement the dual-mode capabilities described above. The AC-DC power converter 200B can use techniques similar to those described above. Alternatively, as shown in FIG. 7D, an AC-DC converter 712 includes circuitry 714 for sensing the temperature of the AC transformer core 716. The AC-DC converter 712 switches between different current-voltage characteristics (i.e., different modes) based on comparing the sensed temperature to a threshold temperature. In some implementations temperature may optionally be used in conjunction with other control parameters (e.g., output current, input power, input current, etc.). In some implementations temperature modifies the current-voltage characteristic (e.g., by making $I_B$ a function of temperature). Other parameters can be used to control the current-voltage characteristic of the switching converter 712. The converter 712 also includes a control module 705 to switch modes based on the sensed parameter.

In some implementations, the trigger condition that causes the control module 705 to switch modes is programmable (e.g., by programming the trigger condition into a microprocessor). For example, the converter 712 senses various circuit parameters (e.g., input power, output current, temperature, etc.) and the circuit parameter that is used by the control module 705 to switch modes is programmable. Alternatively, the value of a circuit parameter that triggers a change in modes can be programmable.

Figure 8:
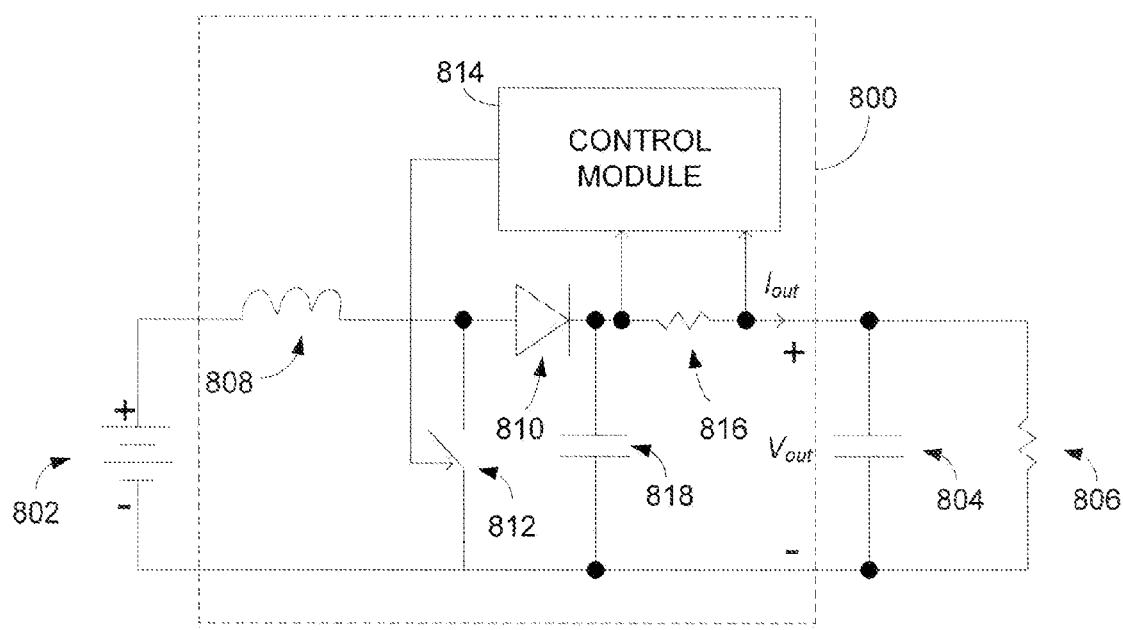
FIG. 8 is a circuit diagram for an implementation of the sensing technique of FIG. 7A.

FIG. 8 shows a Boost type power converter circuit 800 implementing the sensing technique of FIG. 7A. The input of the circuit 800 is connected to a battery 802 with voltage $V_B$ and the output of the circuit 800 is coupled to a capacitor 804 in parallel with a variable load 806. The circuit 800 includes an inductor 808, a diode 810, and a switch 812 that is controlled by a control module 814 based on the output current $I_{out}(t)$ in a sensing resistor 816. The circuit 800 also includes a capacitor 818 with a relatively small capacitance to filter out much of the switching frequency, and reduce ripple on the output voltage. In some implementations, the control module 814 includes a microprocessor for controlling the switch operation as a function of sensed output current. The resistance $R_S$ of the sensing resistor 816 is small compared to the load resistance $R_L(t)$.

Figure 9:
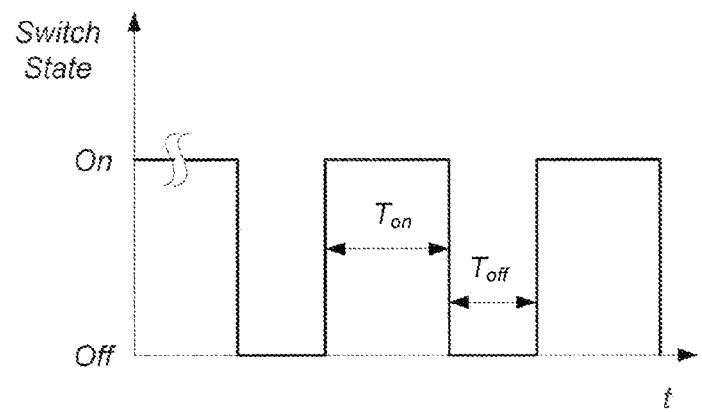
FIG. 9 is a plot of a converter switch operation as a function of time.

Since the circuit 800 is a Boost type, the output voltage $V_{out}(t)$ is higher than the constant input voltage $V_B$. The output voltage is determined by the duty cycle D of the opening and closing of the switch 812. As shown in FIG. 9, the switch 812 is closed for a time $T_{on}$ and open for a time $T_{off}$, so the duty cycle is $D=T_{on}/(T_{on}+T_{off})$. The output voltage $V_{out}(t)$ in steady-state conditions (and neglecting losses in the inductor 808 and the diode 810) is:

$$V_{out}(t)=V_B/(1-D). \tag{1}$$

When the control module 814 senses an output current $I_{out}(t)$ less than a threshold current $I_{th}$, the control module 814 sets the circuit 800 to a voltage source mode. In the voltage source mode, the target output voltage is approximately constant $V_{out}(t)=V_0$. To generate this voltage, the control module 814 sets the duty cycle D to:

$$D=D_0=1-V_B/V_0 \tag{2}$$

When the control module 814 senses an output current $I_{out}(t)$ greater than the threshold current $I_{th}$, the control module 814 sets the circuit 800 to a current source mode. In the current source mode the, the target output voltage varies with output current according to a target current-voltage characteristic:

$$V_{out}(t)=V_0-(I_{out}(t)-I_{th})R_{out}, \tag{3}$$

where $R_{out}$ is a simulated output resistance parameter for the circuit 800 that is controlled by the control module 814. To implement a high output impedance source, the control module 814 selects a large value of $R_{out}$ (e.g., $R_{out} \gg R_L(t)$). The value of $R_{out}$ may be constant, or alternatively, the value of $R_{out}$ may vary with sensed output current $I_{out}(t)$. Equations (1)-(3) yield the following value of duty cycle D that the control module 814 uses to control the switch 812 in response to the sensed output current $I_{out}(t)$ in the current source mode:

$$D = D_0 + \frac{1-D_0}{1 - V_B/[(I_{out}(t)-I_{th})R_{out}(1-D_0)]} \tag{4}$$

A control module using other control parameters can be implemented in a similar way. For example, the duty cycle of a Boost type or other type of switching power converter can be a function of input power when the input power crosses a threshold value.

Figure 10A:
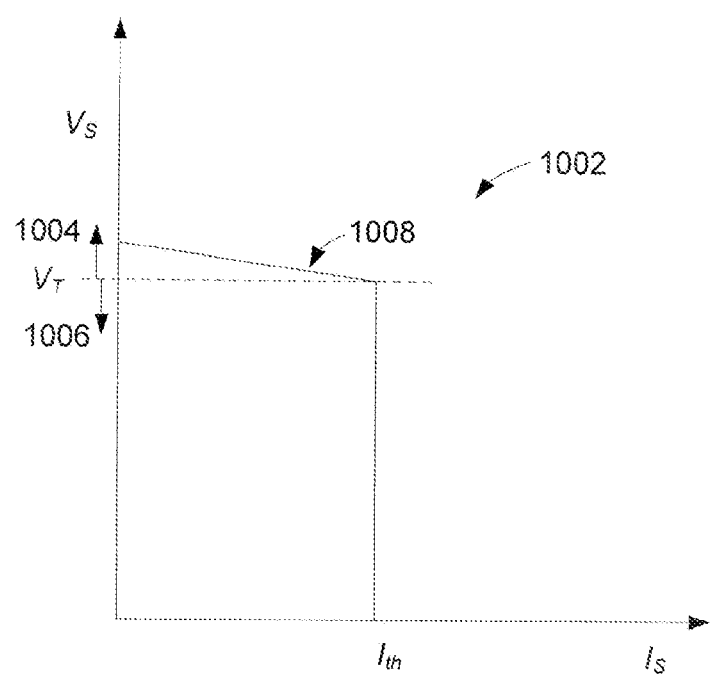
FIGS. 10A and 10B are exemplary current-voltage characteristics.
Figure 10B:
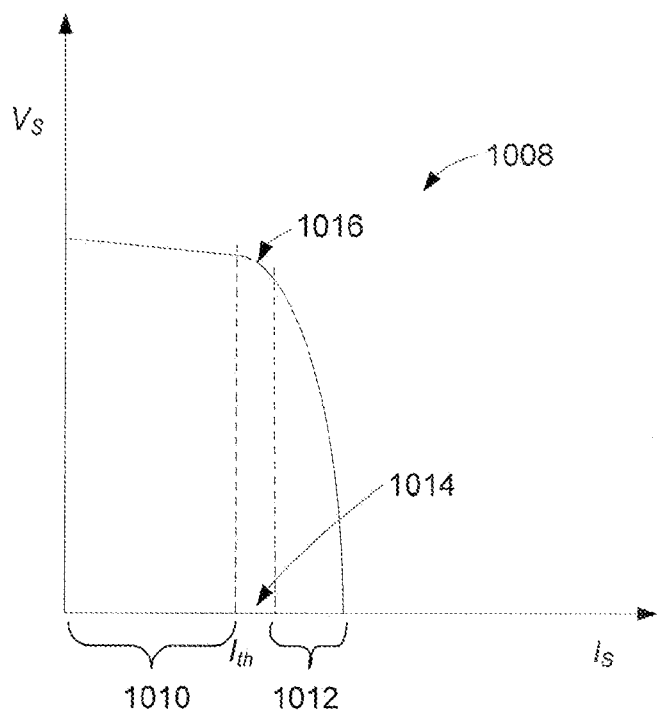

FIGS. 10A and 10B show exemplary current-voltage characteristics for a power converter that can be used to cause a capacitive element to discharge deeply to supply more power to a variable load. In FIG. 10A, the characteristic 1002 has a first mode 1004 characterized by a shallow slope of the voltage versus current plot, and a second mode 1006 in which the current $I_S$ is limited to a maximum current $I_{th}$ for voltages $V_S$ below a transition voltage $V_T$. For example, in the implementation of FIG. 8, the first mode 1004 may be achieved by setting $R_{out}$ in Equation (4) to small value for $I_S$ values less than $I_{th}$ and the second mode 1006 may be achieved by setting $R_{out}$ in Equation (4) to a large value for $I_S$ values equal to or greater than $I_{th}$.

In FIG. 10B, the characteristic 1008 has a first mode 1010 characterized by a shallow slope of the voltage versus current plot, and a second mode 1012 characterized by a steep slope of the voltage versus current plot. Between the first and second modes, the characteristic 1008 has a "transition zone" 1014 that has a "knee" 1016 in the voltage versus current plot. For example, in the implementation of FIG. 8, the first mode 1010 may be achieved by setting $R_{out}$ in Equation (4) to a small value for $I_S$ values less than $I_{th}$. The transition zone 1014 and second mode 1012 may be achieved by setting $R_{out}$ in Equation (4) to an increasing value as a function of $I_S$ for $I_S$ values equal to or greater than $I_{th}$. In one implementation, the value of D in Equation (4) can be controlled using a programmable device (e.g., a microprocessor). In this implementation, the value of $R_{out}$ in Equation (4) can be controlled (as a function of $I_S$) in software, for example, using a look-up table or a polynomial curve fit.

Other features of a current-voltage characteristic can be controlled in various implementations. For example, the transition between modes and the slope of the voltage versus current plot can be selected to ensure a minimum operating voltage (e.g., for an audio amplifier) is maintained for a given peak demand (e.g., minimum load resistance). The transition between modes can optionally be tunable.

Figure 10C:
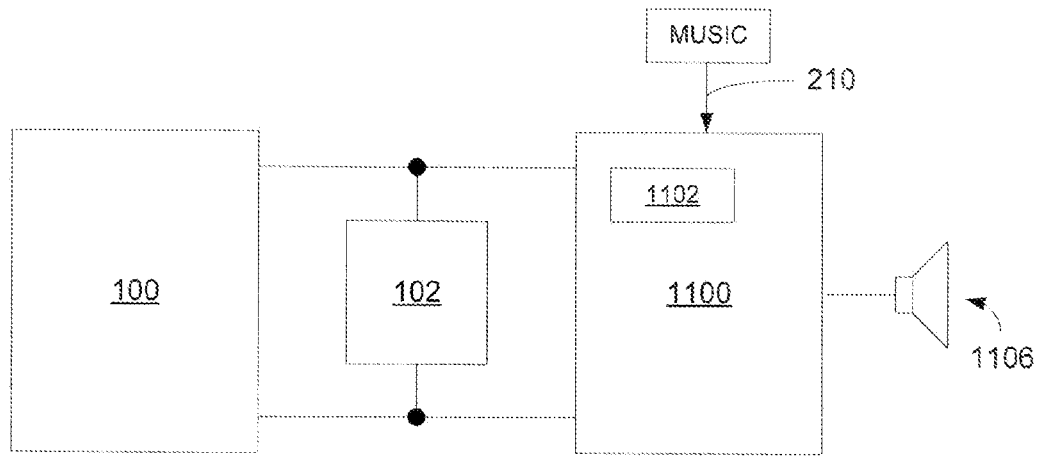
FIGS. 10C and 10D are examples including an audio amplifier with gain that depends on the power converter behavior.
Figure 10D:
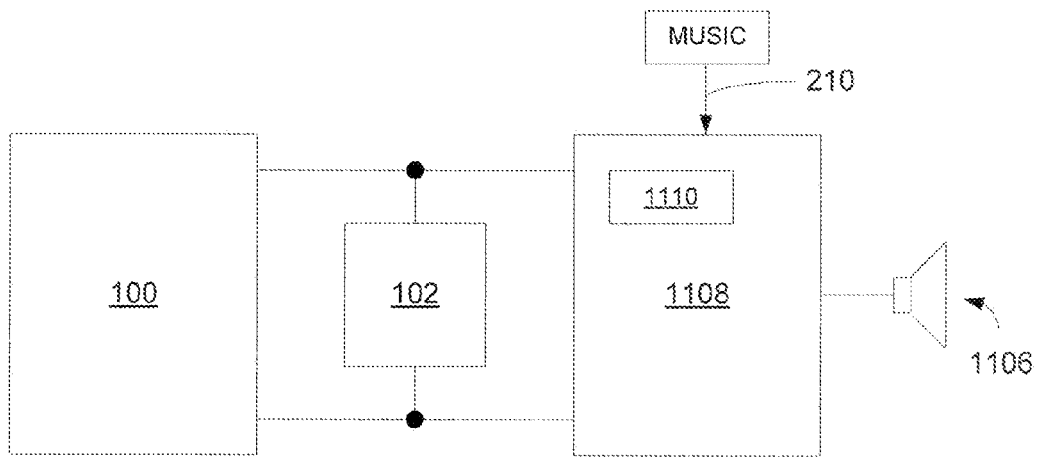

For a power converter that supplies power to an audio amplifier (e.g., power converter 200A or 200B), features of the audio amplifier can be dependent on the power converter behavior. For example, when the voltage supplied by the power converter drops (e.g., after switching to the current supply mode) the gain of the audio amplifier can be reduced to avoid distortion in the music signal 210 at the amplifier or speaker (e.g., due to signal clipping). In one implementation, shown in FIG. 10C, an audio amplifier 1100 includes a compressor 1102 with a threshold that scales with the voltage supplied by the power converter 100 and capacitive element 102. This variable-threshold compressor 1102 reduces distortion of music played over a speaker 1106. In another implementation, shown in FIG. 10D, an audio amplifier 1108 includes a variable gain circuit 1110 that reduces the gain as the voltage $V_S(t)$ supplied by the power converter 100 and capacitive element 102 reduces, according to a predetermined function. These or other techniques (e.g., a system with any kind of wide-band or multi-band amplitude compressor) can be used to reduce the likelihood of signal clipping at any power converter voltage above a given minimum operating voltage. A compressor could operate based on the voltage supplied by the power converter and capacitor, or on other parameters such as power transformer temperature, loudspeaker temperature, loudspeaker displacement, or any other parameter indicative of an amplified signal level.

By causing some of an increased demand for power to be supplied from a capacitive element, the residual peak power demanded from a source is reduced. The amount of reduction in residual peak power demand depends on the effective time constant τ and on the type of music that is being amplified. One characteristic of the music that affects the reduction in residual peak power demand is the PTA power ratio. Music with a high PTA power ratio (e.g., uncompressed popular music) is more affected by the integrating effect of a large time constant than music with a low PTA power ratio (e.g., broadcast AM music).

Figure 11:
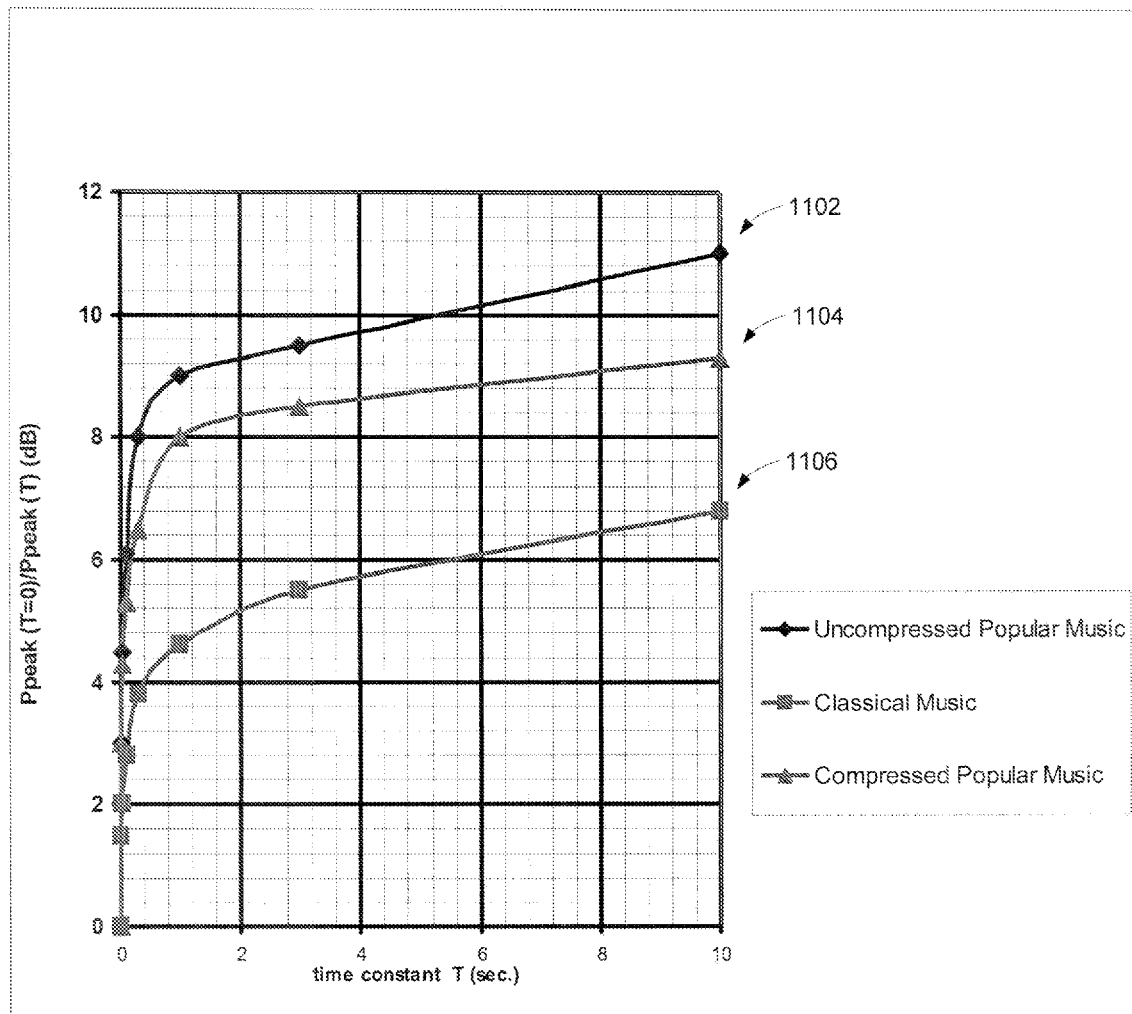
FIG. 11 is a plot of reduction in peak power demand versus effective time constant for different types of music.

FIG. 11 shows semi-log plots of the reduction R in peak power demand due to the capacitive element (in dB) versus the effective time constant τ (in seconds) for three different types of music: uncompressed popular music (plot 1102), compressed popular music (plot 1104), and classical music (plot 1106). The reduction in peak power demand R is quantified as the ratio between peak power for a power converter having a time constant of zero to peak power for a power converter having the given effective time constant τ, $R=P_{peak}(\tau=0)/P_{peak}(\tau)$. These empirically derived plots demonstrate that the uncompressed popular music used in this example, due to its high PTA power ratio and relatively short duration of the amplitude spikes is the most affected by effective time constant τ of the power converter. For example, for τ~5.5 seconds (FIG. 11, plot 1102), the reduction of the residual peak power demand is 10 dB (or 10 times).

On another end—compressed popular music (e.g., FM or AM broadcast type) has a much lower PTA power ratio (in order to sound louder on average), so the effects of the effective time constant τ are less pronounced. For example, for the same time constant τ~5.5 seconds (FIG. 11, plot 1104) the reduction of the residual peak power demand is 8.7 dB (or 7.5 times).

Classical music typically has PTA power ratio in between that of compressed and uncompressed popular music, but much longer duration of the amplitude spikes. Therefore, the classical music used in this example is affected by the effective time constant of the power supply the least. For example, for the same time constant τ~5.5 sec (FIG. 11, plot 1106) the reduction of the residual peak power demand is only 6 dB (or 4 times).

Another way to look at FIG. 11 is that a system having a power source with limited power capabilities is able to play louder by using a capacitive element to provide some of the peak power demand. From the example above for uncompressed popular music with τ~5.5 seconds, the available peak power for playing the music will be 10 dB higher from a system that causes peak power to be supplied from a capacitive element than from a system that does not.

Figure 12:
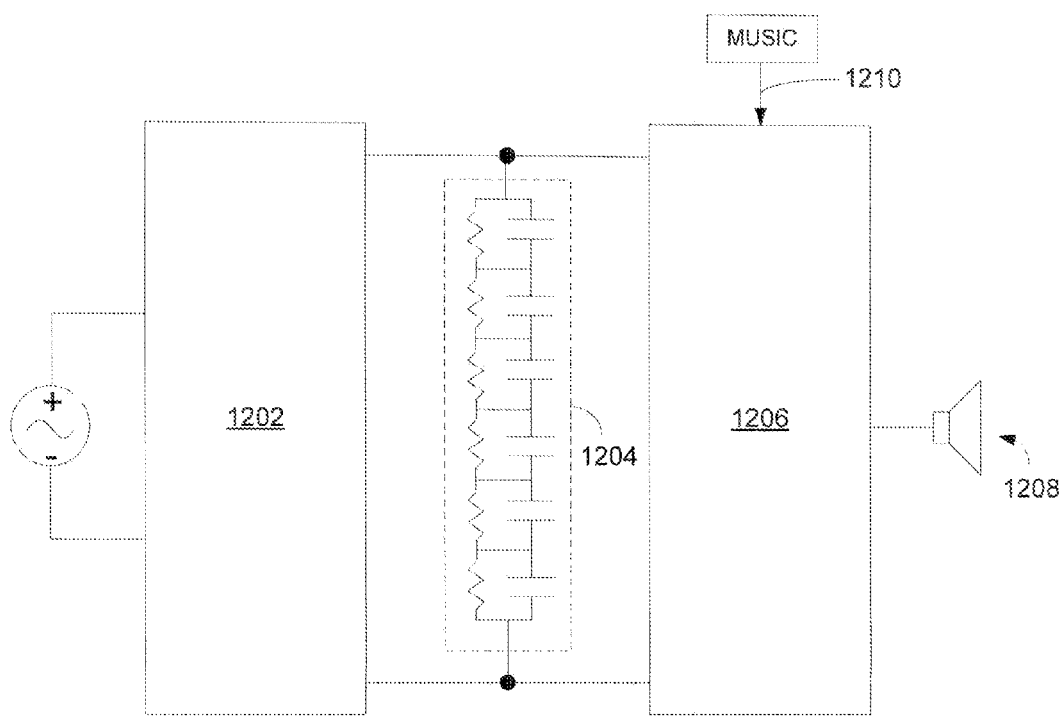
FIGS. 12-14 are circuit diagrams for implementations of a power converter in parallel with a capacitive element coupled to an audio amplifier.

In one implementation shown in FIG. 12, a power supply 1202 (a Hewlett Packard model 6253A DC power supply) powered from an AC mains is connected in parallel with a capacitive element 1204 consisting of six 33 F/2.5 V aerogel super capacitors in series, each capacitor having a 5.1 kΩ shunt resistor, providing a total capacitance of 5.5 F and a maximum voltage of 15 V. The power supply 1202 and capacitive element 1204 power a switching audio amplifier 1206 (a Bose 100W switching audio amplifier, Bose Corporation) driving a speaker 1208. A music signal 1210 is input into amplifier 1206. When the power supply 1202 had an output current limit set to approximately 3.2 A and a nominal output voltage (i.e., with no load) set to 15 V (for a maximum output power of 48 W), the power supply 1202 and capacitive element 1204 together provided a peak power of 98.7 W to the amplifier 1206 with the output voltage staying above 9 V for all music tested.

Figure 13:
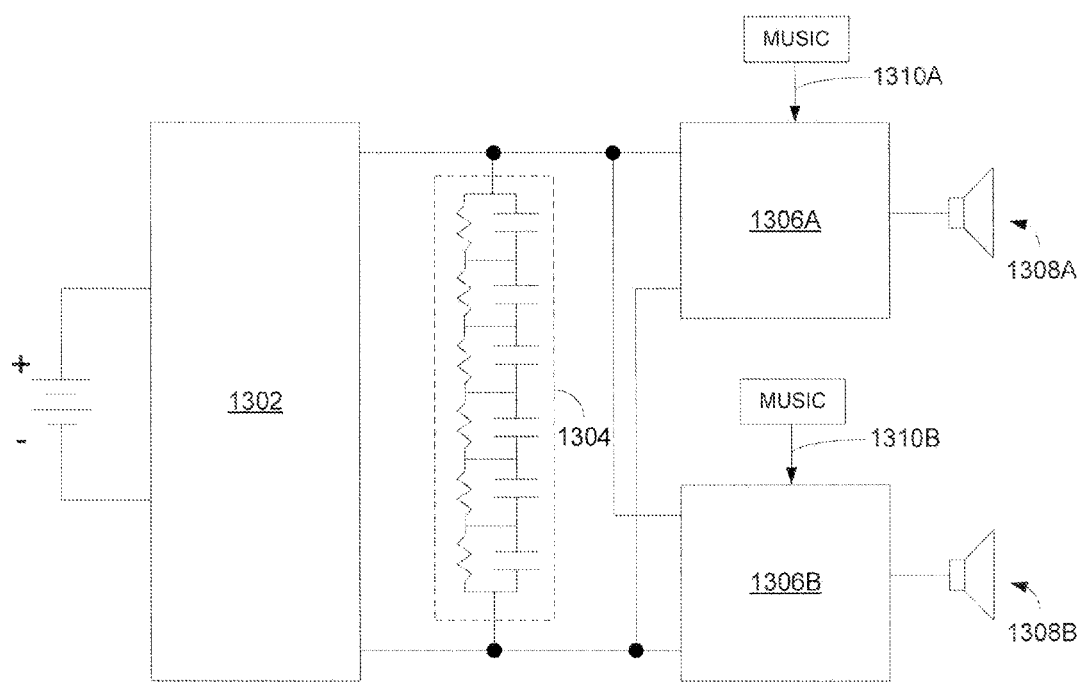

In another implementation shown in FIG. 13, a power supply 1302 (a DC-DC boost converter based on a Linear Technology model LTC1624 switching regulator controller) powered from six 1.2 V batteries (providing 7.2 V total input voltage) is connected in parallel with a capacitive element 1304 consisting of six 10 F/2.5 V aerogel super capacitors in series, each capacitor having a 5.1 kΩ shunt resistor, providing a total capacitance of 1.67 F and a maximum voltage of 15 V. The power supply 1302 and capacitive element 1304 power a pair of audio amplifiers 1306A and 1306B each driving a speaker 1308A and 1308B, respectively. Music signals 1310A and 1310B input into amplifiers 1306A and 1306B, respectively. When the power supply 1302 had an output current limit set to approximately 0.6 A and a nominal output voltage set to 14 V (for a maximum output power of 8.4 W), the power supply 1302 and capacitive element 1304 together provided a peak power of 25.2 W to the amplifiers 1306A and 1306B with the output voltage staying above 9.5 V for all music tested.

Figure 14:
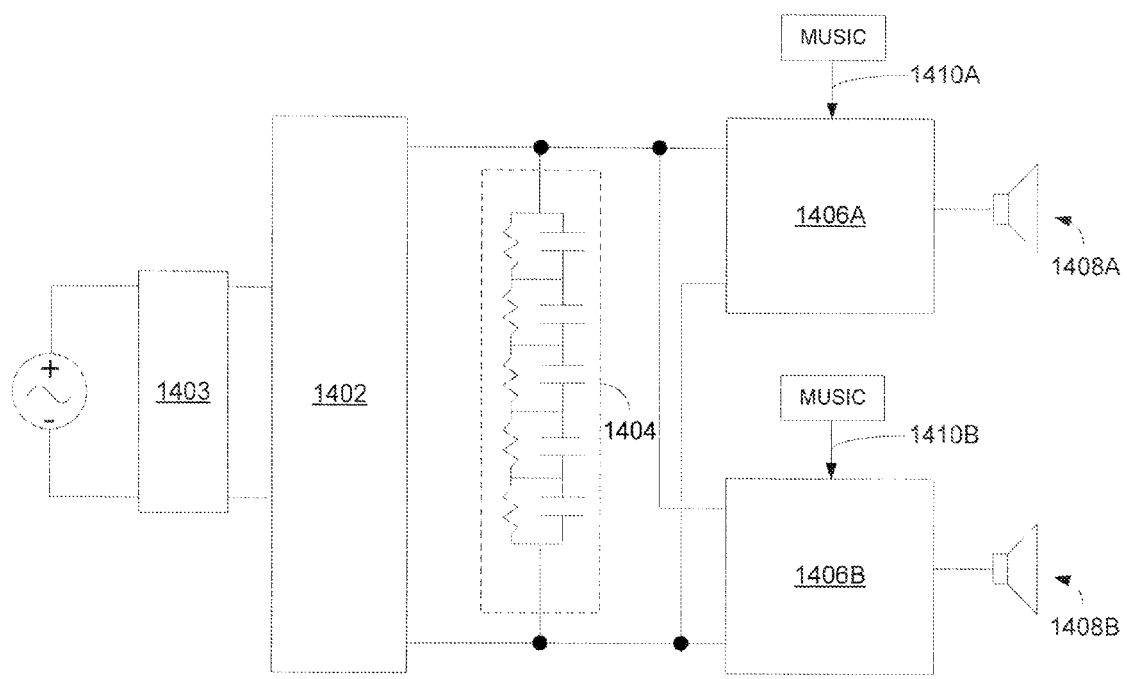

In another implementation shown in FIG. 14, a power supply 1402 (a DC-DC buck converter based on a Linear Technology model LTC1624 switching regulator controller) powered from an AC mains via an AC-DC converter 1403 (an Apple Computer 12 V/1 A wall pack) is connected in parallel with a capacitive element 1404 consisting of five 4 F/2.5 V aerogel super capacitors in series, each capacitor having a 20 kΩ shunt resistor, providing a total capacitance of 0.8 F and a maximum voltage of 12.5 V. The power supply 1402 and capacitive element 1404 power a pair of audio amplifiers 1406A and 1406B each driving a speaker 1408A and 1408B, respectively. Music signals 1410A and 1410B input into amplifiers 1406A and 1406B, respectively. When the power supply 1402 had an input current limit set to approximately 0.8 A and a nominal output voltage set to 12 V (for a maximum input power of 9.6 W), the power supply 1402 and capacitive element 1404 together provided a peak power of 25 W to the amplifiers 1406A and 1406B with the output voltage staying above the minimum operating voltage for all music tested.

FIGS. 15*a*-15*d* depict circuits 2100-2400, respectively, in which a power source is in series with a capacitor to supply power to a load with a voltage that is the sum of the voltages output by the power source and the capacitor. In each of the circuits 2100-2400, a power converter selectively either charges the capacitor or cooperates with the capacitor to limit the current drawn from the power source, depending on how much current the load attempts to draw from the combination of the power source and the capacitor. In each of the circuits 2100-2400, the power source may be a battery, a power source providing DC output from an AC main, a power feed provided from an external device (e.g., cabling conveying power in additional to digital serial communications from an electronic device such as a computer), or any of a variety of other types of power source. Also, the capacitor may be any of a variety of types of capacitive element, including a super capacitor or ultra capacitor. Further, although the power converter is preferably a buck converter, those skilled in the art will readily understand that other types of power converter may be used. Although circuit 2100 will now be described in detail, the operation of each of these circuits 2100-2400 is substantially similar. However, in some embodiments, the manner in which the anodes, cathodes and terminals of the power source, capacitor and power converter are coupled in the circuit 2100 may be preferred due to its efficiency in comparison to the configurations depicted in the circuits 2200-2400.

Figure 15A:
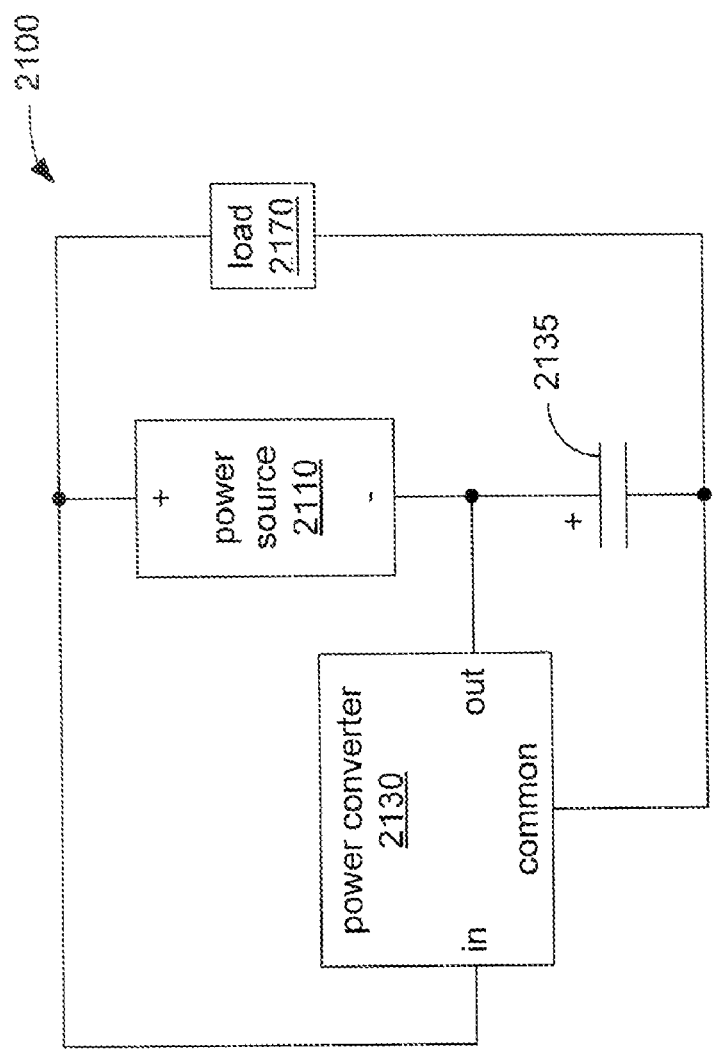
FIGS. 15A-15D are circuit diagrams of a power source, power converter and capacitive element coupled to a load.
Figure 15B:
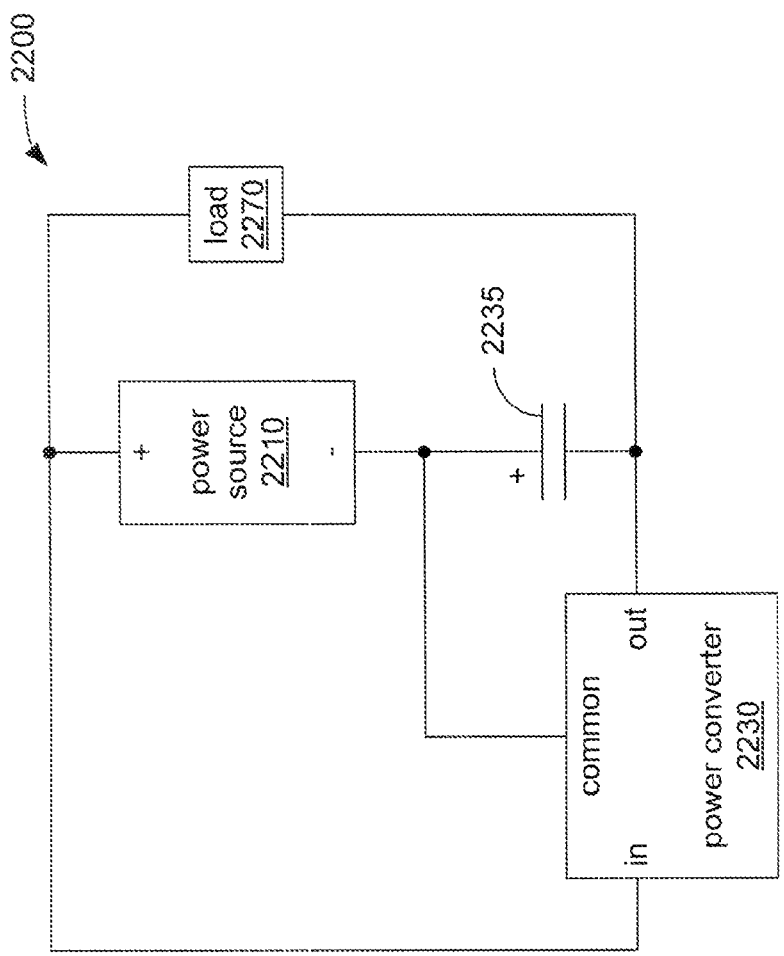
Figure 15C:
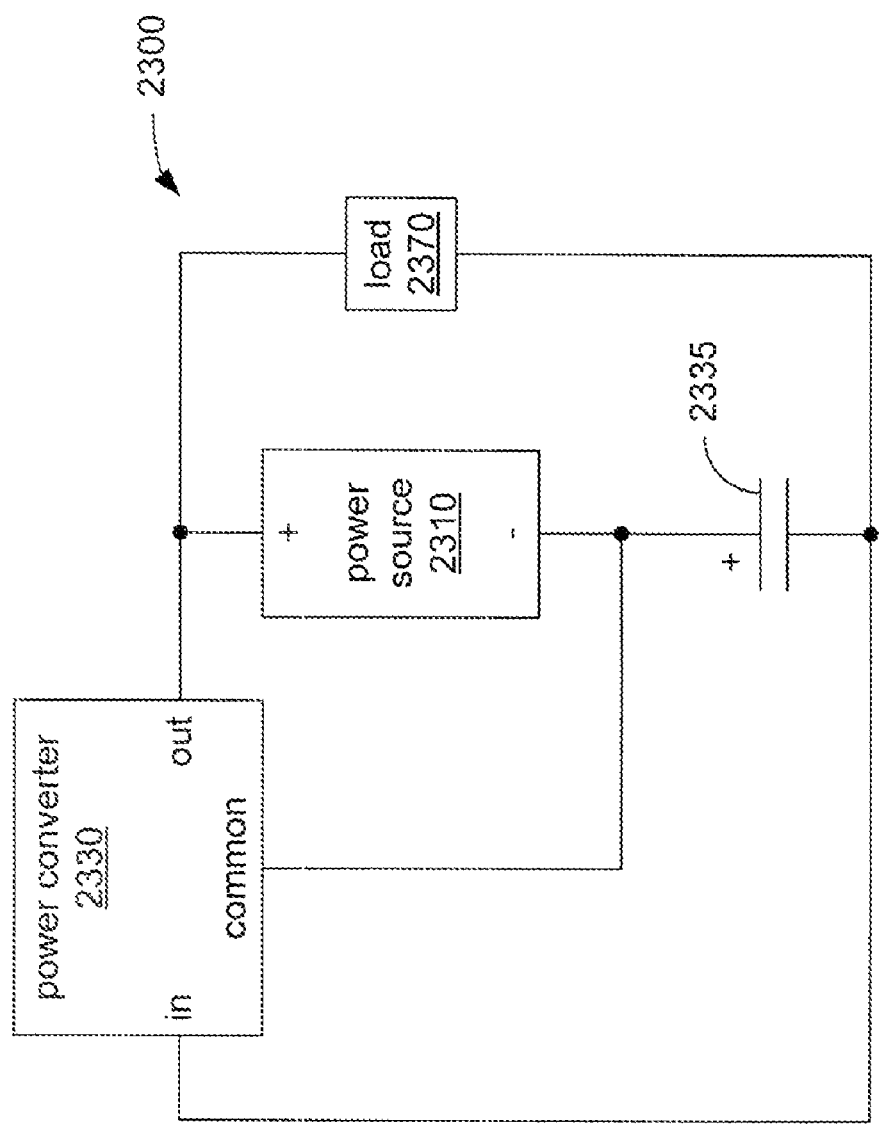
Figure 15D:
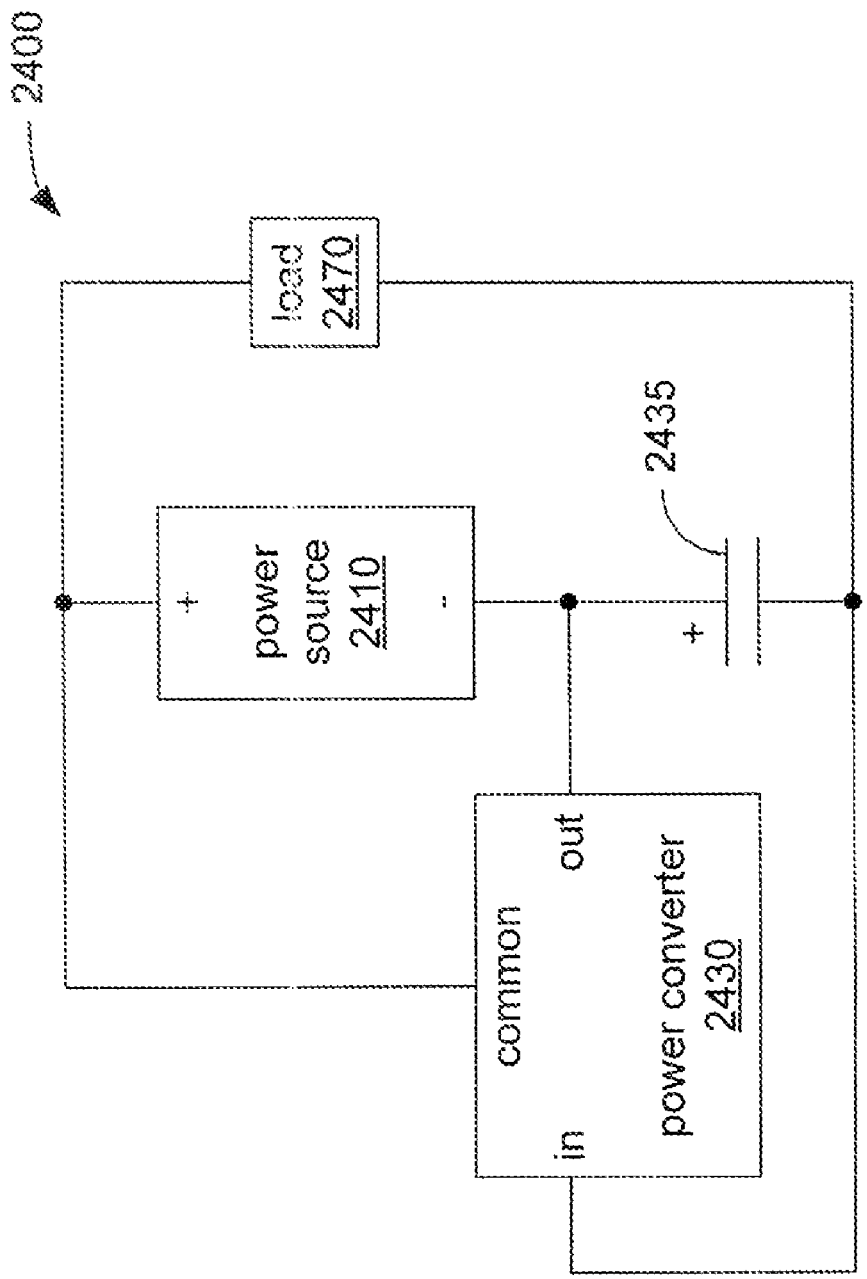

In the circuit 2100 depicted in FIG. 15*a*, a load 2170 is supplied with power having a voltage that is the sum of the voltages output by the power source 2110 and the capacitor 2135, which are coupled in series. The load 2170 is coupled to the anode of the power source 2110 and the cathode of the capacitor 2135, and the cathode of the power source 2110 is coupled to the anode of the capacitor 2135. Further, the input terminal of the power converter 2130 is coupled to the anode of the power source 2110, the output terminal of the power converter 2130 is coupled to both the cathode of the power source 2110 and the anode of the capacitor 2135, and the common terminal of the power converter 2130 is coupled to the cathode of the capacitor 2135.

There are two current flows provided by the power source 2110 that flow out through the output terminal of the power converter 2130. A first current flows from the anode of the power source 2110, through the load 2170, through the common and output terminals of the power converter 2130, and back to the cathode of the power source 2110. A second current flows from the anode of the power source 2110, through the input and output terminals of the power converter 2130, and back to the cathode of the power source 2110. The power converter 2130 imposes a limit on the amount of current that it permits to flow out through the output terminal, and the sum of these two current flows out through the output terminal is not permitted by the power converter 2130 to exceed this limit. It is this limit imposed on the sum of these two current flows that determines whether the capacitor 2135 is charged or discharged, depending on the amount of current drawn by the load 2170, as will now be explained.

At times when the load 2170 draws a relatively small amount of current, such that the limit of current flowing out through the output terminal of the power converter 2130 is not exceeded, both of the first and second current flows are able to take place without limits being imposed on them by the power converter 2130. The power converter 2130 is able to function as a voltage source with a portion of the current flowing out through the output terminal being able to charge the capacitor 2135. As a result, the load 2170 is supplied with power having a voltage equal to the sum of the full output voltage of the power source 2110 and the full capacity voltage of the capacitor 2135.

However, at times when the load 2170 attempts to draw a relatively large amount of current, such that the limit of current flowing out through the output terminal of the power converter 2130 would be exceeded if this amount of current were permitted through the power converter, the second current flow is reduced as a greater proportion of the current flow out through the output terminal is taken by the first current flow. The power converter 2130 then functions as a current source, and the capacitor 2135 discharges. The discharging of the capacitor 2130 allows a portion of the higher current draw of the load 2170 to circumvent the limit on current flowing out through the output terminal of the power converter 2130 allows the power source 2110 to support the higher current draw of the load 2170. As a result, voltage of the power source 2110 is able to be initially maintained at the full output voltage of the power source 2110. However, the power source 2110 is permitted to support this higher current draw of the load 2170 for only the amount of time that the capacitor 2135 requires to fully discharge, and after that, the amount of current that the power source 2110 is permitted to provide is limited by the limit imposed by the power converter 2130 through its output terminal.

In other words, at times when the load 2170 attempts to draw a relatively large amount of current, the capacitor 2135 and the power converter 2130 cooperate to initially allow the power source 2110 to support that higher amount of current for only the brief period of time required for the capacitor 2135 to discharge. After that, the discharged state of the capacitor 2135 and the limit on current flowing out through the output terminal of the power converter 2130 cooperate to limit the amount of current that the power source 2110 is allowed to provide. This accommodates the ability of a number of types of power sources to support a relatively large draw of current for only a brief period without damage. However, after that brief period, many of those power sources may be damaged due to overheating or other factors if they are allowed to continue supporting such a relatively large draw of current. Indeed, the storage capacity of the capacitor 2135 may be deliberately selected to control both the amount of time during which the power source 2110 is permitted to supply all of the relatively large amount of current (an amount of time that ends when the capacitor 2135 is discharged), and/or the limit on current flowing out through the output terminal of the power converter 2130 may be deliberately selected to control the amount of current that the power source 2110 is permitted to supply after the capacitor 2135 is discharged.

Although a single capacitor 2135 is depicted, it will be readily apparent to those skilled in the art that multiple capacitors may be grouped together in some embodiments in series and/or in parallel to increase voltage and/or storage capacity. Further, in some embodiments, including embodiments in which the power source 2110 is a battery or other type of power storage device, the power converter 2130 may be designed and/or selected to enable the capacitor 2135 to discharge stored power back to the power source 2110 (perhaps back through the output and input connections of the power converter 2130) when the circuit 2100 is to be turned off. This may be implemented as part of a sequence of steps for powering down the circuit 2100 in which the power converter 2130 is signaled to cease charging the capacitor 2135, and instead, to allow current from the capacitor 2135 to return to the power source 2110.

Figure 16B:
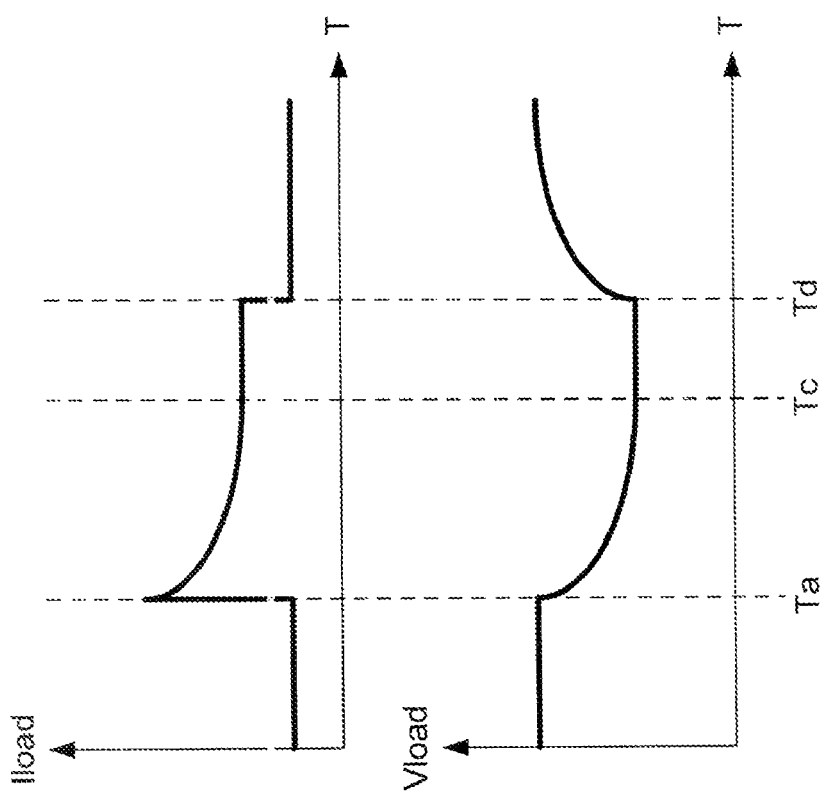
FIGS. 16A-16B are time plots of electrical current and voltage provided to the load of FIG. 15A.
Figure 16A:
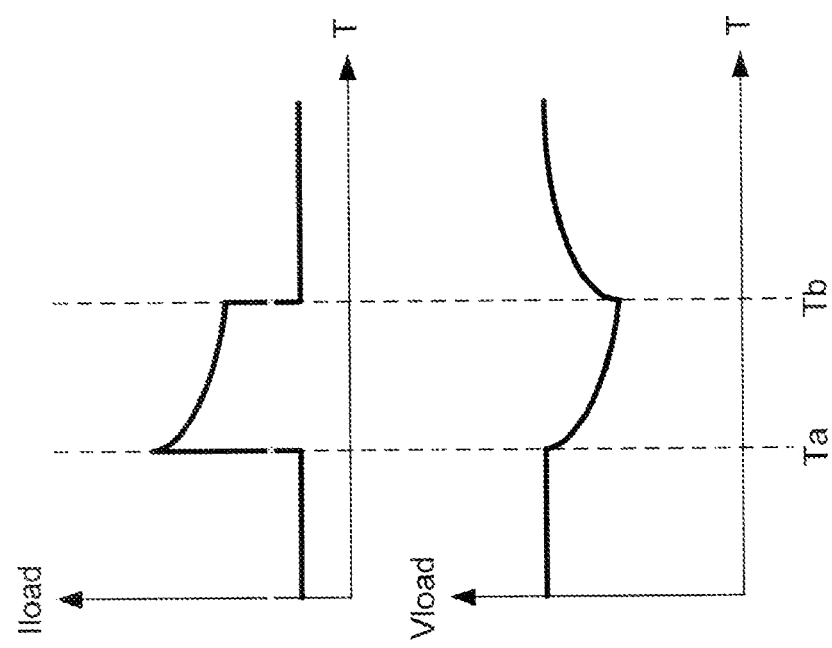

FIGS. 16a and 16b depict possible changes in the voltage (Vload) provided to the load 2170 in the circuit 2100 as a result of changes in the current (Iload) drawn by the load 2170 from drawing a relatively small amount of current to drawing a relatively large amount of current. Prior to time Ta in both FIGS. 16a and 16b, the load 2170 draws a relatively small Iload that does not cause the limit imposed by the power converter 2130 on the amount of current flowing out through its output terminal to be exceeded. As a result, the power converter 2130 is able to function as a voltage source, and Vload is the sum of the full voltage output of the power source 2110 and the full capacity voltage of the capacitor 2135.

However, at time Ta, the load 2170 begins attempting to draw a relatively larger Iload. This relatively larger Iload causes the limit on the total current flowing out through the output terminal of the power converter 2130 to be reached, and would cause that limit to be exceeded if the power converter 2130 did not impose the limit. As a result, there is no longer current capacity through the output terminal to allow a current flow from the input terminal to be used to charge the capacitor 2135, and the capacitor 2135 starts to discharge. The discharging of the capacitor 2135 allows part of the relatively larger Iload to flow through the capacitor 2135, thereby circumventing the limit imposed by the power converter 2130 and allowing Iload to initially increase considerably at time Ta. However, starting at time Ta, the discharging of the capacitor 2135 causes both the voltage output by the capacitor 2135 and the current flowing through the capacitor 2135 to fall exponentially towards zero, thereby forcing both Vload and Iload to drop starting at time Ta.

If, as shown in FIG. 16a, the load 2170 ceases at time Tb to attempt to draw the relatively larger Iload before the capacitor 2135 is fully discharged, then the amount of current flowing out through the output terminal of the power converter 2130 ceases to exceed the limit imposed by the power converter 2130. As a result, the capacitor 2135 is once again charged, and Vload returns to the level at which it was before time Ta.

Alternatively, if as shown in FIG. 16b, the load 2170 continues attempting to draw a relatively larger Iload past time Tc, at which the capacitor is fully discharged, then Iload is forced to be limited by the limit in current flow imposed by the power converter 2130. As a result, Vload is also forced to be limited to a level dictated by the limit on current flow imposed by the power converter 2130 as the power converter 2130 functions as a current source. Later at time Td, when the load 2170 ceases to attempt to draw a relatively larger Iload and returns to drawing the relatively small Iload, the amount of current flowing out through the output terminal of the power converter return to a level that does not exceed the limit and the capacitor 2135 again charges. As a result, Vload returns to the level at which it was before time Ta.

Figure 17:
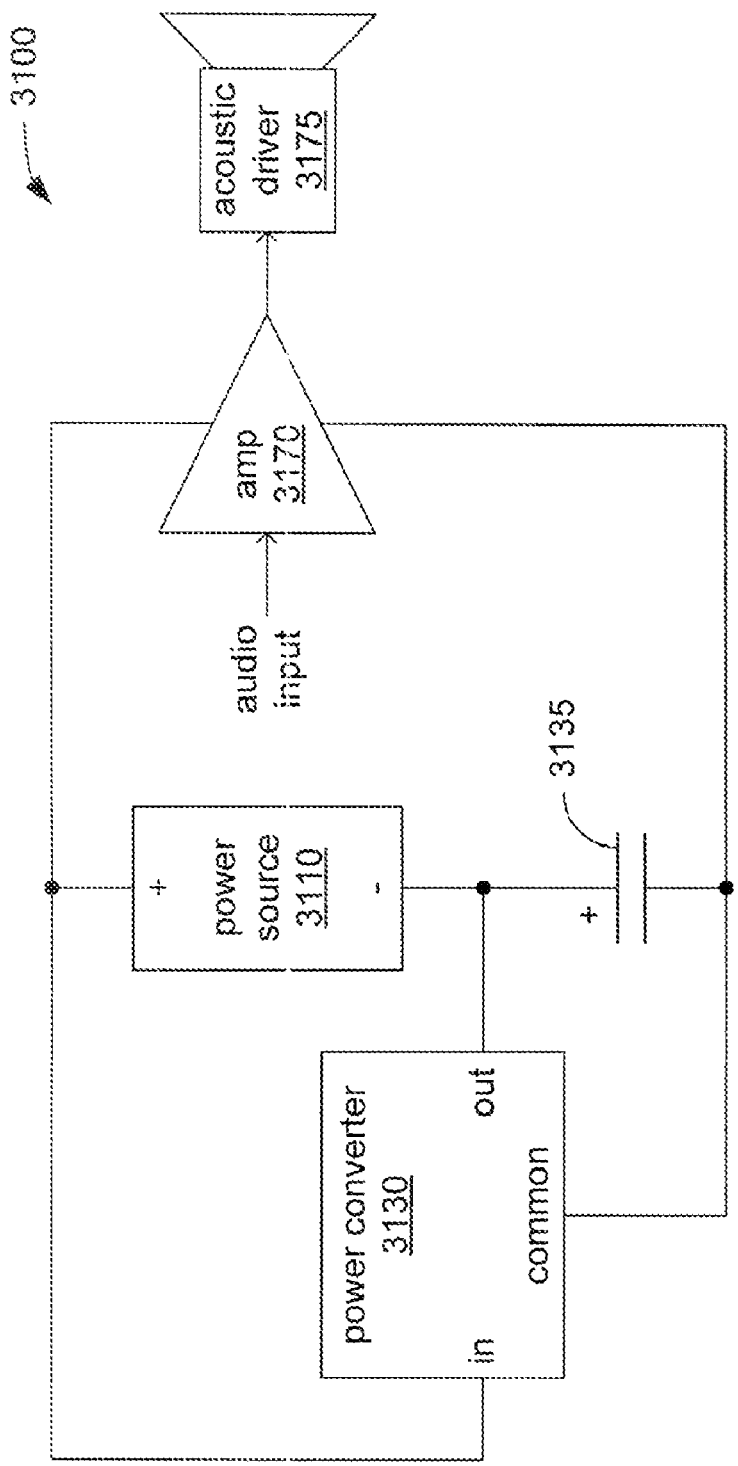
FIG. 17 is a circuit diagram of a power source, power converter and capacitive element coupled to an amplifier and an acoustic driver.

FIG. 17 depicts a circuit 3100 having an amplifier 3170 that is powered by a power source 3110 in series with a capacitor 3135 that is selectively charged by a power converter 3130. The amplifier 3170 is able to drive an acoustic driver 3175 when the acoustic driver 3175 is coupled to the circuit 3100. The coupling of anodes, cathodes and terminals among the power source 3110, the capacitor 3135 and the power converter 3130 in the circuit 3100 is substantially similar to that in the circuit 2100 of FIG. 15a. However, as those skilled in the art will readily recognize, the coupling of these anodes, cathodes and terminals may alternatively be made substantially similar to that in any of the circuits 2200-2400 of FIGS. 15b-15d, respectively. In a manner not unlike the load 2170 of the circuit 2100, the amplifier 3170 of the circuit 3100 is supplied with power having a voltage that is the sum of the voltages output by the power source 3110 and the capacitor 3135. Also not unlike the power converter 2130 of the circuit 2100, the power converter 3130 of the circuit 3100 selectively charges the capacitor 3135 depending on the amount of current drawn by the amplifier 3170.

As was the case with the circuits 2100-2400, the power source 3110 may be a battery, a power source providing DC output from an AC main, a power feed provided from an external device (e.g., cabling conveying power in additional to digital serial communications from an electronic device such as a computer), or any of a variety of other types of power source. Also, the capacitor 3135 may be any of a variety of types of capacitive element, including a super capacitor or ultra capacitor. Further, although the power converter 3130 is preferably a buck converter, those skilled in the art will readily understand that other types of power converter may be used. The acoustic driver 3175 may represent one or more speakers in an entertainment system, one or more sound emitting elements of a pair of headphones, or any of a variety of other types of device capable of producing sound.

In a manner not unlike previously discussed embodiments of power being supplied to an amplifier, the amount of current drawn by the amplifier 3170 of the circuit 3100 at any given time is based primarily on the amount of power the amplifier 3170 requires to drive the acoustic driver 3175 to produce a given sound at a given volume. As previously discussed, many pieces of music have brief portions that cause the amplifier 3170 to briefly draw a relatively greater amount of current in order to drive the acoustic driver 3175 during those portions. Not unlike the circuit 2100, in the circuit 3100 there are two current flows provided by the power source 3110 that flow out through the output terminal of the power converter 3130. A first current flows from the power source 3110, through the amplifier 3170, through the common and output terminals of the power converter 3130, and back to the power source 3110. A second current flows from the power source 3110, through the input and output terminals of the power converter 3130, and back to the power source 3110. The power converter 3130 imposes a limit on the amount of current that it permits to flow out through the output terminal, and the sum of these two current flows out through the output terminal is not permitted by the power converter 3130 to exceed this limit.

At times when the amplifier 3170 draws a relatively small amount of current, such that the limit of current flowing out through the output terminal of the power converter 3130 is not exceeded, both of the first and second current flows are able to take place without limits being imposed on them by the power converter 3130. As a result, the capacitor 3135 is charged, and the amplifier 3170 is supplied with power having a voltage equal to the sum of the full output voltage of the power source 3110 and the full capacity voltage of the capacitor 3135. However, at times when a piece of music (or other signal representative of a sound) causes the amplifier 3170 to attempt to draw a relatively large amount of current, such that the limit of current flowing out through the output terminal of the power converter 3130 would be exceeded if this amount of current were permitted through the power converter, the second current flow is reduced as a greater proportion of the current flowing out through the output terminal is taken by the first current flow. As a result, the capacitor 3135 discharges, and while this discharging continues to take place, the power source 3110 is permitted to support the higher current draw of the amplifier 3170. Part of this higher current returns to the power source 3110 through the power converter 3130 and part through the capacitor 3135 such that the limit on current flow through the output terminal of the power converter is circumvented. As a result, voltage of the power source 3110 is able to be initially maintained at the full output voltage of the power source 3110. However, after the capacitor 3135 has fully discharged, current no longer flows through the capacitor 3135, and so the amount of current that the power source 3110 is permitted to provide is limited by the limit imposed by the power converter 3130 on the flow of current out through its output terminal.

The storage capacity of the capacitor 3135 may be selected to be large enough to ensure that the time required to discharge the capacitor is sufficiently long as to accommodate a desired percentage of brief passages requiring increased power as are known to exist within a known set of pieces of music. Additionally or alternatively, the storage capacity of the capacitor 3135 may be selected to be small enough to ensure that the time required to discharge the capacitor is sufficiently limited to prevent the power source 3110 from being permitted to support a relatively higher current draw for too long a period of time such that the power source 3110 is damaged. Also, the limit on current flowing out through the output terminal of the power converter 3130 may be selected to control the amount of current that the power source 3110 is permitted to supply after the capacitor 3135 is discharged to prevent damage to the power source 3110.

Although a single capacitor 3135 is depicted, it will be readily apparent to those skilled in the art that multiple capacitors may be grouped together in some embodiments in series and/or in parallel to increase voltage and/or storage capacity. Further, in some embodiments, including embodiments in which the power source 3110 is a battery or other type of power storage device, the power converter 3130 may be designed and/or selected to enable the capacitor 3135 to discharge stored power back to the power source 3110 (perhaps back through the output and input connections of the power converter 3130) when the circuit 3100 is to be turned off. This may be implemented as part of a sequence of steps for powering down the circuit 3100 in which the power converter 3130 is signaled to cease charging the capacitor 3135, and instead, to allow current from the capacitor 3135 to return to the power source 3110.

FIGS. 16a-16b, although discussed with regard to Vload provided to the load 2170 of the circuit 2100 in FIG. 15a, are also indicative of the changes that may occur in the voltage provided to the amplifier 3170 of the circuit 3100. Further, as was the case with the circuit 2100, whether the voltage provided to the amplifier 3170 follows the changes depicted in FIG. 16a or the changes depicted in FIG. 16b depends on whether the amplifier 3170 ceases drawing a relatively larger amount of current either before the capacitor 3135 is fully discharged (i.e., at time Tb, or after the capacitor 3135 is fully discharged (i.e., at time Td).

Figure 18:
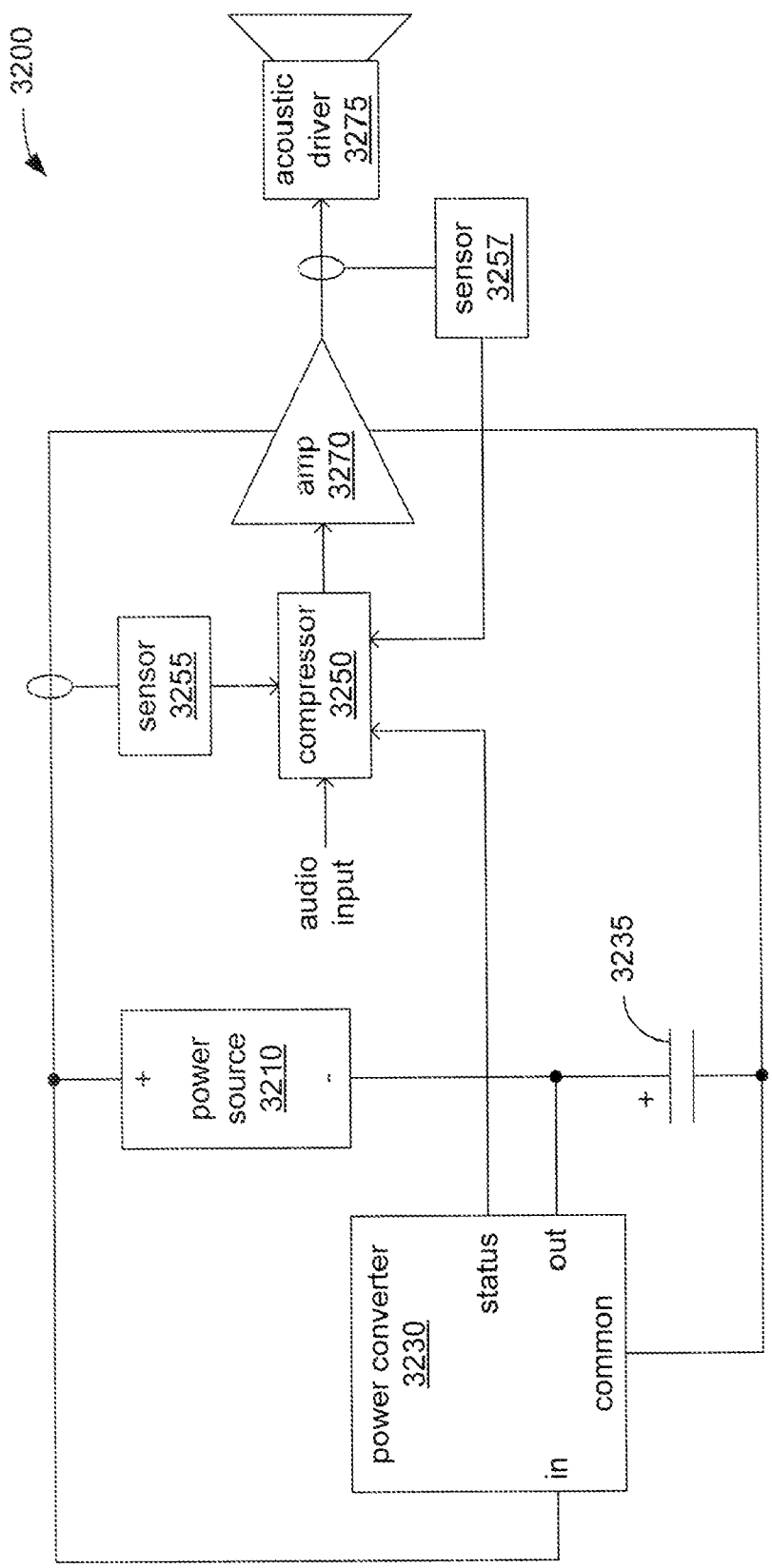
FIG. 18 is a circuit diagram of a power source, power converter, capacitive element and compressor coupled to an amplifier and an acoustic driver.

FIG. 18 depicts a circuit 3200 having an amplifier 3270 that is powered by a power source 3210 in series with a capacitor 3235 that is selectively charged by a power converter 3230. The amplifier 3270 is able to drive an acoustic driver 3275 with audio input received through a compressor 3250 when the acoustic driver 3275 is coupled to the circuit 3200. The coupling of anodes, cathodes and terminals among the power source 3210, the capacitor 3235 and the power converter 3230 in the circuit 3200 is substantially similar to that in the circuits 2100 and 3100 of FIGS. 15a and 17, respectively. However, as those skilled in the art will readily recognize, the coupling of these anodes, cathodes and terminals may alternatively be made substantially similar to that in any of the circuits 2200-2400 of FIGS. 15b-15d, respectively. In a manner not unlike the amplifier 3170 of the circuit 3100, the amplifier 3270 of the circuit 3200 is supplied with power having a voltage that is the sum of the voltages output by the power source 3210 and the capacitor 3235. Also not unlike the power converter 3130 of the circuit 3100, the power converter 3230 of the circuit 3200 selectively charges the capacitor 3235 depending on the amount of current the amplifier 3270 is caused to draw as a result of driving the acoustic driver 3275.

As was the case with previously discussed circuits, the power source 3210 may be any of a variety of other types of power source, and the power converter 3230 may be any of a variety of types of power converter. Further, the power converter 3230 may be capable of enabling energy stored in the capacitor 3235 to be returned to the power source 3210 upon the powering down of the circuit 3200. Also, the capacitor 3235 may be any of a variety of types of capacitive element, including more than one capacitive element, and the acoustic driver 3275 may be any of a variety of types of device capable of producing sound, including more than one of such devices.

The substantial difference between the circuit 3200 and the circuit 3100 of FIG. 17 is the addition of the compressor 3250 in the circuit 3200 that serves to selectively reduce the amplitude of at least some peak portions of the audio input presented to the amplifier 3270. As previously discussed, many pieces of music have brief portions that cause an amplifier to require relatively greater amounts of current. However, a small percentage of music may have relatively longer portions that cause such relatively greater amounts of current to be required, and these longer portions may be long enough to exceed the amount of time during which the power source 3210 is able to provide such relatively greater amounts of current without damage and/or long enough to exceed the amount of time during which the capacitor 3235 is able to allow the power source 3210 to support such relatively greater amounts of current. In other words, such longer portions may be long enough that the capacitor 3235 is substantially discharged before such longer portions end, thereby removing the path by which part of the relatively larger amount of current circumvents the limit imposed by the power converter 3230. Where a situation arises in which the amplifier 3270 requires more current, but that amount of current is not provided, undesirable events may occur in the signal driven by the amplifier 3270 to the acoustic driver 3275, such as the clipping of peaks in that output.

The compressor 3250 may be coupled to a sensor 3255 to sense the voltage provided to the amplifier 3270, may be coupled to a sensor 3257 to sense occurrences of undesirable events in the signal driven to the acoustic driver 3275 (e.g., clipping), and/or may receive an input from the power converter 3230 indicating occurrences of the current flowing out through the output terminal reaching the limit imposed by the power converter 3230. As will be explained in greater detail, as a relatively longer portion of music (or other sound) is encountered that continues beyond the time at which the capacitor 3235 is substantially discharged, the compressor 3250 is triggered to reduce the amplitude of at least some peak portions of the audio input provided to the amplifier 3270. As a result, the amplitude of at least some peak portions of the output driven by the amplifier 3270 to the acoustic driver 3275 is reduced to avoid clipping and/or other undesirable events.

Not unlike the circuits 2100 and 3100, in the circuit 3200 there are two current flows that are provided by the power source 3210 and that both flow out through the output terminal of the power converter 3230, and the power converter 3230 imposes a limit on the amount of current that it permits to flow out through the output terminal. At times when the amplifier 3270 draws a relatively small amount of current, such that the limit of current flowing out through the output terminal of the power converter 3230 is not exceeded, both current flows are able to take place without limits being imposed on them by the power converter 3230. As a result, the capacitor 3235 is charged, and the amplifier 3270 is supplied with power having a voltage equal to the sum of the full output voltage of the power source 3210 and the full capacity voltage of the capacitor 3235.

At times when a piece of music (or other signal representative of a sound) causes the amplifier 3270 to begin drawing a relatively large amount of current, such that the limit of current flowing out through the output terminal of the power converter 3230 would be exceeded if this amount of current were permitted through the power converter, the second current flow is reduced as a greater proportion of the current flowing out through the output terminal is taken by the first current flow. As a result, the capacitor 3235 discharges, and while this discharging continues to take place, the power source 3210 is permitted to support the higher current draw of the amplifier 3270. Part of this higher current returns to the power source 3210 through the power converter 3230 and part through the capacitor 3235 such that the limit on current flow through the output terminal of the power converter is circumvented. As a result, voltage of the power source 3210 is able to be initially maintained at the full output voltage of the power source 3210. However, after the capacitor 3235 has fully discharged, current no longer flows through the capacitor 3235, and so the amount of current that the power source 3210 is permitted to provide is limited by the limit imposed by the power converter 3230 on the flow of current out through its output terminal.

However, unlike the circuit 3100 of FIG. 17, if the period of time during which the amplifier 3270 draws relatively more current approaches or exceeds the time required for the capacitor 3235 to substantially discharge, then the compressor 3250 is triggered to alter the audio signal provided to the amplifier 3270 to reduce the amplitude of at least some peaks. In embodiments where the compressor 3250 is coupled to the sensor 3255 sensing the voltage provided to the amplifier 3270, the compressor 3250 may be triggered in response to the drop in the voltage provided to the amplifier 3270 as the capacitor 3235 is substantially discharged. In embodiments where the compressor 3250 is coupled to the sensor 3257 sensing undesired events in the signal driven to the acoustic driver 3275, the compressor 3250 may be triggered in response to the occurrence of one or more of such undesired events. In embodiments where the compressor 3270 receives an input from the power converter 3230 indicating occurrences of the limit on current flowing out through the output terminal being reached, the compressor 3250 may be triggered in response to that limit being reached. In other embodiments, the compressor 3250 may employ a timer that triggers the compressor 3250 if the audio input continues to exhibit a characteristic (e.g., a threshold of amplitude being exceed by at least one peak) that causes the amplifier 3270 to require a relatively greater amount of current for a period of time longer than a preset interval of time, and that interval may chosen to correspond to the amount of time required for the capacitor 3235 to substantially discharge. In each of these embodiments, the compressor 3250 may monitor one or more characteristics of the audio input and cease reducing the amplitude of at least some peaks in the signal provided to the amplifier 3270 in response to the audio input ceasing to have a characteristic causing the amplifier 3270 to require a relatively greater amount of current.

Not unlike the capacitor 3135 of the circuit 3100, the storage capacity of the capacitor 3235 may be selected to be large enough to ensure that the time required to discharge the capacitor is sufficiently long as to accommodate a desired percentage of brief passages requiring increased power as are known to exist within a known set of pieces of music. Additionally or alternatively, the storage capacity of the capacitor 3235 may be selected to be small enough to ensure that the time required to discharge the capacitor is sufficiently limited to prevent the power source 3210 from being permitted to support a relatively higher current draw for too long a period of time such that the power source 3210 is damaged. Also, the limit on current flowing out through the output terminal of the power converter 3230 may be selected to control the amount of current that the power source 3210 is permitted to supply after the capacitor 3235 is discharged to prevent damage to the power source 3210.

Figure 19:
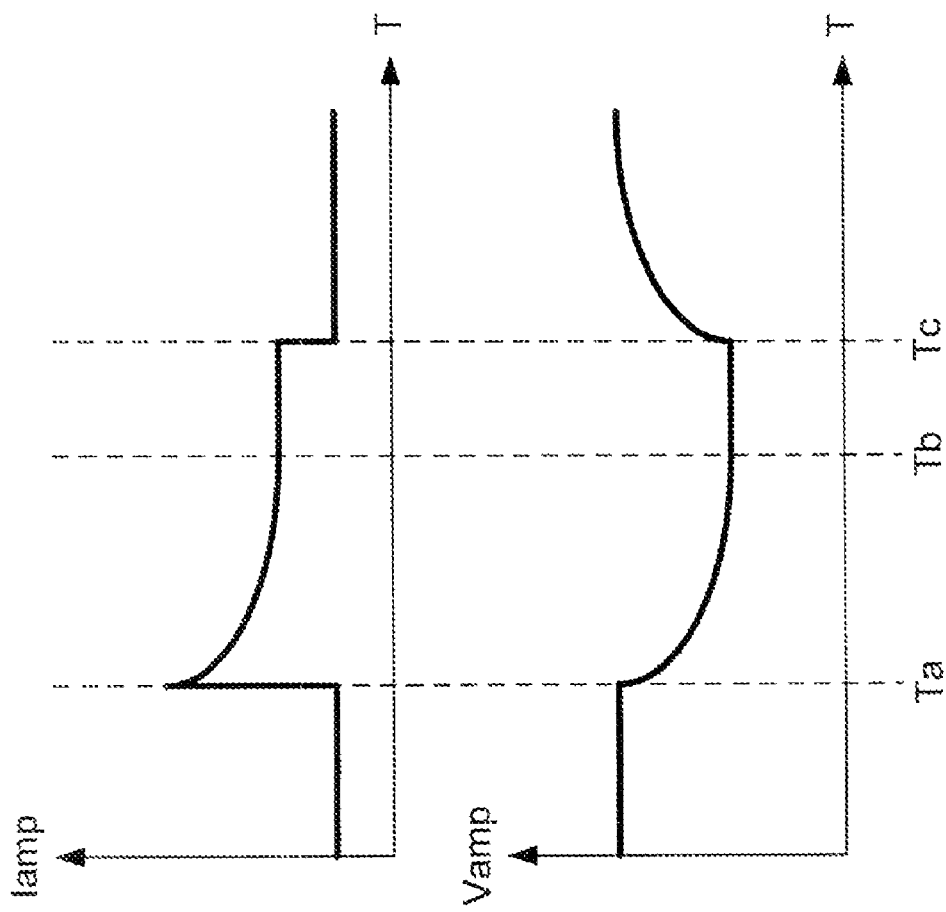
FIG. 19 is a time plot of electrical current and voltage provided to the amplifier of FIG. 18.

FIG. 19 depicts the possible changes in the voltage (Vamp) provided to the amplifier 3270 in the circuit 3200 as a result of changes in the current (Iamp) drawn by the amplifier 3270, including attempt to draw a relatively large amount for a period of time sufficiently long as to trigger the compressor 3250. Prior to time Ta, the amplifier 3270 draws a relatively small Iamp that does not cause the limit imposed by the power converter 3230 on the amount of current flowing out through its output terminal to be exceeded. As a result, the power converter 3230 is able to function as a voltage source, and Vamp is the sum of the full voltage output of the power source 3210 and the full capacity voltage of the capacitor 3235.

However, at time Ta, a portion of music (or other sound) received as an audio input causes the amplifier 3270 to attempt to draw a relatively larger Iamp. This causes the limit on the total current flowing out through the output terminal of the power converter 3230 to be reached, and would cause that limit to be exceeded if the power converter 3230 did not impose this limit. As a result, there is no longer current capacity through the output terminal to allow a current flow from the input terminal to be used to charge the capacitor 3235, and the capacitor 3235 starts to discharge. The discharging of the capacitor 3235 allows part of the relatively larger Iamp to flow through the capacitor 3235, thereby circumventing the limit imposed by the power converter 3230. However, starting at time Ta, the discharging of the capacitor 3235 causes the voltage output by the capacitor 3235 and the capacity for current flowing through the capacitor 3235 to fall exponentially towards zero, forcing both Iamp and Vamp to drop.

As the amplifier 3270 continues drawing the relatively larger Iamp, at time Tb, the compressor 3250 is triggered to begin altering the audio input to reduce the amplitude of at least some peaks in the audio input, and provides this version of the audio input to the amplifier 3270. This altered version of the audio input reduces the current requirements of the amplifier 3270, thereby allowing the amplifier 3270 to operate within the forcibly limited Iamp and continue to provide an output to the acoustic driver 3275 while avoiding at least one or more undesirable events (e.g., clipping).

As previously discussed, the compressor 3250 may be triggered by one or more of a number of events, including an event corresponding or otherwise linked to the discharge of the capacitor 3235. As a result, time Tb may coincide or be otherwise coordinated with the time at which the capacitor 3235 is discharged to a preselected degree or at which the capacitor 3235 is fully discharged. From the time the capacitor 3235 is fully discharged such that there can no longer be current flowing through the capacitor 3235, Iamp will be limited by the limit imposed on current flowing out through the output terminal of the power converter 3230. As a result, by the time the capacitor 3235 has fully discharged, Vamp has dropped to a level dictated by the limit on current flow imposed by the power converter 3230 as the power converter 3230 functions as a current source.

At time Tc, the audio input changes such that the one or more characteristics of the audio input that had caused the amplifier 3270 to attempt to draw a relatively greater Iamp are no longer present, and the compressor 3250 ceases altering the audio input. Furthermore, with the amplifier 3270 no longer attempting to draw a relatively greater Iamp, the amount of current flowing out through the output terminal of the power converter returns to a level that does not exceed the limit. As a result, the capacitor 3235 again charges, and Vamp returns to the level at which it was before time Ta.

Figure 20:
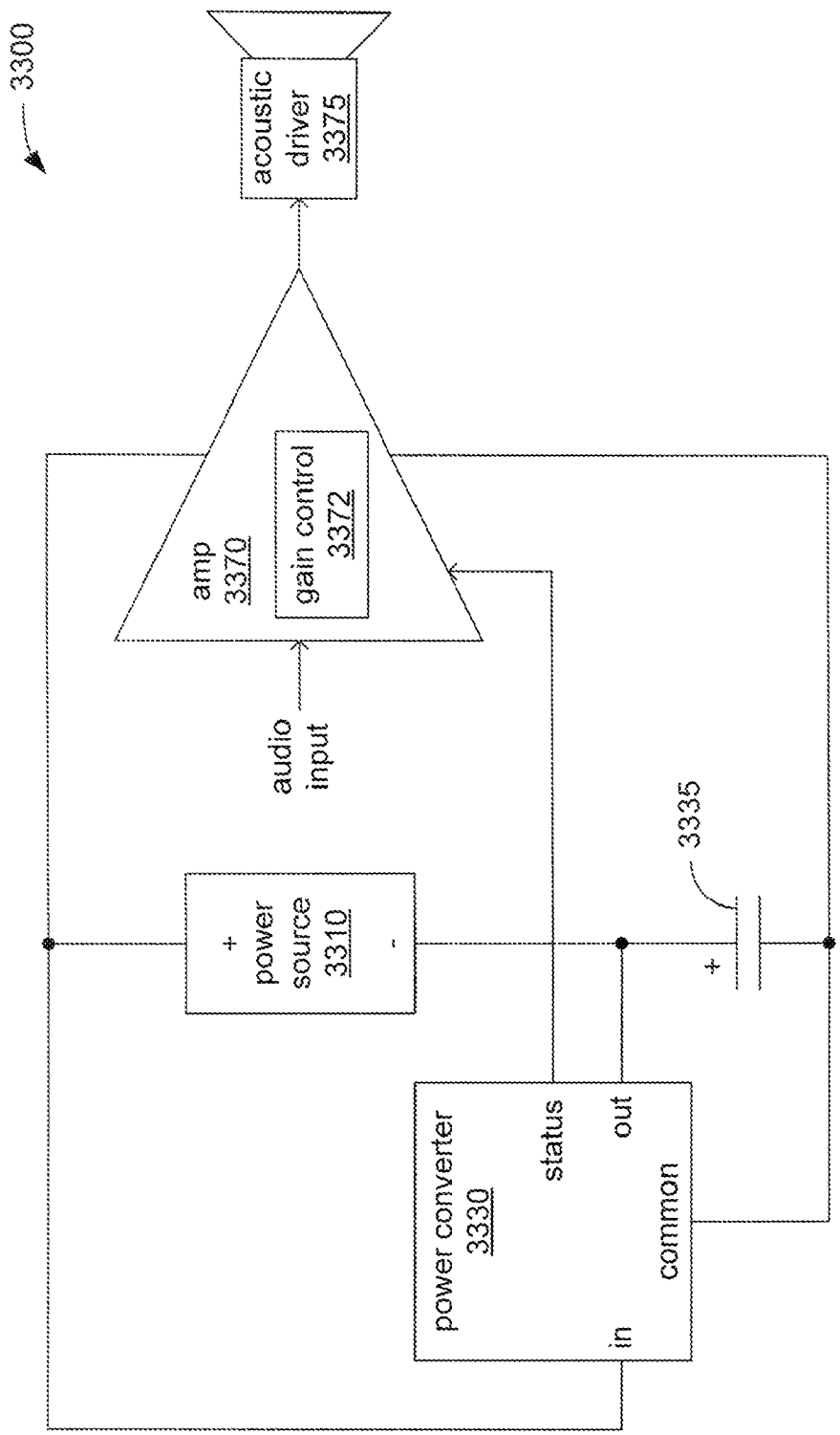
FIG. 20 is a circuit diagram of a power source, power converter and capacitive element coupled to an amplifier having a gain control and an acoustic driver.

FIG. 20 depicts a circuit 3300 having an amplifier 3370 that is powered by a power source 3310 in series with a capacitor 3335 that is selectively charged by a power converter 3330. The amplifier 3370 has a gain control 3372 and is able to drive an acoustic driver 3375 when the acoustic driver 3375 is coupled to the circuit 3300. The coupling of anodes, cathodes and terminals among the power source 3310, the capacitor 3335 and the power converter 3330 in the circuit 3300 is substantially similar to that in the circuits 2100, 3100 and 3200 of FIGS. 15a, 17 and 18, respectively. However, as those skilled in the art will readily recognize, the coupling of these anodes, cathodes and terminals may alternatively be made substantially similar to that in any of the circuits 2200-2400 of FIGS. 15b-15d, respectively. In a manner not unlike the amplifiers 3170 and 3270 of the circuits 3100 and 3200, the amplifier 3370 of the circuit 3300 is supplied with power having a voltage that is the sum of the voltages output by the power source 3310 and the capacitor 3335. Also not unlike the power converters 3130 and 3230 of the circuits 3100 and 3200, respectively, the power converter 3330 of the circuit 3300 selectively charges the capacitor 3335 depending on the amount of current the amplifier 3370 is caused to draw as a result of driving the acoustic driver 3375.

As was the case with previously discussed circuits, the power source 3310 may be any of a variety of other types of power source, and the power converter 3330 may be any of a variety of types of power converter. Further, the power converter 3330 may be capable of enabling energy stored in the capacitor 3335 to be returned to the power source 3310 upon the powering down of the circuit 3300. Also, the capacitor 3335 may be any of a variety of types of capacitive element, including more than one capacitive element, and the acoustic driver 3375 may be any of a variety of types of device capable of producing sound, including more than one of such devices.

The substantial difference between the circuit 3300 from the circuit 3200 is the substitution of the gain control 3372 for the compressor 3250. Whereas the compressor 3250 selectively reduces at least some peaks of the audio input presented to the amplifier 3270, the gain control 3372 selectively reduces the gain employed by the amplifier 3370 in amplifying the audio input. In support of triggering of the gain control 3372, the amplifier 3370 may receive an input from the power converter 3330 indicating occurrences of the current flowing out through the output pin reaching the limit imposed on that current flow by the power converter 3330. As a relatively longer portion of music (or other sound) causes the amplifier 3370 to require a relatively larger amount of current for a period of time long enough to substantially discharge the capacitor 3335, the gain control 3372 is triggered to reduce the gain of amplifier 3370 in amplifying the audio input such that the amplitude of the output of the driven by the amplifier 2370 to the acoustic driver 2375 is reduced to avoid clipping and/or other undesirable events.

Not unlike the circuits 2100, 3100 and 3200, in the circuit 3300, at times when the amplifier 3370 draws a relatively small amount of current, such that the limit imposed by the power converter 3330 on current flowing out through the output terminal is not exceeded, no limit is placed on current flowing out through the output terminal. As a result, the capacitor 3335 is charged, and the amplifier 3370 is supplied with power having a voltage equal to the sum of the full output voltage of the power source 3310 and the full capacity voltage of the capacitor 3335. At times when a piece of music (or other signal representative of a sound) causes the amplifier 3370 to begin drawing a relatively large amount of current, such that the limit of current flowing out through the output terminal of the power converter 3330 would be exceeded if this amount of current were permitted through the power converter, the imposed limit results in the capacitor 3335 discharging. While this discharging takes place, the power source 3310 is permitted to support the higher current draw of the amplifier 3370 and part of this higher current returns to the power source through the capacitor 3335 such that the limit imposed on current flowing out through the output terminal is circumvented. As a result, the full output voltage of the power source 3210 is able to be maintained until the capacitor 3335 has fully discharged, resulting in the amount of current that the power source 3310 is permitted to provide being limited by the limit imposed by the power converter 3230 on the flow of current out through its output terminal.

However, if the period of time during which the amplifier 3370 draws relatively more current begins to exceed the time during which the capacitor 3335 substantially discharges, then the gain control 3372 alters the gain applied by the amplifier 3370 to the audio input to reduce the amplitude of the resulting output driven to the acoustic driver 3375. In some embodiments, the gain control 3372 may monitor the voltage provided to the amplifier 3370, and reduce the gain in response to the drop in the voltage provided to the amplifier 3370 as the capacitor 3335 is substantially discharged. In some embodiments, the gain control 3372 may monitor the output driven to the acoustic driver 3375 for undesired events (including clipping), and reduce the gain in response to the occurrence of one or more of such undesired events. In embodiments where the amplifier 3370 receives an input from the power converter 3330 indicating occurrences of disconnection of the output connection of the power converter 3330, the gain control 3372 may reduce the gain in response to the occurrence of one or more instances of such disconnection. In other embodiments, the gain control 3372 may employ a timer triggering a reduction in the gain if the audio input continues to cause the amplifier 3370 to require relatively greater amounts of power for a period of time longer than a preset interval of time that may be chosen to correspond to the amount of time required for the capacitor 3335 to substantially discharge. In each of these embodiments, the gain control 3372 may monitor one or more characteristics of the audio input and cease reducing the gain if the audio input changes so as to no longer cause the amplifier 3370 to require such relatively greater amounts of power.

Not unlike the capacitors of previously discussed circuits, the storage capacity of the capacitor 3335 may be selected to be large enough to ensure that the time required to discharge the capacitor is sufficiently long as to accommodate a desired percentage of brief passages requiring increased power as are known to exist within a known set of pieces of music. Additionally or alternatively, the storage capacity of the capacitor 3335 may be selected to be small enough to ensure that the time required to discharge the capacitor is sufficiently limited to prevent the power source 3310 from being permitted to support a relatively higher current draw for too long a period of time such that the power source 3310 is damaged. Also, the limit on current flowing out through the output terminal of the power converter 3330 may be selected to control the amount of current that the power source 3310 is permitted to supply after the capacitor 3335 is discharged to prevent damage to the power source 3310.

The effect of the operation of the circuit 3300 on the voltage provided to the amplifier 3370 may, in some embodiments, be substantially the same as depicted in FIG. 19, with the substantial difference being that at time Tc, the gain with which the audio input is amplified by the amplifier 3370 is changed, rather than the amplitude of peaks in the audio input.

It should be noted that although speakers 212, 1106, 1208, 1308A, 1308B, 1408A and 1408B have all been depicted in their respective Figures as though they were single devices receiving a single channel of an audio signal from which to produce sound, as already alluded to in the later discussion of the acoustic drivers 3175, 3275 and 3375, those skilled in the art will readily recognize that each of these depicted components may represent a plurality of devices capable of producing sound. Indeed, each of these depicted components may represent a more complex device capable of producing sound, including speakers employing at least one crossover and/or a multitude of sound-producing elements. Furthermore, each of these depicted components may represent a sound-producing device in which further amplification and/or signal processing is employed. Also, in the various embodiments discussed herein in which a compressor, a gain control or other adjustable device capable of altering a signal providing audio to an amplifier or altering the amplification of such a signal, such compressor, gain control or other adjustable device may be provided with the ability to employ select and/or utilize preselected settings based on one or more characteristics of one or more known sound-producing devices. Such preselected settings may be utilized to provide the ability to automatically adjust the gain or output driving strength employed by an amplifier and/or the timing at which a compressor or a gain control may begin or cease acting on a signal representing an audio input in coordination with the use of a capacitor to boost the power provided to an amplifier.

In some embodiments, one of the circuits 2100, 2200 or 2300, or one of the circuits incorporating an amplifier that is depicted in one of the earlier Figures is disposed about the casing of an electronic device to produce sound from an audio signal (e.g., a docking station for a digital audio file player, a "boom box" audio device, a cell phone, a "satellite" speaker for a computer system, a pair of amplified headphones, an amplifying component of a home entertainment system, etc.). Such a casing may also incorporate one of the speakers 212, 1106, 1208, 1308A, 1308B, 1408A or 1408B, or one of the acoustic drivers 3175, 3275 or 3375, or may incorporate the ability for the electronic device to be coupled to one of these speakers or acoustic drivers.

Figure 21:
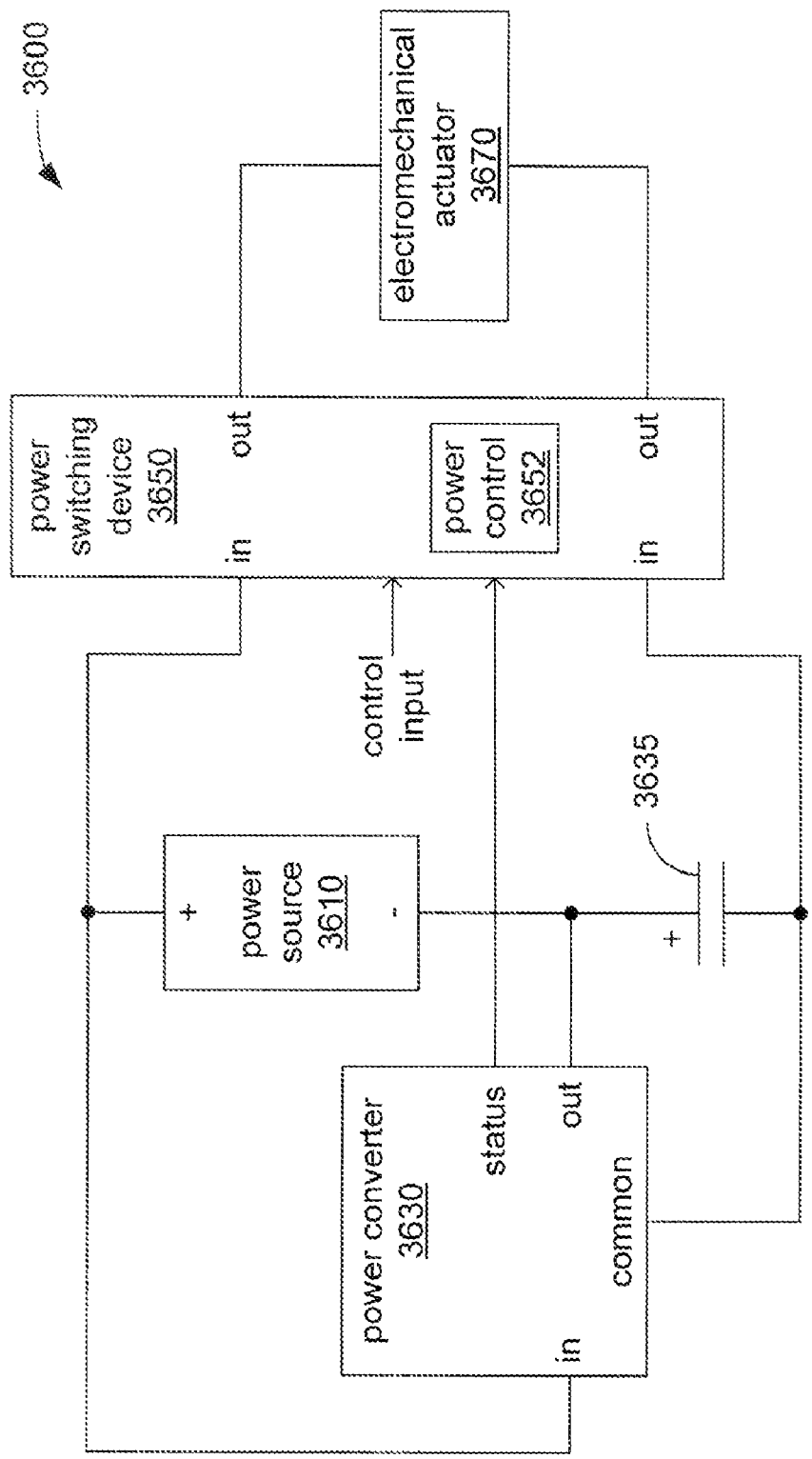
FIG. 21 is a circuit diagram of a power source, power converter and capacitive element coupled to an electromechanical actuator through a power switching device.

FIG. 21 depicts a circuit 3600 having an electromechanical actuator 3670 that is powered by a power source 3610 in series with a capacitor 3635 that is selectively charged by a power converter 3630. A power switching device 3650 is interposed between the electromechanical actuator 3670 and the supply of power provided by the power source 3610 and the capacitor 3635 to control the provision of power and/or the polarity of power to the electromechanical actuator 3670 in response to a control input. The coupling of anodes, cathodes and terminals among the power source 3610, the capacitor 3635 and the power converter 3630 in the circuit 3600 is substantially similar to that in the circuits 2100, 3100, 3200 and 3300 of FIGS. 15a, 17, 18 and 20, respectively. However, as those skilled in the art will readily recognize, the coupling of these anodes, cathodes and terminals may alternatively be made substantially similar to that in any of the circuits 2200-2400 of FIGS. 15b-15d, respectively. In a manner not unlike the loads and amplifiers of previously discussed circuits, the electromechanical actuator 3670 of the circuit 3600 is supplied with power (through the power switching device 3650) having a voltage that is the sum of the voltages output by the power source 3610 and the capacitor 3635. Also, the power converter 3630 of the circuit 3600 selectively charges the capacitor 3635 depending on the amount of current drawn by the electromechanical actuator 3670.

As was the case with previously discussed circuits, the power source 3610 may be any of a variety of other types of power source, and the power converter 3630 may be any of a variety of types of power converter. Further, the power converter 3630 may be capable of enabling energy stored in the capacitor 3635 to be returned to the power source 3610 upon the powering down of the circuit 3600. Also, the capacitor 3635 may be any of a variety of types of capacitive element, including more than one capacitive element.

The electromechanical actuator 3670 may be any of a variety of types of electromechanical device, including a rotary motor, a stepper motor, a linear motor, a solenoid, a relay, a contactor, a magnet, etc. Like the amplifiers discussed at length herein, there are moments where the electromechanical actuator 3670 momentarily requires a relatively greater amount of power, although for the electromechanical actuator 3670, such moments are usually associated with being actuated, changes in speed of movement, or changes in direction of movement.

Not unlike the circuit 2100 of FIG. 15a, in the circuit 3600 there are two current flows provided by the power source 3610 that flow out through the output terminal of the power converter 3630. A first current flows from the power source 3610, through the combination of the power switching device 3650 and the electromechanical actuator 3670, through the common and output terminals of the power converter 3630, and back to the power source 3610. A second current flows from the power source 3610, through the input and output terminals of the power converter 3630, and back to the power source 3610. The power converter 3630 imposes a limit on the amount of current that it permits to flow out through the output terminal, and the sum of these two current flows out through the output terminal is not permitted by the power converter 3630 to exceed this limit.

At times when the electromechanical actuator 3670 draws a relatively small amount of current, such that the limit of current flowing out through the output terminal of the power converter 3630 is not exceeded, both of the first and second current flows are able to take place without limits being imposed on them by the power converter 3630. As a result, the capacitor 3635 is charged, and the electromechanical actuator 3670 is supplied with power having a voltage equal to the sum of the full output voltage of the power source 3610 and the full capacity voltage of the capacitor 3635. However, at times when an obstruction or other mechanical interference/malfunction causes the electromechanical actuator 3670 to attempt to draw a relatively large amount of current, such that the limit of current flowing out through the output terminal of the power converter 3630 would be exceeded if this amount of current were permitted through the power converter, the second current flow is reduced as a greater proportion of the current flowing out through the output terminal is taken by the first current flow. As a result, the capacitor 3635 discharges, and while this discharging continues to take place, the power source 3610 is permitted to support the higher current draw of the electromechanical actuator 3670. Part of this higher current returns to the power source 3610 through the power converter 3630 and part through the capacitor 3635 such that the limit on current flow through the output terminal of the power converter is circumvented. As a result, voltage output by the power source 3610 is able to be initially maintained at the full output voltage of the power source 3610. However, after the capacitor 3635 has fully discharged, current no longer flows through the capacitor 3635, and so the amount of current that the power source 3610 is permitted to provide is limited by the limit imposed by the power converter 3630 on the flow of current out through its output terminal.

The storage capacity of the capacitor 3635 may be selected to be large enough to ensure that the time required to discharge the capacitor is sufficiently long as to accommodate the amount of time that the electromechanical actuator 3670 is expected to require a relatively greater amount of current during normal operation. Additionally or alternatively, the storage capacity of the capacitor 3635 may be selected to be small enough to ensure that the time required to discharge the capacitor is sufficiently limited to prevent the power source 3610 from being permitted to support a relatively higher current draw for too long a period of time such that the power source 3610 is damaged. Also, the limit on current flowing out through the output terminal of the power converter 3630 may be selected to control the amount of current that the power source 3610 is permitted to supply after the capacitor 3635 is discharged to prevent damage to the power source 3610.

In some embodiments, the power switching device 3650 may incorporate a power control 3652 capable of addressing instances in which the electromechanical actuator 3670 requires a relatively greater amount of current for an extended period of time longer than can be accommodated by the amount of time required to discharge the capacitor 3635 and/or the amount of time that the power source 3610 is able to supply a relatively greater amount of current without damage. The power control 3652 may respond to such an extended period of time for which a relatively greater amount of current is required by cutting off all power to the electromechanical actuator 3670, and after an interval of time, may attempt to reapply power to the electromechanical actuator 3670. Such a cutting off response may be desirable to protect the power source 3610 and/or the electromechanical actuator 3670 from damage due to instances of the electromechanical actuator 3670 being physically prevented from performing its function (e.g., debris or some other object being in the path of movement of the electromechanical actuator 3670, etc.).

To determine when the electromechanical actuator 3670 requires a relatively greater amount of current, the power control 3652 may monitor the amount of current drawn by the electromechanical actuator 3670 through the power switching device 3650, or the power control 3652 may receive a signal from the power converter 3630 indicating when the amount of current flowing out through its output terminal has reached the imposed limit. To determine when the capacitor 3635 has been discharged such that the power source 3610 is no longer permitted to supply a relatively greater amount of current, the power control 3652 may maintain a timer preset to an amount of time chosen to be coordinated with the amount of time required to discharge the capacitor 3635, or the power control 3652 may monitor the voltage provided to the electromechanical actuator 3670 for the decay of the voltage provided by the discharge of the capacitor 3635.

The power control 3652 may be coupled to a thermal sensor (not shown) monitoring the temperature of the electromechanical actuator 3670 and/or the capacitor 3635, or may employ a timer to determine how long to wait after cutting off all power to the electromechanical actuator 3670 before attempting to reapply power to the electromechanical actuator. Where a timer is used, the timer may be preset to an interval long enough to ensure a substantial recharging of the capacitor 3635.

Figure 22:
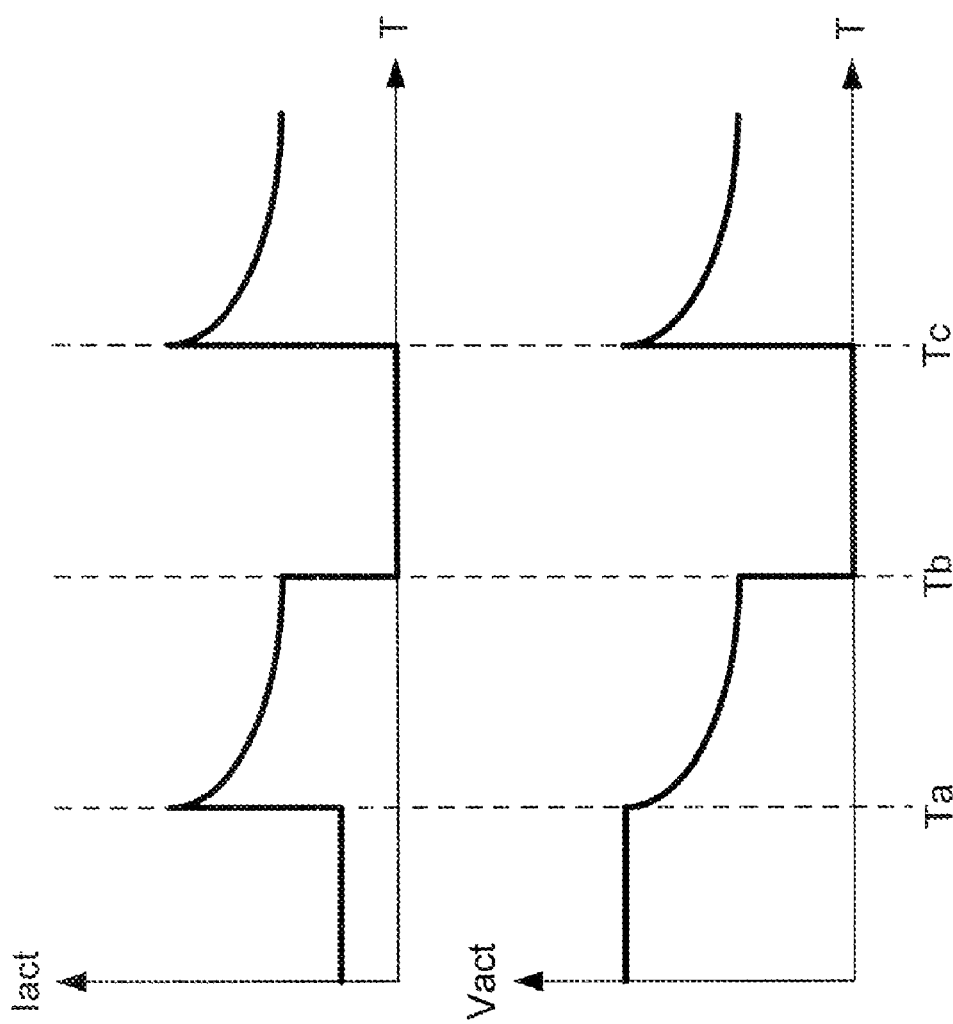
FIG. 22 is a time plot of electrical current and voltage provided to the mechanical actuator of FIG. 21.

FIG. 22 depicts the possible changes in the voltage (Vact) provided to the electromechanical actuator 3670 in the circuit 3600 as a result of changes in the current (Iact) drawn by the electromechanical actuator 3670, including the electromechanical actuator 3670 momentarily attempting to draw a requiring relatively greater Iact. At time Ta, a control input to the power switching device 3650 causes the power switching device 3650 to alter the application of power to the electromechanical actuator 3670 such that the electromechanical actuator 3670 requires a relatively greater Iact. From time Ta to time Tb, the capacitor 3635 discharges, initially allowing the power source 3610 to supply the relatively greater Iact. However, as the capacitor 3635 discharges, both Iact and Vact diminish as the voltage output and capacity for current flow of the capacitor 3635 drop towards zero. At time Tb, the power control 3652 responds to an impetus corresponding to the discharge of the capacitor 3635 (such as the drop in the voltage output of the capacitor 3635, a timer preset to a time corresponding to the amount of time required for the capacitor 3635 to fully discharge, etc.) by operating the power switch 3650 to cut power to the electromechanical actuator 3670 such that both Iact and Vact drop to zero.

The cutting off of power to the electromechanical actuator 3670 allows the capacitor 3635 to recharge, and after the passage of a period of time from time Tb to time Tc (a period of time that may be determined by any of a number of factors as previously discussed), the power control 3652 may operate the power switch 3650 to again attempt to operate the electromechanical actuator 3670 in the manner originally intended at time Ta.

It should be noted that although Iact and Vact are depicted in FIG. 22 as being at non-zero levels prior to Ta, those skilled in the art will readily recognize that whether these levels preceding time Ta are non-zero or at zero depends on the nature of the electromechanical actuator 3670 and the function it performs. Where the electromechanical actuator 3670 was already in operation at time Ta, and the higher Iact and Vact at time Ta are the result of a change in direction and/or speed, then non-zero levels preceding time Ta would be expected. However, where the electromechanical actuator was not already in operation at time Ta, then zero levels preceding time Ta would be expected.

Figure 23:
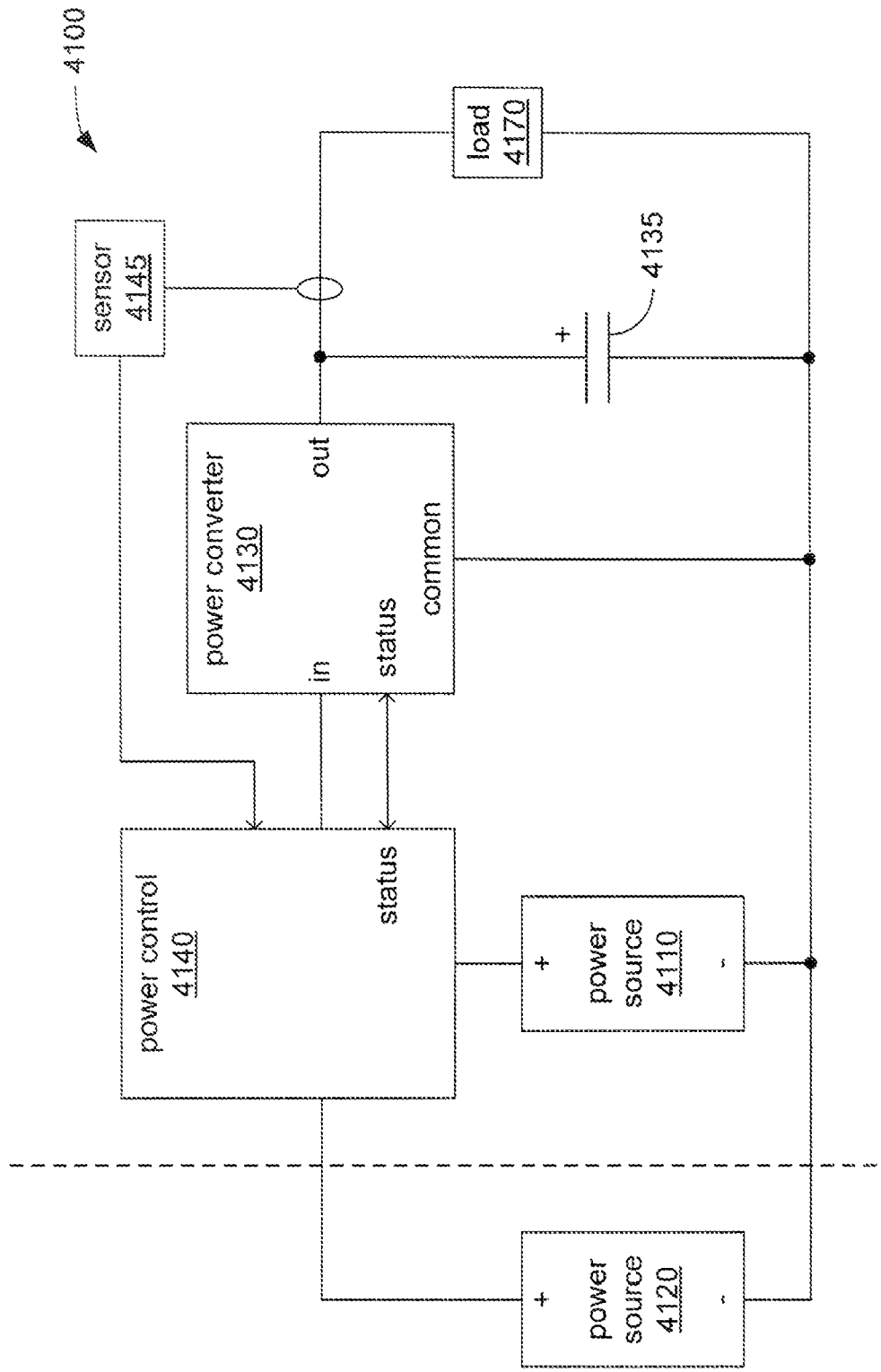
FIG. 23 is a circuit diagram of a pair of power sources coupled to a capacitive element in parallel through a power converter, and coupled to a load.

FIG. 23 depicts a circuit 4100 in which one or both of a pair of power sources 4110 and 4120 are coupled in parallel with a capacitor 4135 (may also be referred to as a capacitive element) to supply power to a load 4170. A power converter 4130 causes the capacitor 4135 to either be charged or to be discharged in response to the amount of current drawn by the load 4170 by limiting the amount of current that may be drawn from one or both of the power sources 4110 and 4120. In some embodiments, the power source 4120 is detachable from the rest of the circuit 4100. A power control 4140 selectively charges the power source 4110 with power from the power source 4120 when power from the power source 4120 is available.

The anode of the capacitor 4135 and one pole of the load 4170 are coupled to the anodes of one or both of the power sources 4110 and 4120 through the power converter 4130 and the power control 4140. The cathode of the capacitor 4135 and the other pole of the load 4170 are coupled to the cathodes of one or both of the power sources 4110 and 4120. The input terminal of the power converter 4130 is coupled to the anodes of one or both of the power sources 4110 and 4120 through the power control 4140, the output terminal of the power converter 4130 is coupled to the load 4170 and the anode of the capacitor 4135, and the common terminal of the power converter 4130 is coupled to the cathode of the capacitor 4135 and the cathodes of one or both of the power sources 4110 and 4120. As a result, the capacitor 4135 and the load 4170 are coupled in parallel to one or both of the power sources 4110 and 4120, as controlled by the power control 4140 and as determined by whether or not the power source 4120 is present. In various embodiments, the power control 4140 and the power converter 4130 control various flows of current to selectively allow the power source 4120 to charge the power source 4110, selectively allow one or both of the power sources 4110 and 4120 to supply power to the load 4170, and selectively allow the capacitor 4135 to cooperate with one or both of the power sources 4110 and 4120 to provide a brief increase in current supplied to the load 4170.

The power source 4110 is of a type that stores electricity for later discharge, and the power source 4120 provides power for at least the charging of the power source 4110. The power source 4120 is of either limited capacity (e.g., a cable conveying power with limited current capacity from an external circuit, such as and not limited to, a USB port or a cigarette lighter plug) or of unpredictable capacity (e.g., photovoltaic cells with power output varying unpredictably with sunlight levels) such that the power source 4120 cannot be reliably used by itself to supply the power required by the load 4170. Therefore, the power source 4120 is employed to trickle-charge the power source 4110 to an extent sufficient to allow the power source 4110 to later supply the power required by the load 4170 under the control of the power control 4140. Although not specifically depicted, the power source 4120 may incorporate one or more of an AC-to-DC converter (e.g., where power must be converted from an AC main), a current limiter to prevent more than a specified amount of current being drawn, or a power converter to match what may be differing voltages between the power source 4120 with the power source 4110. Alternatively and/or additionally, the power control 4140 may also incorporate one or more of these.

The power source 4120 and/or the capacitor 4135 may be employed to assist the power source 4110 in supplying an increased amount of current for a brief period. The capacitor 4135 may be of any of a variety of types of capacitive element, including a super capacitor or ultra capacitor, and although a single capacitor is mentioned in the discussion of the circuit 4100, those skilled in the art will readily recognize that the single depicted capacitor 4135 may be replaced with multiple capacitors connected in series, parallel, or a combination of series and parallel. Further, although the power converter 4130 is preferably a buck converter in some embodiments, those skilled in the art will readily understand that other types of power converter may be used.

Figure 24B:
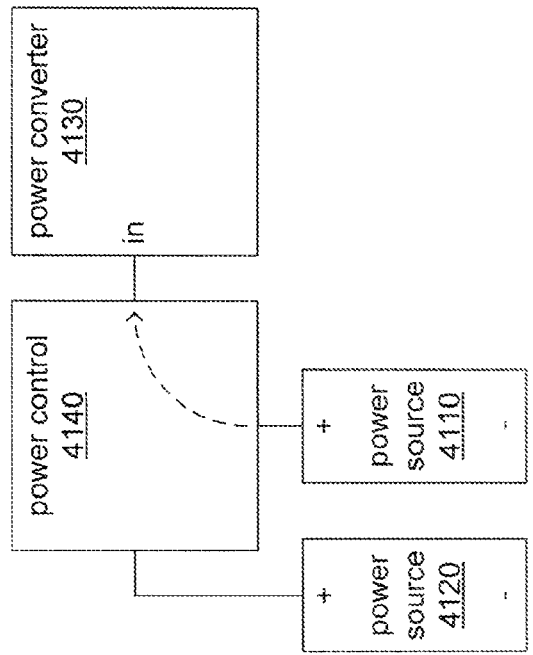
FIGS. 24a-24d are diagrams of possible flows of current through a power control.
Figure 24A:
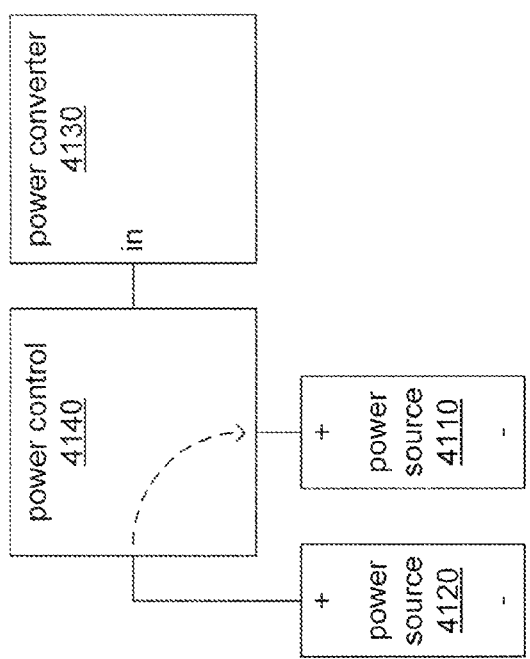

At times when the load 4170 does not draw power (e.g., the load 4170 has been "turned off"), the power control 4140 couples the anode of the power source 4120 to the anode of the power source 4110 to enable the power source 4120 to charge the power source 4110, as depicted in FIG. 24a. At times when the load 4170 does draw power, the power control 4140 may respond in a variety of ways in different embodiments, and those responses may be dependent upon the amount of power drawn by the load 4170, as will be explained. The power control 4140 may be further capable of monitoring the charging of the power source 4110 to control the rate of charging and/or to discontinue charging as needed to prevent damaging or diminishing the charging capacity of the power source 4110. By way of example, the power control 4140 may incorporate a timer that limits the maximum contiguous amount of time of any one charging of the power source 4110 to a predetermined amount of time to prevent overcharging. Also by way of example, the power control 4140 may monitor the temperature of the power source 4110 to discontinue charging if a temperature exceeding a predetermined threshold is detected.

In some embodiments, the power control 4140 implements a simple algorithm of changing between allowing current to flow from the anode of the power source 4120 to the anode of the power source 4110 (as depicted in FIG. 24a) when the load 4170 does not require power, and allowing current to flow from the anode of the power source 4110 to the input terminal of the power converter 4130 (as depicted in FIG. 24b) when the load 4170 requires power. This may or may not be implemented through one or more switching devices within the power control 4140 (e.g., relays, silicon switches, power transistors, etc.). This allows substantially all of the power provided by the power source 4120 to be directed to recharging the power source 4110 when the load 4170 does not require power. This may be desirable where the power source 4120 is of small enough capacity as to be incapable of providing even a significant fraction of the power required by the load 4170, but is still able to trickle-charge the power source 4110 to enable the power source 4110 to serve those power needs.

Figure 24D:
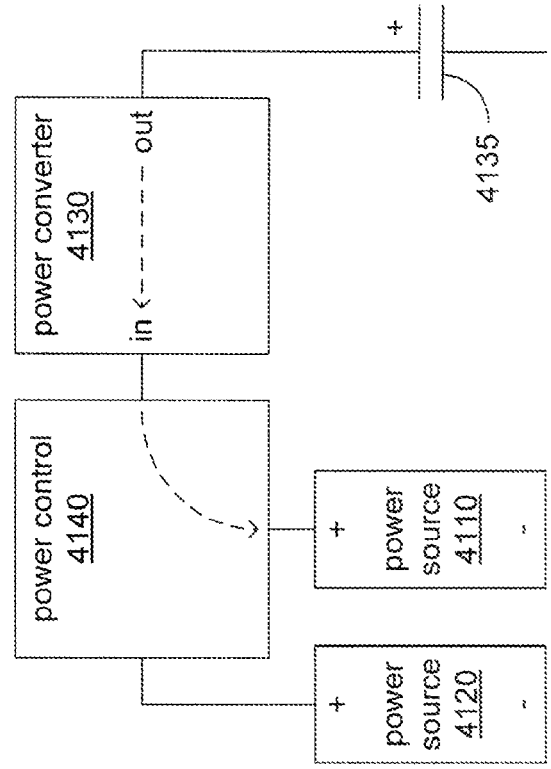
Figure 24C:
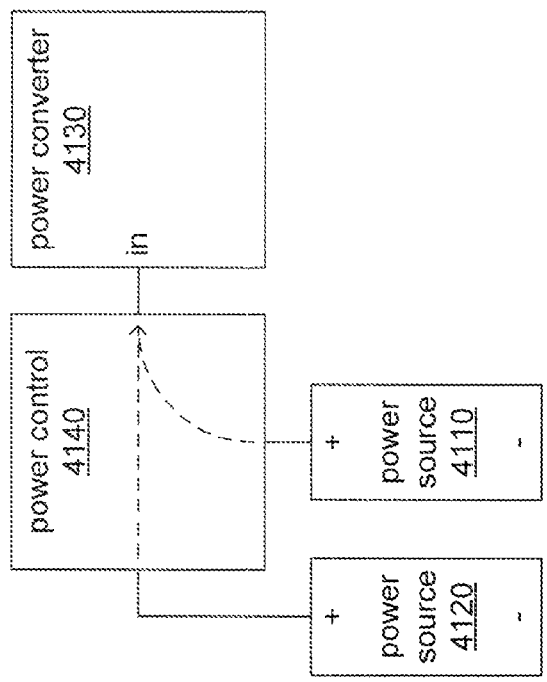

In some embodiments, the power control 4140 implements an algorithm of changing between allowing current to flow from the anode of the power source 4120 to the anode of the power source 4110 (as depicted in FIG. 24a) when the load 4170 does not require power, and allowing current to flow from the anodes of both of the power sources 4110 and 4120 to the input terminal of the power converter 4130 (as depicted in FIG. 24c) when the load 4170 requires power. This may or may not be implemented through one or more switching devices within the power control 4140, and in some embodiments, may be implemented very simply through diodes or rectifiers. This allows the power source 4110 to be charged by the power source 4120 when the load 4170 does not require power, and this also allows power of both of the power sources 4110 and 4120 to be summed to supply the power requirements of the load 4170 when the load does require power and both of these power sources are available. Further, this may be desirable to reduce the rate at which the power source 4110 is depleted, even if the power source 4120 is only intermittently available such that there are times when the power source 4110 intermittently becomes the only power source available.

At times when the load 4170 draws a relatively small amount of current, such that the limit of current flowing out through the output terminal of the power converter 4130 is not exceeded, current from one or both of the power sources 4110 and 4120 is able to flow through the power converter 4130 (and flow out through the output terminal of the power converter 4130) without limits being imposed on it by the power converter 4130, and with a portion of the current flowing out through the output terminal being able to charge the capacitor 4135.

However, at times when the load 4170 attempts to draw a relatively large amount of current, such that the limit of current flowing out through the output terminal of the power converter 4130 would be exceeded if this amount of current were permitted through the power converter 4130, the flow of current out through the output terminal becomes limited by the power converter 4130 to an amount less than the load 4170 is attempting to draw. The capacitor 4135 then discharges which allows at least a portion of the higher current draw of the load 4170 that the power converter 4130 does not support to be supported by the capacitor 4135. However, this higher current draw of the load 4170 can be supported for only the amount of time that the capacitor 4135 requires to discharge, and after that, the load is limited to receiving the amount of current that the power converter 4130 will allow to flow out through its output terminal.

Further, at times when the load 4170 is not drawing power such that the capacitor 4135 does not need to store a charge, the power converter 4130 may incorporate the ability to allow current to flow from the anode of the capacitor 4135 back into its output terminal, and the power control 4140 may cooperate with the power converter 4130 to allow that current to flow to the anode of the power source 4110 (as depicted in FIG. 24*d*). In effect, electrical energy stored in the capacitor 4135 may be saved (versus simply allowing it to be wasted by allowing it to dissipate as typically occurs with many types of capacitors) by actually recharging the power source 4110 from the capacitor 4135. The power control 4140 may coordinate the recharging of the power source 4110 from the capacitor 4135 with the recharging of the power source 4110 from the power source 4120 to avoid overcharging of the power source 4110. In some embodiments, both the capacitor 4135 and the power source 4120 may be employed simultaneously in recharging the power source 4110. In other embodiments, the recharging of the power source 4110 from each of the capacitor 4135 and the power source 4120 may be carried out separately.

With continued reference to FIG. 23, in various embodiments, the power control 4140 may engage in a one-way or two-exchange of status signals with the power converter 4130. By way of example, the power control 4140 may await a status signal from the power converter 4130 indicating when current is or is not flowing out through its output terminal, and/or the amount of current flowing out through its output terminal. Alternatively or additionally, the power control 4140 may await a signal from a sensor 4145 that senses the flow of current to the load 4170. Such signals may allow the power control 4140 to distinguish occasions when the load 4170 is drawing current from occasions when current is being drawn through the power converter 4130 for the sole purpose of recharging the capacitor 4135. The power control 4140 may use such signals in determining when there is an opportunity available to charge the power source 4110 with power supplied by the power source 4120. Also, as previously discussed, the power control 4140 may incorporate a timer to prevent overcharging, and the receipt of such signals may be used to reset that timer whenever the power source 4110 must be used to provide power to the load 4170 in preparation for a later opportunity for charging at a time when the load 4170 is not to be powered.

Also by way of example, the power converter 4130 may await a status signal from the power control 4140 indicating when the power source 4120 is available and/or is providing current and/or voltage meeting a predetermined threshold. The power converter 4130 may use such a signal in altering the limit placed on the amount of current allowed to flow out through its output terminal in order to make use of an increased amount of available current from the summation of the power sources 4110 and 4120. This may be desirable where the power source 4120 is detachable from the rest of the circuit 4100 or may in some other way be available on an intermittent basis such that the power converter 4130 is able to dynamically adapt to changes in available power.

Figure 25:
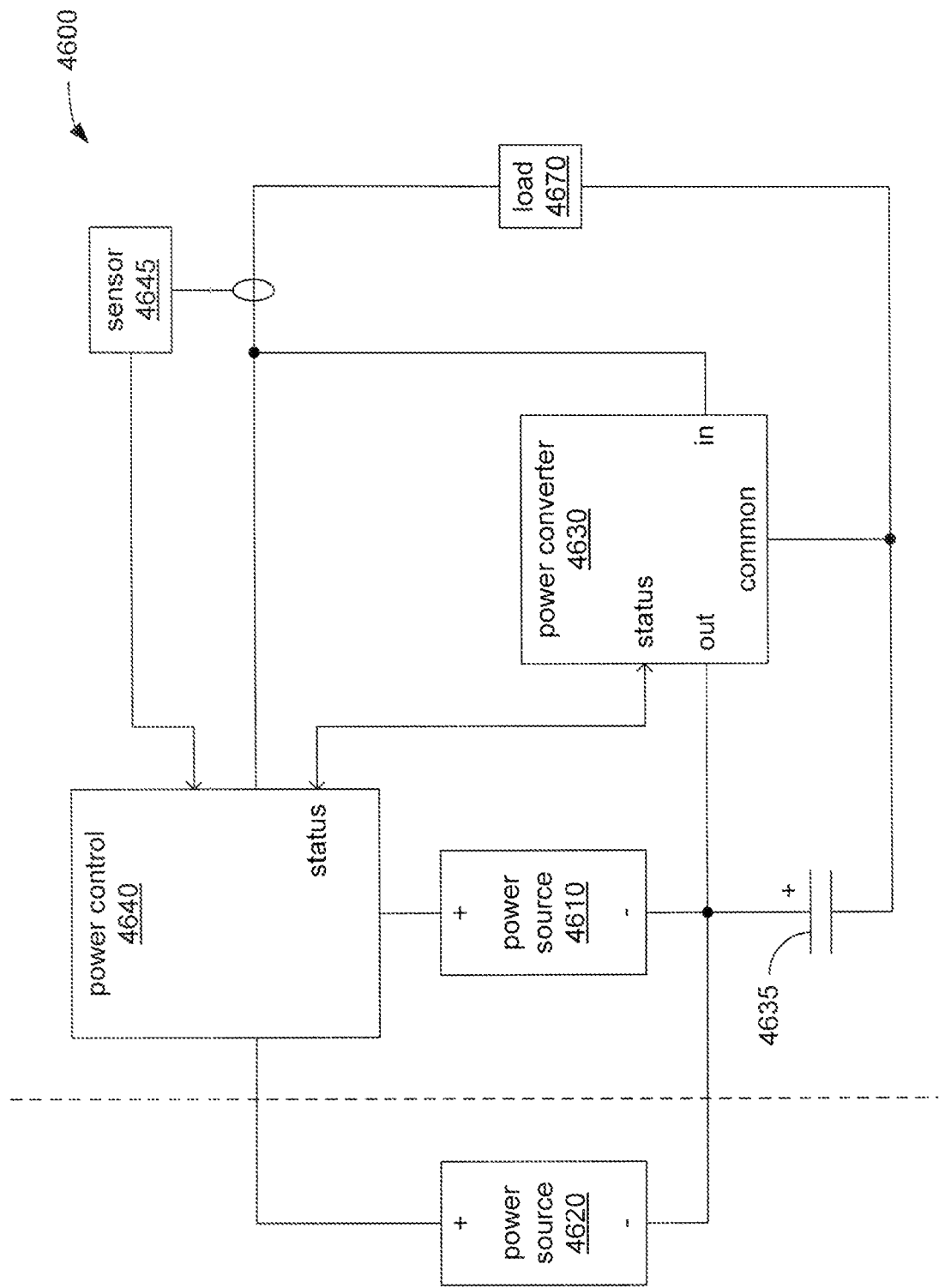
FIG. 25 is a circuit diagram of a pair of power sources coupled to a capacitive element in series, and coupled to a power converter and a load.
Figure 26:
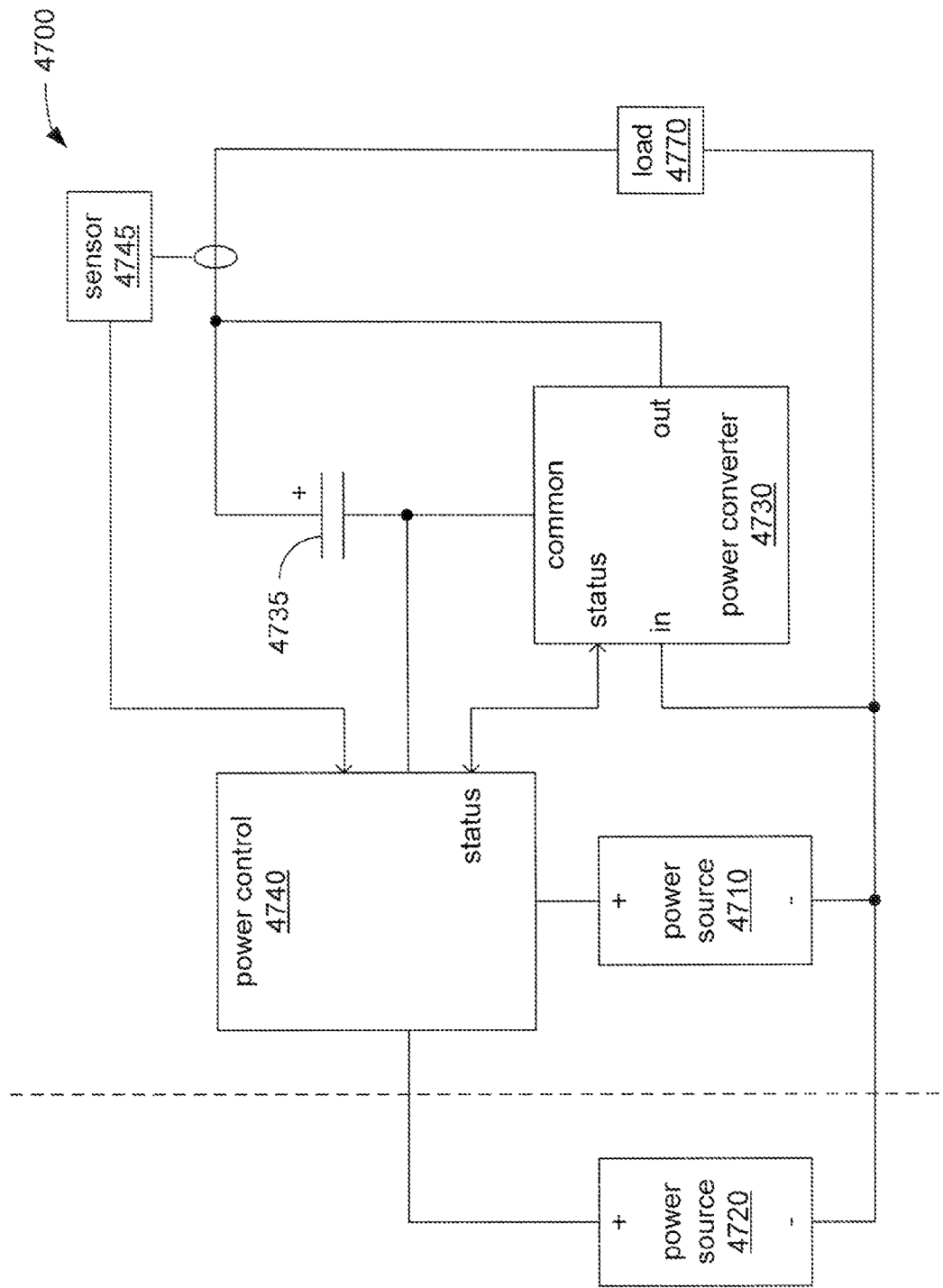
FIG. 26 is another circuit diagram of a pair of power sources coupled to a capacitive element in series, and coupled to a power converter and a load.

FIGS. 25 and 26 depict circuits 4600 and 4700, respectively, in which one or both of a pair of power sources is selectively coupled in series with a capacitor to supply power to a load with a voltage that is the sum of the voltages across the capacitor and that one or both of that pair of power sources. In each of the circuits 4600 and 4700, a power converter selectively either charges the capacitor or cooperates with the capacitor to limit the current drawn by the load, depending on the amount of current that the load attempts to draw. Also, in each of these circuits, a power control selectively charges one of the power sources with power from the other of the power sources, where the other power source may be detachable from the rest of the circuit. It should be noted that although the circuits 4600 and 4700 will now be described in detail, those skilled in the art will readily recognize that other circuits having one or both of a pair of power sources in series with a capacitor, but with somewhat different configurations of interconnects between the terminals of a power converter, the capacitor, and the power sources are possible and would be within the scope of the claims that follow. However, a circuit such as the circuit 4700 may be preferred to the extent that both of the power sources and the load driven by the circuit share a common ground.

In the circuit 4600 depicted in FIG. 25, a load 4670 is supplied with power having a voltage that is the sum of the voltages across both a capacitor 4635 and one or both of power sources 4610 and 4620 as selectively controlled by the operation of a power control 4640 and the availability of the power source 4620, as will be explained in more detail. The load 4670 is coupled to the anodes of one or both of the power sources 4610 and 4620 through the power control 4640, and is coupled to the cathode of the capacitor 4635. The anode of the capacitor 4635 is coupled to the cathodes of one or both of the power sources 4610 and 4620, thereby causing the capacitor 4635 to be coupled in series with both of the power sources 4610 and 4620 (wherein the power sources 4610 and 4620 are selectively coupled to each other in parallel through the power control 4640). Further, the input terminal of the power converter 4630 is coupled to the anode of one or both of the power sources 4610 and 4620 through the power control 4640, the output terminal of the power converter 4630 is coupled to the anode of the capacitor 4635 and the cathodes of one or both of the power sources 4610 and 4620, and the common terminal of the power converter 4630 is coupled to the cathode of the capacitor 4635. In various embodiments, the power control 4640 and the power converter 4630 control various flows of current to selectively allow the power source 4620 to charge the power source 4610, selectively allow one or both of the power sources 4610 and 4620 to supply power to the load 4670, and selectively allow the capacitor 4635 to cooperate with one or both of the power sources 4610 and 4620 to provide a brief increase in current supplied to the load 4670.

In a manner not unlike the circuit 4600, in the circuit 4700 depicted in FIG. 26, a load 4770 is supplied with power having a voltage that is the sum of the voltages across both a capacitor 4735 and one or both of power sources 4710 and 4720 as selectively controlled by the operation of a power control 4740 and the availability of the power source 4720, as will be explained in more detail. The load 4770 is coupled to the cathodes of one or both of the power sources 4710 and 4720, and is coupled to the anode of the capacitor 4735. The cathode of the capacitor 4735 is selectively coupled to the anodes of one or both of the power sources 4710 and 4720 through the power control 4740, thereby causing the capacitor 4735 to be selectively coupled in series with one or both of the power sources 4710 and 4720 (wherein the power sources 4710 and 4720 are selectively coupled to each other in parallel through the power control 4740). Further, the input terminal of the power converter 4730 is coupled to the cathodes of one or both of the power sources 4710 and 4720, the output terminal of the power converter 4730 is coupled to the anode of the capacitor 4735, and the common terminal of the power converter 4730 is coupled to the cathode of the capacitor 4735 and is selectively coupled to the anodes of one or both of the power sources 4710 and 4720 through the power control 4740. In various embodiments, the power control 4740 and the power converter 4730 control various flows of current to selectively allow the power source 4720 to charge the power source 4710, selectively allow one or both of the power sources 4710 and 4720 to supply power to the load 4770, and selectively allow the capacitor 4735 to cooperate with one or both of the power sources 4710 and 4720 to provide a brief increase in current supplied to the load 4770.

With continued reference to both FIGS. 25 and 26, the power sources 4610 and 4710 are both of a type that store electricity for later discharge, and the power sources 4620 and 4720 each provide power for at least the charging of the power sources 4610 and 4620, respectively. The power sources 4620 and 4720 are of either limited capacity (e.g., providing power with limited current capacity) or of unpredictable capacity (e.g., providing power with unpredictably varying current capacity) such that the power sources 4620 and 4720 cannot be reliably used by themselves to supply the power required by the loads 4670 and 4770, respectively. Therefore, the power sources 4620 and 4720 are employed to trickle-charge the power sources 4610 and 4710 to an extent sufficient to allow the power sources 4610 and 4710 to later supply the power required by the loads 4670 and 4770 under the control of the power controls 4640 and 4740, respectively. Although not specifically depicted, the power sources 4620 and 4720 may each incorporate one or more of an AC-to-DC converter, a current limiter to prevent more than a specified amount of current being drawn, or a power converter to match voltages between the power sources 4620 and 4720 and corresponding ones of the power sources 4610 and 4710. Alternatively and/or additionally, the power controls 4640 and 4740 may each also incorporate one or more of these.

The power source 4620 and/or the capacitor 4635 may be employed to assist the power source 4610 in supplying an increased amount of current for a brief period, and the power source 4720 and/or the capacitor 4735 may be employed to similarly assist the power source 4710. The capacitors 4635 and 4735 may each be of any of a variety of types of capacitive element, including a super capacitor or ultra capacitor, and although only a single capacitor is mentioned in the discussion of each of the circuits 4600 and 4700, those skilled in the art will readily recognize that these single capacitors may be replaced with multiple capacitors connected in series, parallel, or a combination of series and parallel. Further, although the power converters 4630 and 4730 are preferably buck converters in some embodiments, those skilled in the art will readily understand that other types of power converter may be used.

At times when the load 4670 does not draw power (e.g., the load 4670 has been "turned off"), the power control 4640 allows current to flow from the anode of the power source 4620 to the anode of the power source 4610 to enable the power source 4620 to charge the power source 4610. The power control 4740 similarly enables the power source 4720 to charge the power source 4710 at times when the load 4770 does not draw power. At times when either the load 4670 or the load 4770 does draw power, the corresponding ones of the power controls 4640 and 4740 may respond in different ways in different embodiments, and those responses may be dependent upon the amount of power drawn by each of the loads 4670 and 4770, as will be explained. The power controls 4640 and 4740 may be further capable of monitoring the charging of the power sources 4610 and 4710, respectively, to control the rate of charging and/or to discontinue charging as needed to prevent damaging or diminishing the charging capacity of the power sources 4610 and 4710. By way of example, the power controls 4640 and 4740 may each incorporate a timer that limits the contiguous amount of time that any one charging of the power sources 4610 and 4710, respectively, to a predetermined amount to prevent overcharging. Also by way of example, the power controls 4640 and 4740 may each monitor the temperature of the power sources 4610 and 4710, respectively, to discontinue charging if a temperature exceeding a predetermined threshold is detected.

In some embodiments, the power control 4640 implements a simple algorithm of changing between allowing current to flow from the anode of the power source 4620 to the anode of the power source 4610 when the load 4670 does not require power, and allowing current to flow from the anode of the power source 4610 to both the input terminal of the power converter 4630 and the load 4670 when the load 4670 requires power. Similarly, in some embodiments, the power control 4740 implements a similar algorithm of changing between allowing current to flow from the anode of the power source 4720 to the anode of the power source 4710 when the load 4770 does not require power, and allowing current to flow from the anode of the power source 4710 to both the cathode of the capacitor 4735 and the common terminal of the power converter 4730 when the load 4770 requires power. This is not unlike what was discussed with regard to the power control 4140 of the circuit 4100, and depicted in FIGS. 24*a* and 24*b*. Such a simple algorithm may or may not be implemented through one or more switching devices within either of the power controls 4640 and 4740. Such simple algorithms allow substantially all of the power provided by the power sources 4620 and 4720 to be directed to recharging the power sources 4610 and 4710 when the loads 4670 and 4770, respectively, do not require power. This may be desirable where the power sources 4620 and 4720 are of small enough capacity as to be incapable of providing even a significant fraction of the power required by the loads 4670 and 4770, but are still able to trickle-charge the power sources 4610 and 4710, respectively, to enable the power sources 4610 and 4710 to serve those power needs.

In some embodiments, the power control 4640 implements an algorithm of changing between allowing current to flow from the anode of the power source 4620 to the anode of the power source 4610 when the load 4670 does not require power, and allowing current to flow from the anodes of both of the power sources 4610 and 4620 to both the input terminal of the power converter 4630 and the load 4670 when the load 4670 requires power. Similarly, in some embodiments, the power control 4740 implements a similar algorithm of changing between allowing current to flow from the anode of the power source 4720 to the anode of the power source 4710 when the load 4770 does not require power, and allowing current to flow from the anodes of both of the power sources 4710 and 4720 to both the cathode of the capacitor 4735 and the common terminal of the power converter 4730 when the load 4770 requires power. This is not unlike what was discussed with regard to the power control circuit 4140 of the circuit 4100, and depicted in FIGS. 24a and 24c. Such algorithms may or may not be implemented through one or more switching devices within either of the power controls 4640 and 4740. Such algorithms allow the power sources 4610 and 4710 to be charged by the power sources 4620 and 4720 when the loads 4670 and 4770, respectively, do not require power. This also allows the pair of the power sources 4610 and 4620, and the pair of the power sources 4710 and 4720 to supply the power requirements of the loads 4670 and 4770, respectively. This may be desirable to reduce the rate at which the power sources 4610 and 4710 are depleted, even if the power sources 4620 and 4720 are only intermittently available such that there are times when the power sources 4610 and 4710, respectively, become the only power sources available.

Turning more specifically to the circuit 4600 of FIG. 25, there are two current flows that flow out through the output terminal of the power converter 4630 at times that the load 4670 is being powered. A first current flows from the anodes of one or both of the power sources 4610 and 4620 (as controlled by the power control 4640 and depending on the availability of the power source 4620), through the load 4670, through the common and output terminals of the power converter 4630, and back to the cathodes of one or both of the power sources 4610 and 4620. A second current flows from the anodes of one or both of the power sources 4610 and 4620, through the input and output terminals of the power converter 4630, and back to the cathodes of one or both of the power sources 4610 and 4620. The power converter 4630 imposes a limit on the amount of current that it permits to flow out through the output terminal, and the sum of these two current flows out through the output terminal is not permitted by the power converter 4630 to exceed this limit. It is this limit imposed on the sum of these two current flows that determines whether the capacitor 4635 is charged or discharged, depending on the amount of current drawn by the load 4670, as will now be explained.

At times when the load 4670 draws a relatively small amount of current, such that the limit of current flowing out through the output terminal of the power converter 4630 is not exceeded, both of the first and second current flows are able to take place without limits being imposed on them by the power converter 4630, and with a portion of the current flowing out through the output terminal being able to charge the capacitor 4635.

However, at times when the load 4670 attempts to draw a relatively large amount of current, such that the limit on current flowing out through the output terminal of the power converter 4630 would be exceeded if this amount of current were permitted through the output terminal, this limit permits only a portion of this relatively large amount of current to be drawn through the power converter 4630. The capacitor 4635 then discharges which allows another portion of this relatively large current draw of the load 4670 to circumvent the limit on current flowing out through the output terminal of the power converter 4630 by flowing through the capacitor 4635, thereby assisting in supporting this relatively large current draw of the load 4670. However, this circumvention is permitted to occur for only the amount of time that the capacitor 4635 requires to fully discharge, and after that, the amount of current that the load 4670 is permitted to draw is once again limited by the limit imposed by the power converter 4630 through its output terminal.

Turning more specifically to the circuit 4700 of FIG. 26, a similar interaction between the power converter 4730 and the capacitor 4735 serves to similarly limit the amount of current that the load 4770 is permitted to draw. Not unlike the output terminal of the power converter 4630, there are two current flows that flow in through the common terminal of the power converter 4730 at times that the load 4770 is being powered. A first current flows from the anodes of one or both of the power sources 4710 and 4720 (as controlled by the power control 4740 and as determined by the availability of the power source 4720), through the common and output terminals of the power converter 4730, through the load 4770, and back to the cathodes of one or both of the power sources 4710 and 4720. A second current flows from the anodes of one or both of the power sources 4710 and 4720, through the common and input terminals of the power converter 4730, and back to the cathodes of one or both of the power sources 4710 and 4720. The power converter 4730 imposes a limit on the amount of current that it permits to flow in through the common terminal, and the sum of these two current flows in through the common terminal is not permitted by the power converter 4730 to exceed this limit. It is this limit imposed on the sum of these two current flows that determines whether the capacitor 4735 is charged or discharged, depending on the amount of current drawn by the load 4770, as will now be explained.

At times when the load 4770 draws a relatively small amount of current, such that the limit of current flowing in through the common terminal of the power converter 4730 is not exceeded, both of the first and second current flows are able to take place without limits being imposed on them by the power converter 4730, and with a portion of the current flowing out through the output terminal being able to charge the capacitor 4735.

However, at times when the load 4770 attempts to draw a relatively large amount of current, such that the limit of current flowing in through the common terminal of the power converter 4730 would be exceeded if this amount of current were permitted through the common terminal, only a portion of this relatively large amount of current is permitted to flow through the power converter 4730 as a result of this limit. The capacitor 4735 then discharges which allows another portion of this relatively large amount of current drawn by the load 4770 to circumvent this limit by flowing through the capacitor 4735. However, such a higher current draw by the load 4770 than what is permitted by the power converter 4730 can only continue for the amount of time that the capacitor 4735 requires to fully discharge, and after that, the amount of current that the load 4770 is permitted to draw is once again limited by the limit imposed by the power converter 4730 on current flowing in through its common terminal.

Further, at times when the loads 4670 and 4770 are not drawing power such that the capacitors 4635 and 4735 do not need to store a charge, the power converters 4630 and 4730 may cooperate to allow the power sources 4610 and 4710 to be recharged from the capacitors 4635 and 4735, respectively. This is not unlike what was discussed with regard to the power converter 4130 and the power control circuit 4140 of the circuit 4100, and depicted in FIG. 24d. In various embodiments, each of the power sources 4610 and 4710 may be charged by corresponding ones of the power sources 4620 and 4720 either separately or simultaneously with corresponding ones of the capacitors 4635 and 4735, while the power controls 4640 and 4740 may selectively discontinue such charging to prevent overcharging.

In various embodiments, the power controls 4640 and 4740 may engage in a one-way or two-exchange of status signals with the power converters 4630 and 4730, respectively. By way of example, the power controls 4640 and 4740 may await status signals from the power converters 4630 and 4730, respectively, indicating when current is or is not flowing through the them and/or the amount of current flowing through them. Alternatively or additionally, the power controls 4640 and 4740 may await signals from corresponding ones of sensors 4645 and 4745 that sense the flow of current to the loads 4670 and 4770, respectively. The power controls 4640 and 4740 may use such signals in determining when the loads 4670 and 4770, respectively, are drawing current such that charging of the power sources 4610 and 4710 must be discontinued so that the power sources 4610 and 4710 are able to supply power to the loads 4670 and 4770, respectively. As previously discussed, the power controls 4640 and 4740 may incorporate a timer to prevent overcharging, and the receipt of such signals may be used to reset that timer whenever the power sources 4610 and 4710 are used to provide power to corresponding ones of the loads 4670 and 4770 in preparation for a later opportunity for charging at a time when the loads 4670 and 4770 are not to be powered.

Also by way of example, the power converters 4630 and 4730 may await status signals from the power controls 4640 and 4740, respectively, indicating when the power sources 4620 and 4720 are available and/or are providing current and/or voltage meeting a predetermined threshold. The power converters 4630 and 4730 may use such signals in altering their limits on the amount of current permitted to flow through the output and common terminals, respectively, in order to make use of increased available current from the summation of the pair of the power sources 4610 and 4620 and the pair of the power sources 4710 and 4720. In this way, the power converters 4630 and 4730 are able to dynamically adapt to changes in available power, and this may be desirable where the power sources 4620 and 4720 are detachable or may in some other way be available only on an intermittent basis.

Figure 27:
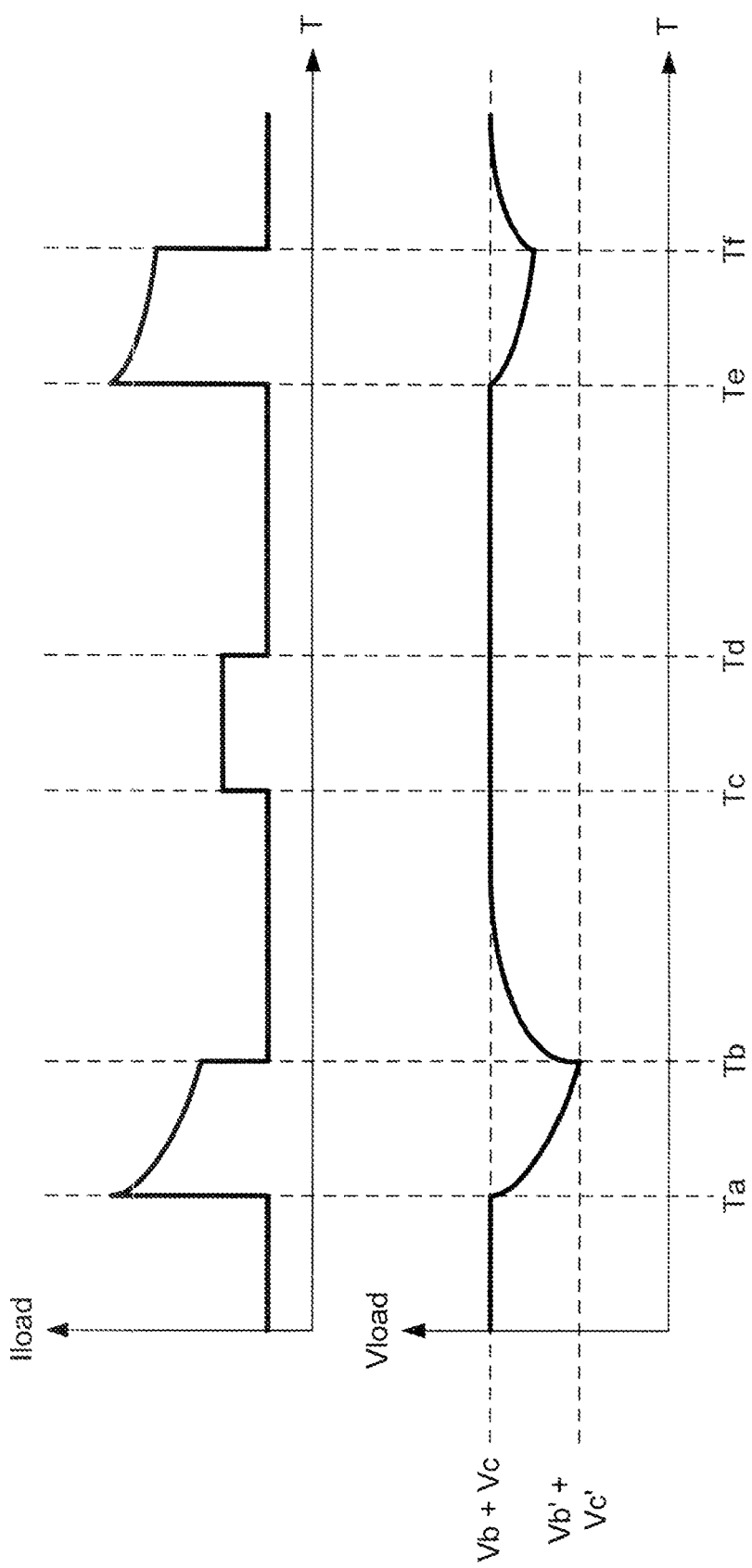
FIG. 27 is a time plot of electrical current and voltage provided to the loads of FIGS. 23, 25 and 26.

FIG. 27 depicts the possible changes in the voltage (Vload) provided to a load as a result of changes in the amount of current drawn by that load (Iload), as a result of exchanging status information between a power control and a power converter, and as a result of having a capacitor in series with one or both of a first power source and a second power source in a manner not unlike what is depicted in FIGS. 25 and 26.

Prior to time Ta, the first power source in the form of a power storage device (e.g., a battery) is employed to supply power to the load through the power converter, and a limit imposed by the power converter on the amount of current permitted to flow through the power converter has not been reached such that there is sufficient current available through the power converter to also charge the capacitor. Therefore, prior to time Ta, with the capacitor fully charged to its nominal voltage Vc, and with the power source able to supply power at its nominal voltage Vb, the load is supplied with power having a Vload equal to Vb+Vc. However, at time Ta, the load greatly increases the amount of current that it draws, causing the limit on the amount of current permitted to flow through the power converter to be reached, thereby causing the capacitor to start to discharge. The discharging of the capacitor allows the power converter to be circumvented such that the capacitor and the first power source, together, supply a boosted amount of current to the load, but only for as long as the capacitor takes to discharge, thereby preventing damage to the first power source from supplying the boosted amount of current for too long. The capacitor discharges from time Ta until at time Tb the load reduces the amount of current it requires back to a level comparable to what it required before time Ta. It is important to note that during the interval between times Ta and Tb, Vload decreases as both the capacitor discharges and as the power source continues to supply a boosted amount of current such that by time Tb, the capacitor voltage has dropped from the original Vc to a lower Vc' and the power source voltage has dropped from the original Vb to a lower Vb'. Also, as the voltage of the capacitor drops from Vc to Vc', the amount of the current that the capacitor is able to support circumventing the power converter also drops. Had the load continued to attempt to draw such an increased amount of current past time Tb, the capacitor voltage would eventually drop to zero (or perhaps to even a slightly negative voltage level) causing the capacitor to cease to allow current to flow through it, and as a result of no more current circumventing the power converter, Vload would eventually settle to approximately the original Vb voltage of the power source, since the amount of current would now be limited by the power converter. Thus, had the load continued to attempt to draw such an increased amount of current past time Tb, the forced return of the current to a level limited by the power converter would prevent the power source from having to support providing such an increased amount of current for a period of time long enough to cause damage to the power source.

Following time Tb, and prior to time Tc, the second power becomes available, the power converter is signaled concerning the availability of the second power source in addition to the first power source and raises the limit it imposes on current flowing through the power converter to allow the extra current capacity to be used, and the load is signaled concerning the availability of the second power source in addition to the first power source. At time Tc, the load seeks to make use of the extra current capacity provided by the availability of both the first and second power sources by increasing the amount of current it draws enough to use this extra capacity, but not enough to reach the limit on current flow imposed by the power converter, and therefore, not enough to trigger the discharging of the capacitor. At time Td, the load returns to drawing a lesser amount of current.

However, at time Te, the load again starts to draw an amount of current comparable in magnitude to the amount it drew during the interval between times Ta and Tb. Despite the availability of both the first and second power sources and the increase in the limit on current flow imposed by the power converter, the limit imposed by the power converter is still reached and the capacitor is still triggered to discharge. The load continues drawing this greatly increased amount of current for an interval of time between times Te and Tf that is comparable in length to the interval of time between times Ta and Tb. Although the amount of current drawn by the load and the amount of time that the load draws that current may be comparable between these two intervals of time, the availability of additional current provided by the second power source may result in a slowing of the discharge of the capacitor and a corresponding slowing in the drop in the voltage supplied to the load, as can be seen by comparing the depictions of the two intervals.

Figure 28:
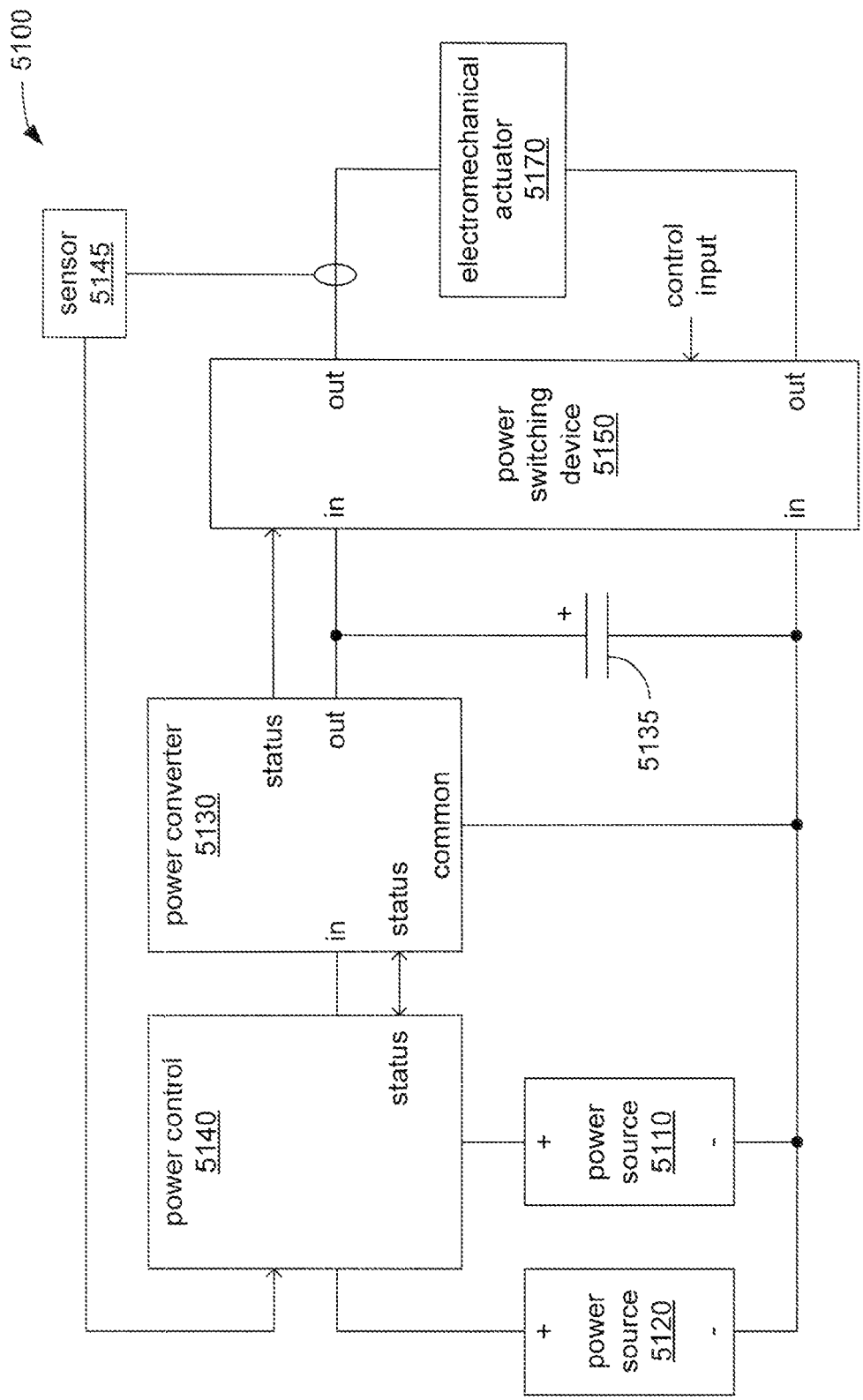
FIG. 28 is a circuit diagram of a pair of power sources coupled to a capacitive element in parallel through a power converter, and coupled to an electromechanical actuator through a power switching device.

FIG. 28 depicts a circuit 5100 having an electromechanical actuator 5170 that is powered by one or both of power sources 5110 and 5120 in parallel with a capacitor 5135 (through a power control 5140 and a power converter 5130) that is selectively charged by the power converter 5130. A power switching device 5150 is interposed between the electromechanical actuator 5170 and the supply of power to the mechanical actuator 5170 to control the provision of power and/or the polarity of power to the electromechanical actuator 5170 in response to a control input. The coupling of anodes, cathodes and terminals among the power sources 5110 and 5120, the capacitor 5135, the power control 5140 and the power converter 5130 in the circuit 5100 is substantially similar to what is depicted in the circuit 4100 of FIG. 23.

The power source 5110 is of a type that stores power for later use, and the power source 5120 is of a type that does not have the capacity to itself provide the power requirements of the electromechanical actuator 5170. However, the power source 5120 does have the capacity to trickle-charge the power source 5110 to enable the power source 5110 to later supply the power requirements of the electromechanical actuator 5170. Not unlike what has been discussed with regard to earlier-described circuits, one or both of the power source 5120 and the power control 5140 may incorporate one or more of an AC-to-DC converter, a current limiter, or a power converter. Further, the power control 5140 may incorporate charge control circuitry capable of controlling the rate at which the power source 5110 is charged and/or of discontinuing charging to prevent overcharging or other damage to the power source 5110.

The electromechanical actuator 5170 may be any of a variety of types of electromechanical device, including a rotary motor, a stepper motor, a linear motor, a solenoid, a relay, a contactor, a magnet, etc. Like the various loads discussed earlier herein, there are moments where the electromechanical actuator 5170 briefly requires a relatively greater amount of power. For the electromechanical actuator 5170, such moments are usually associated with being actuated, changes in speed of movement, or changes in direction of movement.

At times when the electromechanical actuator 5170 draws a relatively small amount of current, such that the limit of current flowing out through the output terminal of the power converter 5130 is not exceeded, the electromechanical actuator 5170 is able to be supplied with sufficient power to meet its power requirements by one or both of the power sources 5110 and 5120 through the power converter 5130. Also, a portion of the current flowing out through the output terminal of the power converter 5130 is able to charge the capacitor 5135. However, at times when an obstruction or other mechanical interference/malfunction causes the electromechanical actuator 5170 to attempt to draw a relatively large amount of current, such that the limit of current flowing out through the output terminal of the power converter 5130 would be exceeded if this amount of current were permitted through the power converter, the power converter 5130 limits the amount of that current flow, causing the capacitor 5135 to discharge. This discharge of the capacitor 5135 briefly provides a boost to the amount of current supplied to the electromechanical actuator 5170, but only for the amount of time required for up to the capacitor 5135 to substantially discharge. After the capacitor 5135 has substantially discharged, the amount of current that is provided to the mechanical actuator 5170 is the limited amount flowing from the power converter 5130 through its output terminal.

In embodiments where the power control 5140 incorporates charge control circuitry, the power control 5140 may await a signal from one or both of a sensor 5145 monitoring current flow to the mechanical actuator 5170, and the power converter 5130 indicating a status of the power converter 5130 such as when current is being output through its output terminal and/or the amount of current being output through its output terminal. The power control 5140 may employ one or both of these signals either to detect when to stop charging the power source 5110 so as to use the power source 5110 to power the electromechanical actuator 5170, or as an input to a timer or other circuitry that monitors the progress of charging of the power source 5110 and intervenes to discontinue charging to prevent damage.

In embodiments where the power converter 5130 is able to change the limit on the amount of current flowing out through its output terminal, the power converter 5130 may await a status signal from the power control 5140 indicating whether or not power from the power source 5120 is available. Although the power source 5120 may not, itself, be capable of serving the power needs of tasks other than trickle-charging the power source 5110, the power control 5140 may be capable of summing the power output of both of the power sources 5110 and 5120. Where such summing is carried out, a status signal to the effect that the power source 5120 is available in addition to the power source 5110 may cause the power converter 5130 to increase the limit on the flow of current out through its output terminal to allow the mechanical actuator 5170 to make use of that increased current flow. In this way, the electromechanical actuator 5170 may be able to draw upon additional current in some situations where increased current is required without use of the capacitor 5135 such that the capacitor 5135 could be employed if the demand for current were to become even greater. Further, the power converter 5130 may provide a signal status to the power switching device 5150 (perhaps relayed from the power control 5140) to the effect that such increased current capacity from both the power sources 5110 and 5120 is available, and the power switching device 5150 may in some way alter its operation of the electromechanical actuator 5170 to take advantage of that increased current capacity.

Further, at times when the mechanical actuator 5170 is not drawing power, power stored in the capacitor 5135 may be transferred back to the power source 5110 by recharging the power source 5110 with that stored power. The power control 5140 may coordinate such charging with the use of the power source 5120 to charge the power source 5110 to prevent overcharging.

Figure 29:
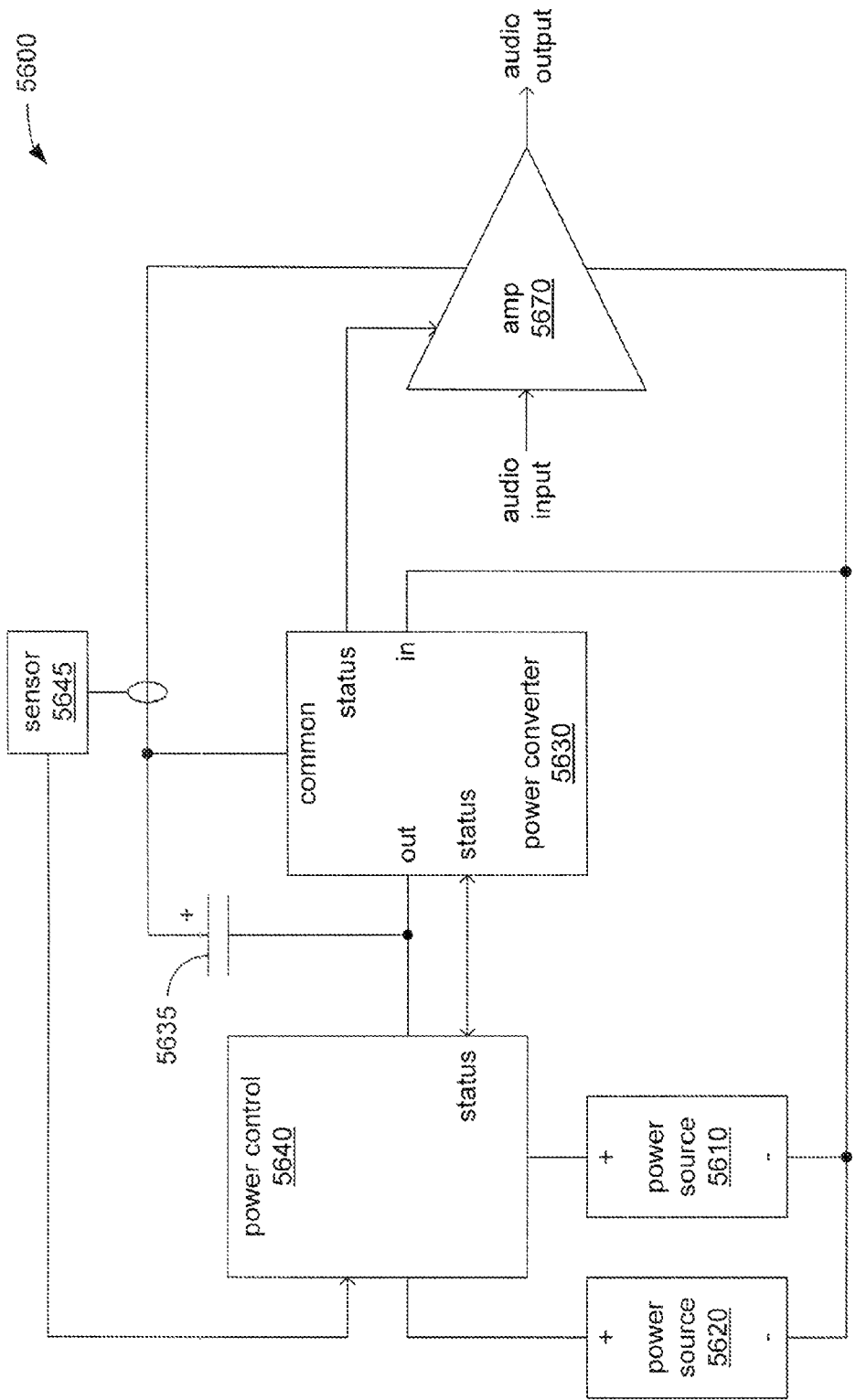
FIG. 29 is a circuit diagram of a pair of power sources coupled to a capacitive element in series, and coupled to a power converter and an amplifier having at least one of a gain control and an audio compressor associated therewith.

FIG. 29 depicts a circuit 5600 having an amplifier 5670 (serving as the load) that is powered by one or both of power sources 5610 and 5620 that are selectively put in series by a power control 5640 with a capacitor 5635 that is selectively charged by a power converter 5630. The amplifier 5670 amplifies an audio input to provide an audio output capable of driving an acoustic driver (not shown), and may either incorporate or be coupled to either a gain control or audio compressor (neither of which is shown) that alters characteristics of the audio input provided to the amplifier 5670. Not unlike earlier-described circuits in which capacitors and power sources were coupled in series, the amplifier 5670 is supplied with power having a voltage that is the sum of the voltages output by the capacitor 5635 and one or both of the power sources 5610 and 5620. Also not unlike the power converters of at least some of the earlier-described circuits, the power converter 5630 selectively charges the capacitor 5635 depending on the amount of current the amplifier 5670 is caused to draw as a result of the characteristics of the audio input that the amplifier 5670 amplifies.

Like the circuit 4700 of FIG. 26, in the circuit 5600 of FIG. 29, the power sources 5610 and 5620 share a common ground with the amplifier 5670. However, as those skilled in the art will readily recognize from a comparison of circuits 4700 and 5600, there are differences in the configuration of connections between power sources, capacitors and power converters between these two circuits. Whereas the power converter 4730 in the circuit 4700 was an inverting power converter, the power converter 5630 in the circuit 5600 is a regular power converter (such as was the power converter 4130 in the circuit 4100) used in a negative voltage configuration. Despite this difference in configuration, like the circuit 4700 (and like a number of the other previously discussed circuits), there is a pair of flows of current through the power converter 5630 that serve to both power the amplifier 5670 and to selectively charge the capacitor 5635.

At times when the amplifier 5670 draws a relatively small amount of current, such that the limit of current flowing through the output terminal of the power converter 5630 is not exceeded, both flows of current are able to take place without limits being imposed on them by the power converter 5630, and with a portion of the current flowing out through the common terminal being able to charge the capacitor 5635.

However, at times when the amplifier 5670 attempts to draw a relatively large amount of current, such that the limit of current flowing through the output terminal of the power converter 5630 would be exceeded if this amount of current were permitted through the output terminal, this limit results in only a portion of this relatively large amount of current being permitted to pass through the power converter 5630. The capacitor 5635 then discharges which allows another portion of this relatively large current draw of the amplifier 5670 to circumvent this limit by flowing through the capacitor 5635. However, this higher current draw of the amplifier 5670 is permitted to occur for only the amount of time that the capacitor 5635 requires to fully discharge, and after that, the amount of current that the amplifier 5670 is permitted to draw is once again limited by the limit imposed by the power converter 5630 on the amount of current permitted to flow through its output terminal.

However, if the period of time during which the amplifier 5670 draws relatively more current begins to exceed the time during which the capacitor 5635 substantially discharges, then the gain control or audio compressor associated with the amplifier 5670 may be triggered in any of a number of ways to reduce the gain with which the audio input is amplified and/or to otherwise modify the audio input to reduce the amount of power required to amplify it. In some embodiments, a timer preset to a predetermined period of time meant to correspond to the discharge time of the capacitor 5635 may be used as the trigger. In other embodiments, the voltage provided to the amplifier 5670 may be monitored for a reduction in voltage level resulting from the capacitor 5635 having discharged such that the capacitor 5635 is no longer providing a boost in current to maintain a higher voltage level. In still other embodiments, the audio output may be monitored for occurrences of undesired events (including clipping) that are indicative of the voltage provided to the amplifier 5670 no longer being of a sufficient level as a result of the capacitor 5635 no longer providing a boost in current.

In various embodiments, one or more status signals may be provided by the power converter 5630 and/or the power control 5640 to the amplifier 5670 (or to a gain control or audio compressor associated or incorporated into the amplifier 5670). Such a status signal may indicate the occurrences of the limit imposed on current flowing through the output terminal of the power converter 5630 being reached such that the capacitor 5635 is presumably being discharged. Such a status signal may indicate that both power sources 5610 and 5620 are available to provide greater current than the power source 5610 could provide, alone, and/or that the power converter 5630 has adjusted the limit on current flowing through its output terminal to enable the use of the extra current provided by the power source 5620 also being available. Such an indication of extra current capacity being available might enable the amplifier 5670 to increase the gain with which the audio input is amplified or to change some other characteristic of its operation.

Other embodiments are within the scope of the following claims.

What is claimed is:

1. An apparatus comprising:
a load;
a first power source capable of providing the electric power required by the load when at least partially charged;
a second power source that is intermittently available, wherein the second power source is unable itself to provide the electric power required by the load, and wherein the second power source is selectively employed to charge the first power source;
a capacitive element; and
a power converter interposed between a pole of the load and the first and second power sources, imposing a limit on an amount of current permitted to flow through a portion of the power converter to thereby limit an amount of current permitted to flow through the load, causing the capacitive element to charge at a time where the load attempts to draw a relatively small amount of current, causing the capacitive element to discharge at a time where the load attempts to draw a relatively large amount of current such that the load is supplied with the relatively large amount of current as the capacitive element discharges, and changing the limit imposed by the power converter in response to receiving a signal indicating an availability of the second power source.

2. The apparatus of claim 1, wherein the intermittent availability of the second power source arises from the second power source being detachable from the remainder of the apparatus, and the signal received by the power converter indicates that the second power source is attached.

3. The apparatus of claim 1, wherein the first power source and the capacitive element are coupled in parallel through the power converter.

4. The apparatus of claim 1, wherein the first power source and the capacitive element are coupled in series to provide the load with electrical power having a voltage that is the sum of the voltages of the capacitive element and the first power source.

5. The apparatus of claim 1, further comprising a power control to control charging of the first power source by the second power source.

6. The apparatus of claim 5, wherein the power control discontinues charging the first power source in response to receiving a signal indicating that the load is drawing power.

7. The apparatus of claim 1, wherein the load alters an amount of power required by the load in response to receiving a signal indicating an availability of the second power source.

8. The apparatus of claim 1, wherein the load alters an amount of power required by the load in response to receiving a signal indicating a changing of the limit imposed by the power converter.

9. The apparatus of claim 1, wherein the power converter is structured to allow current to flow from the capacitive element to the first power source to recharge the first power source at a time where the load draws substantially no power.

10. The apparatus of claim 9, further comprising a power control to control charging of the first power source with power provided by the second power source and the capacitive element.

11. An apparatus comprising:
an amplifier to amplify an audio signal to be output by an acoustic driver, wherein the amplifier changes an amount of power required by the amplifier to amplify the audio signal in response to receiving a signal indicating an availability of electric power to the amplifier;
a first power source capable of providing the electric power required by the amplifier when at least partially charged;
a second power source that is intermittently available, wherein the second power source is unable itself to provide the electric power required by the amplifier, and wherein the second power source is selectively employed to charge the first power source;
a capacitive element; and
a power converter interposed between a pole of the amplifier and the first and second power sources, imposing a limit on an amount of current permitted to flow through a portion of the power converter to thereby limit an amount of current permitted to flow through the load, causing the capacitive element to charge at a time where the load attempts to draw a relatively small amount of current, and causing the capacitive element to discharge at a time where the load attempts to draw a relatively large amount of current such that the load is supplied with the relatively large amount of current as the capacitive element discharges.

12. The apparatus of claim 11, wherein the audio amplifier comprises an audio compressor, and wherein the audio compressor compresses the audio signal amplified by the amplifier in response to receiving a signal indicating an availability of electric power to the amplifier.

13. The apparatus of claim 11, wherein the audio amplifier comprises a gain control, and wherein the gain control reduces a gain employed in amplifying the audio signal in response to receiving a signal indicating an availability of electric power to the amplifier.

14. The apparatus of claim 11, wherein the intermittent availability of the second power source arises from the second power source being detachable from the remainder of the apparatus, and the signal received by the amplifier indicates that the second power source is attached.

15. The apparatus of claim 11, wherein the power converter alters the limit imposed by the power converter in response to receiving a signal indicating an availability of the second power source, and wherein the signal received by the amplifier indicates an altering of the limit imposed by the power converter.

16. A method comprising:
setting a first limit on an amount of current permitted to flow through a portion of a power converter such that a capacitive element is caused to be charged when a load draws a first amount of current through the portion of the power converter and such that the capacitive element is caused to be discharged when the load draws a second amount of current through the portion of the power converter;
awaiting a signal indicating an availability of a detachable power source; and
in response to receiving the signal indicating an availability of a detachable power source, setting a second limit on the amount of current permitted to flow through the portion of the power converter such that the capacitive element is caused to be charged when the load draws a third amount of current through the portion of the power converter and such that the capacitive element is caused to be discharged when the load draws a fourth amount of current through the portion of the power converter, wherein the second limit is higher than the first limit, wherein the third amount of current is larger than the first amount of current, and wherein the fourth amount of current is larger than the second amount of current.

17. The method of claim 16, further comprising:
awaiting a signal indicating a drawing of current by the load;
charging a power source with power from the detachable power source in response to receiving both a signal indicating an availability of the detachable power source and a signal indicating a lack of a drawing of current by the load; and
providing power from both the power source and the detachable power source to the power converter in response to receiving both a signal indicating an availability of the detachable power source and a signal indicating a drawing of current by the load.

18. The method of claim 17, further comprising:
charging the power source with power from the capacitive element in response to receiving a signal indicating a lack of drawing of current by the load; and
coordinating charging of the power source with power source with power from the capacitive element with charging of the power source with power from the detachable power source.

19. The method of claim 16, further comprising changing an amount of current drawn by the load in response to receiving a signal indicating an availability of the detachable power source.

20. The method of claim 16, further comprising changing an amount of current drawn by the load in response to receiving a signal indicating a change between the first limit and the second limit on the amount of current permitted to flow through the portion of the power converter.

* * * * *